United States Patent [19]
Frank

[11] Patent Number: 5,193,440
[45] Date of Patent: Mar. 16, 1993

[54] PROCESS AND EQUIPMENT FOR PREPARATION AND COOKING OF EDIBLE MATERIALS

[75] Inventor: Peter A. Frank, London, Great Britain

[73] Assignee: Gooding International Limited, Cardiff, Wales

[21] Appl. No.: 469,448

[22] PCT Filed: Sep. 16, 1988

[86] PCT No.: PCT/GB88/00764

§ 371 Date: Jun. 7, 1990

§ 102(e) Date: Jun. 7, 1990

[87] PCT Pub. No.: WO89/03190

PCT Pub. Date: Apr. 20, 1989

[30] Foreign Application Priority Data

Oct. 7, 1987 [GB] United Kingdom ............... 8723530
Oct. 8, 1987 [GB] United Kingdom ............... 8723635
Feb. 18, 1988 [GB] United Kingdom ............... 8803745
Apr. 5, 1988 [GB] United Kingdom ............... 8807853

[51] Int. Cl.⁵ .................. A47J 37/00; A47J 37/12; A23L 1/01
[52] U.S. Cl. ........................... 99/330; 99/331; 99/353; 99/404; 99/405; 99/407
[58] Field of Search ............... 99/330, 331, 352, 353, 99/355, 357, 403, 404–406, 407; 426/438, 518; 241/92

[56] References Cited

U.S. PATENT DOCUMENTS

| | | |
|---|---|---|
| 1,531,256 | 3/1925 | Morrow . |
| 1,666,019 | 4/1928 | McCarthy . |
| 1,994,909 | 3/1935 | Ehrgott . |
| 2,186,345 | 1/1940 | Reidenbach .................. 99/353 |
| 2,207,316 | 7/1940 | Ferry ............................ 99/405 |

(List continued on next page.)

FOREIGN PATENT DOCUMENTS

| | | |
|---|---|---|
| 0193027 | 9/1986 | European Pat. Off. . |
| 0213074 | 4/1987 | European Pat. Off. . |
| 2285816 | 4/1976 | France . |
| 52-118391 | 9/1977 | Japan . |
| 8201808 | 6/1982 | PCT Int'l Appl. . |
| 8912417 | 12/1989 | PCT Int'l Appl. ............ 99/407 |
| 1311698 | 5/1987 | U.S.S.R. . |
| 175376 | 3/1922 | United Kingdom . |
| 1195136 | 6/1970 | United Kingdom . |
| 1195137 | 6/1970 | United Kingdom . |
| 1195138 | 6/1970 | United Kingdom . |
| 1232497 | 5/1971 | United Kingdom . |
| 1284283 | 8/1972 | United Kingdom . |
| 1508766 | 4/1978 | United Kingdom . |
| 1519049 | 7/1978 | United Kingdom . |
| 1523700 | 9/1978 | United Kingdom . |
| 1579392 | 11/1980 | United Kingdom . |
| 2099279 | 12/1982 | United Kingdom . |
| 2170396 | 8/1986 | United Kingdom . |

Primary Examiner—Timothy F. Simone
Attorney, Agent, or Firm—Ratner & Prestia

[57] ABSTRACT

Processes and equipment for preparation and cooking of edible materials, particularly for the automatic slicing and deep frying of vegetables, especially potatoes, to form crisps. The procedure comprises the steps of forming unwashed and undried slices of the edible material, individually feeding the slices without washing and drying into a bath of hot cooking oil, then when said slices subsequently float to the surface of the oil due to the formation of steam bubbles on the slices forcibly submerging the slices in said hot cooking oil for a further period in which cooking of the slices is substantially completed to give the slices a crisp consistency, and finally removing the cooked slices from the cooking oil and dispensing the cooked slices. The equipment comprises slicing means, a bath for containing hot cooking oil, heating means for maintaining the cooking oil at a required temperature, slice feeding means for individually feeding the unwashed and undried slices into said bath, and slice handling means for forcibly submerging slices, maintaining submersion of the slices for an appropriate period, and for finally removed cooked slides from the cooking oil and dispensing the cooked slices.

23 Claims, 35 Drawing Sheets

U.S. PATENT DOCUMENTS

| | | | |
|---|---|---|---|
| 2,231,114 | 2/1941 | Ferry | 99/405 |
| 2,406,769 | 9/1946 | Hosman . | |
| 2,504,110 | 4/1950 | Davis . | |
| 2,611,705 | 9/1952 | Hendel . | |
| 2,911,903 | 11/1959 | Chironis . | |
| 3,026,885 | 3/1962 | Eytinge . | |
| 3,149,978 | 9/1964 | Anderson . | |
| 3,218,959 | 11/1965 | Swisher . | |
| 3,280,723 | 10/1966 | Hughes et al. | 99/353 |
| 3,576,647 | 10/1967 | Liepa . | |
| 3,698,915 | 10/1972 | Glasgow . | |
| 3,864,505 | 2/1975 | Hunter et al. . | |
| 3,892,365 | 7/1975 | Verdun . | |
| 3,985,304 | 10/1976 | Sontheimer . | |
| 4,001,451 | 1/1977 | Veeneman et al. | 426/438 |
| 4,152,975 | 5/1979 | Jones . | |
| 4,167,137 | 9/1979 | van Remmen . | |
| 4,187,770 | 2/1980 | Coffield | 241/92 X |
| 4,196,660 | 4/1980 | Steinberg | 426/438 |
| 4,228,730 | 10/1980 | Schindler et al. | 99/352 |
| 4,488,478 | 12/1984 | Leeper | 99/330 |
| 4,594,941 | 6/1986 | Anderson . | |
| 4,694,742 | 9/1987 | Dover . | |
| 4,694,743 | 9/1987 | Groff . | |
| 4,706,556 | 11/1987 | Wallace et al. . | |
| 4,706,557 | 11/1987 | Feng et al. | 99/355 |
| 5,010,805 | 4/1991 | Ferrara | 99/357 |

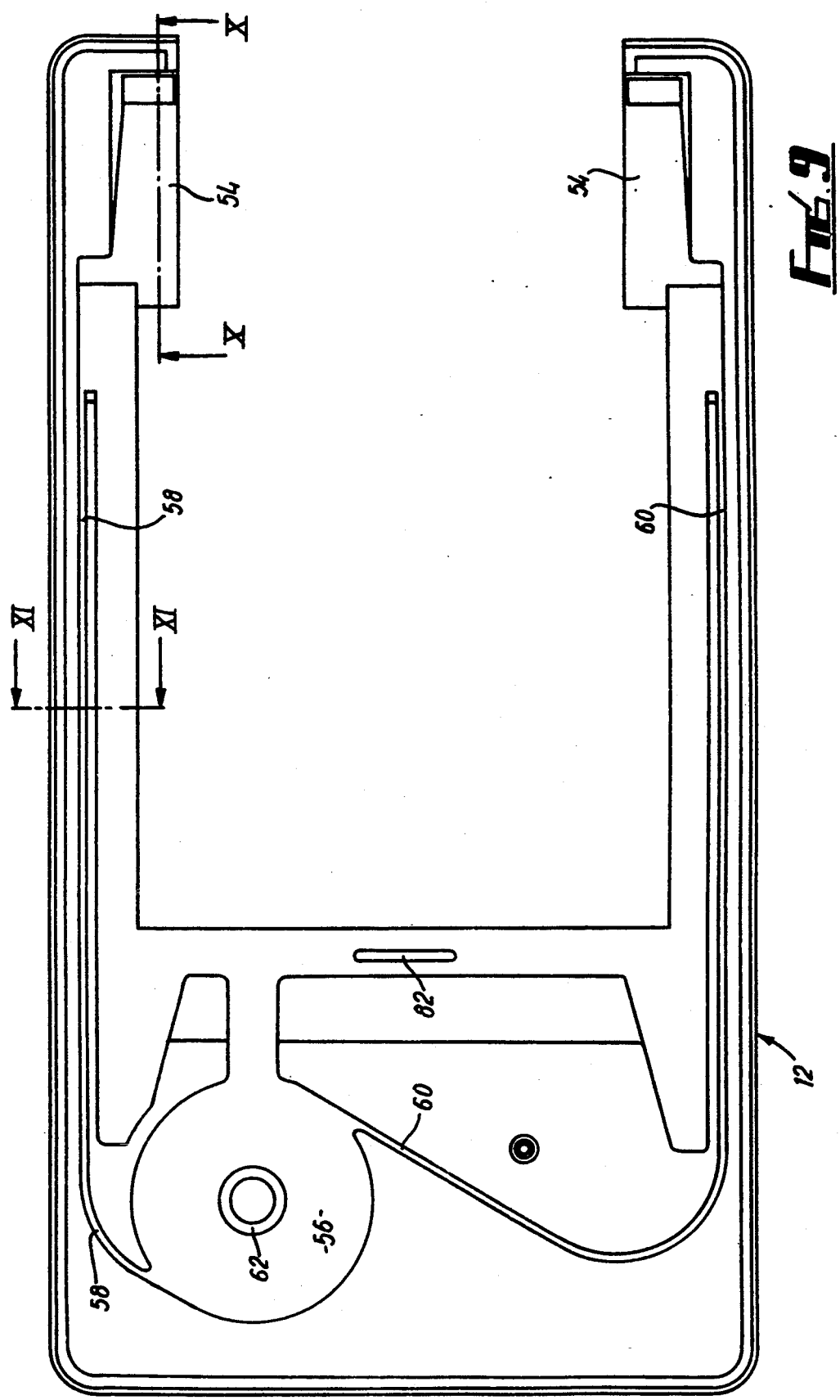

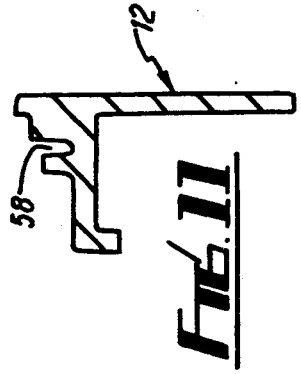
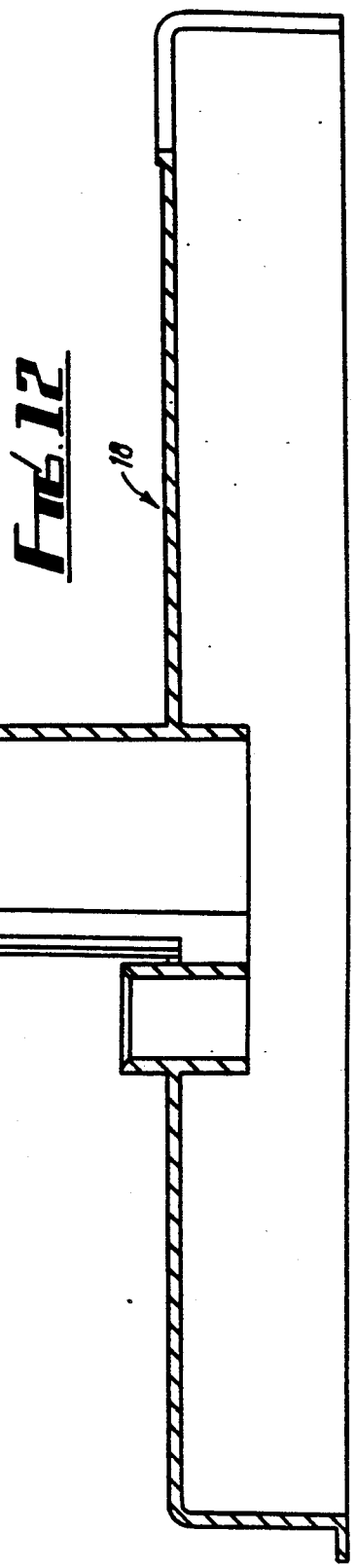
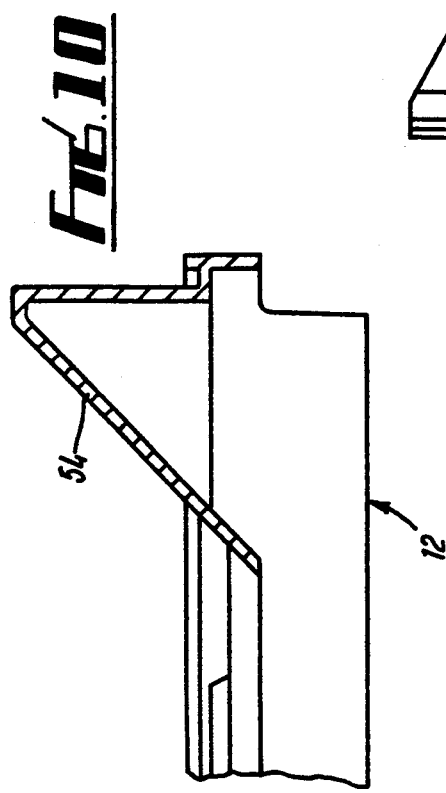

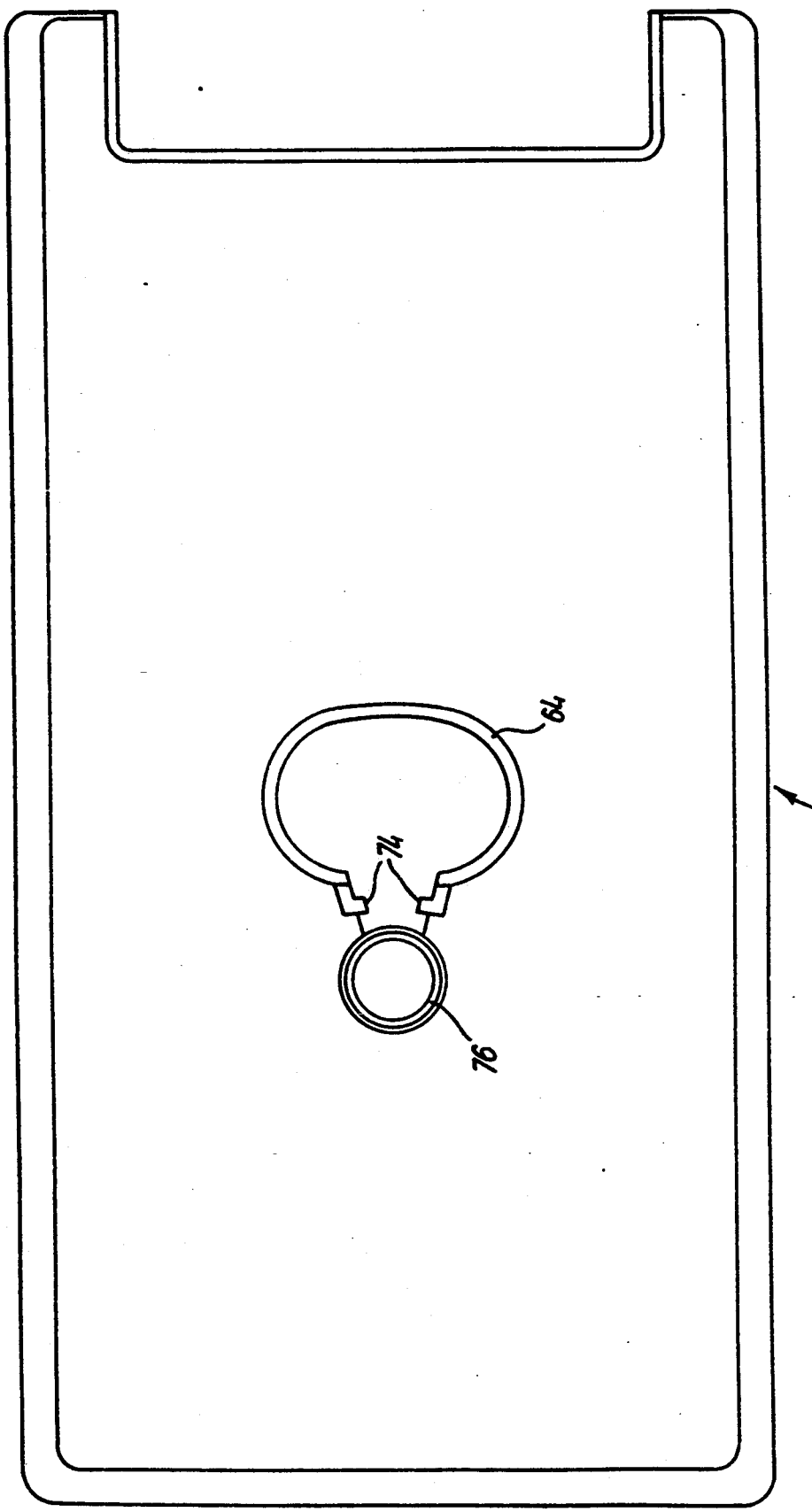

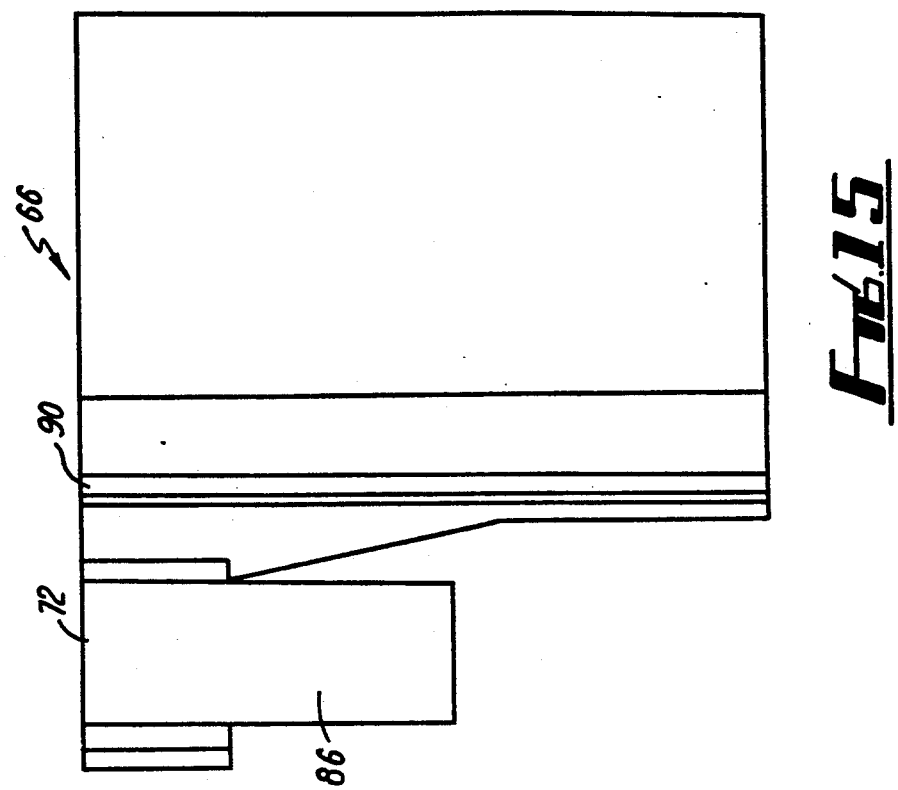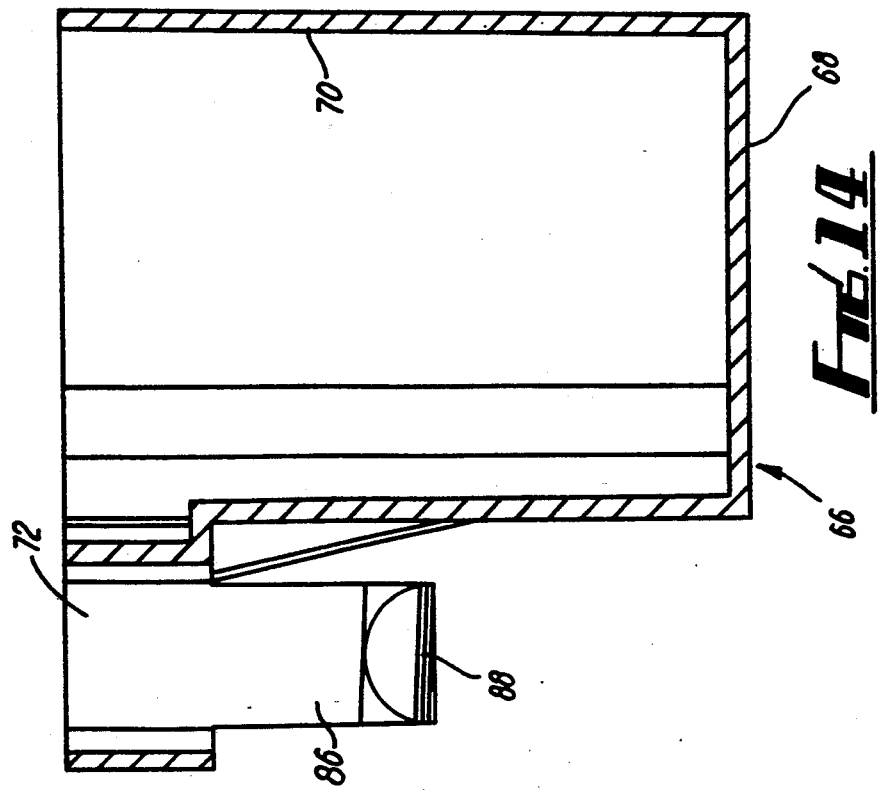

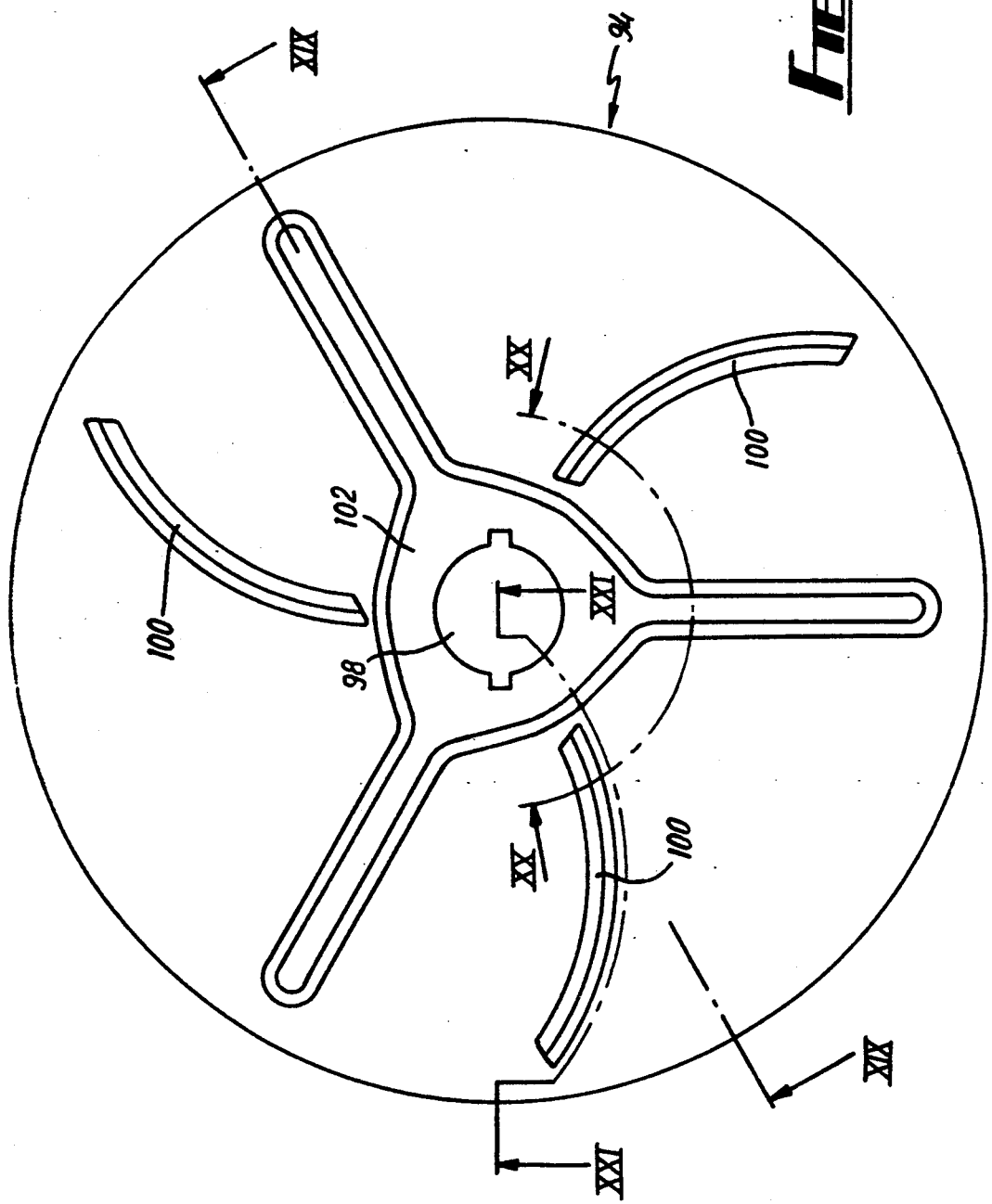

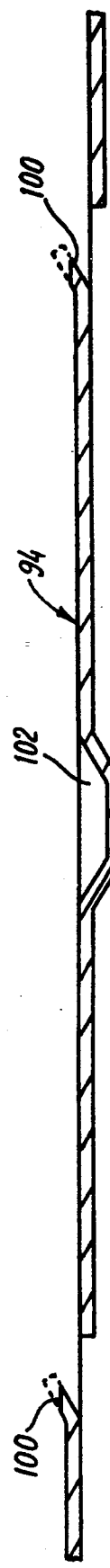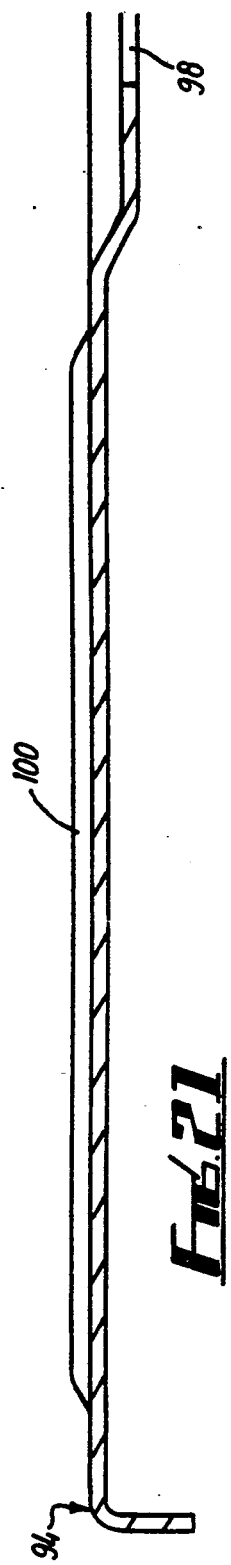

PROCESS AND EQUIPMENT FOR PREPARATION AND COOKING OF EDIBLE MATERIALS

BACKGROUND OF THE INVENTION

1. Field of the Invention

This invention relates to processes and equipment for preparation and cooking of edible materials. The invention relates more particularly but not exclusively to processes and equipment for the automatic slicing and deep frying of vegetables, especially potatoes.

References hereafter to "potato crisps" are to be taken as referring to relatively thin slices (typically 1-2 millimeters) of potato which have been totally immersed in suitably hot oil or otherwise cooked for sufficient time to render them not only cooked throughout, but also crisp throughout. (For the avoidance of doubt, what are known as "potato crisps" in the United Kingdom are generally called "potato chips" in the USA; however, these latter should not be confused with so-called "French-fried potatoes" which are commonly called "chips" in the United Kingdom and have a much greater thickness than crisps, together with an approximately square cross-section in contrast to the sheet-like proportions of crisps).

At present, potato crisps are commercially manufactured in the United Kingdom on a large scale by what are essentially industrial processes that cannot be scaled-down for practical adaptation to domestic circumstances. An underlying consideration in the industrial production of potato crisps is the necessity of the product having good storage properties such that the crisps can be cheaply packaged, distributed normally, and have a long shelf-life in ambient indoor conditions without perceptible degradation for a reliable minimum period of weeks or months. This consideration necessitates that the product be substantially completely dehydrated. In turn, this requires both precooking and cooking procedures that are impracticable on a domestic scale.

Thus, industrial potato crisp manufacture places the following restrictions on material and processes:

(A) Potatoes must be selected for low free sugar content (typically less than 0.25 per cent) singe higher sugar contents cause crisps to discolour at the high temperature needed (see below) due to carmelisation, which also gives an undesirable burnt taste;

(B) Potatoes have to be stored at temperatures above 9 degrees Centigrade (48 degrees Fahrenheit) singe low temperatures encourage the formation of free sugar;

(C) Potato slices must be washed and dried between slicing and cooking to remove surface starch which otherwise would cause the crisps to tend to stick together during cooking;

(D) A typical commercially sliced potato has a raw slice thickness of about 1.55 millimeters which can result in a tendency to ballooning during cooking, in which opposite sides of localized areas of the slice separate due to steam bubbles forming between them; this diminishes the quality of the product; and (E) Cooking is undertaken by immersing the potato slices for a period of about four minutes in oil at a temperature of at least 185 degrees Centigrade (365 degrees Fahrenheit); cooking time must be carefully controlled to achieve thorough dehydration without burning while the high temperature increases the risk of over-cooking/burning and in any event, the heat produces large quantities of malodorous hot oil vapour that would be unacceptable in a domestic environment.

In comparison to the rigorous industrial requirements, the domestic production of potato crisps should ideally meet the following criteria:

(1) Any type of potato that is ordinarily available to the domestic user should be capable of being used (and regardless of its storage conditions); i.e. free sugar content should be immaterial (with the possible limitation that slices of raw potato should be coherent and not disintegrate);

(2) Slicing should be mechanised to produce uniform slices without laborious and skilled handling of a knife;

(3) Washing and drying of potato slices should be eliminated as being particularly laborious and time-consuming if not performed by (necessarily complex) machinery;

(4) Cooking temperature should be reduced to minimise and preferably eliminate the risk of burning the crisps, and to minimise oil fumes; and (5) Despite the desirably reduced cooking temperature, cooking time is preferably also reduced to minimise perceived delays and avoid consumer impatience, but simultaneously, the cooking time should not be so critical as cause problems in quality control due to timing errors; for example, optimum cooking time may vary according to the variety of the potato being used, but the cook may be unappreciative of such varietal differences, or unable to ascertain the differences. Also, if a crisp or a fragment of a crisp fails to be removed from the cooking oil at the conclusion of the cooking cycle so as to be subjected to a second cooking cycle, this should not burn the doubly-cooked crisp (or fragment) and preferably should not even render the crisp inedible. Preferably, prolonged or even indefinitely long cooking should not degrade the crisps.

2. Description of the Related Art

It is known to provide domestic cooking equipment in the form of externally or internally heated pans filled with oil and fitted with detachable wire baskets to withdraw cooked food. Such equipment is commonly employed to fry relatively thick strips of potato to produce "chips" (in the United Kingdom usage; "French fries" in the American usage). At most, only a relatively thin crust of such chips is crisp when normally cooked. However, such equipment is unsuitable for the domestic production of potato crisps, singe the thin raw potato slices must either be individually washed and dried, or separately loaded in succession into the pan to avoid adhering to one another, which readily leads to unequal cooking times. Moreover, after a few seconds, the semi-raw slice rises to the surface where it cooks on one side only if left untended. Forced submersion or constant turning is necessary to ensure even cooking of both sides. Thus the known equipment is unsuited to semi-automatic or fully automatic cooking of potato crisps. A proposal has been made in U.S. Pat. No. 3,280,723 for a machine to slice, fry, and dispense potato crisps. The basis of this prior machine is a large trough of oil forming an endless loop in a "racetrack" configuration. Hot oil is forcibly circulated to flow around the loop in a continuous stream. A potato slicer is intermittently operated to drop slices of raw potato into the oil stream, where they are carried along in a random manner. Throughout most of the cooking process, the position of any given slice is uncontrolled. After some indeterminate lapse of time, the fried potato slices are discharged from the end of the machine. The machine is said to deliver a measured quantity of potato crisps, but in fact the quantity is set by starting and stopping what is essentially a continuous process. In contrast to the present invention, the prior machine is not a batch cooker. The prior machine entirely lacks the continuous positive control of slice position that is an important feature of the present invention from beginning to end of the slicing and cooking process. Moreover, the prior machine is a floor-mounted machine which is very much larger and heavier than any practicable domestic crisp maker; the prior machine is a commercial system designed for use in a "fast food" shop and is quite different from the present invention which is specifically designed for use on a kitchen work top or in other convenient domestic locations.

It is therefore an object of the invention to provide preparation and cooking procedures and equipment which obviate or mitigate the above-described disadvantages. While the primary object of the invention is to provide procedures and equipment particularly suited to the domestic production of potato crisps, it is also an object of the invention to provide procedures and equipment which are suitable per se, or with adaptation or modification (such as, for example by production of slices of different thickness) to the preparation and cooking of other edible materials, such as vegetables other than potatoes, fruits, and doughs. In the latter case, a ready-mixed but uncooked dough may be rolled or otherwise formed into a thin sheet whose thickness is suitable for cooking to form crisps without further preliminary reduction in thickness; in such a case, regular or irregular pieces of suitable size can be cut prior to cooking and fed to the equipment, in which case a slicing mechanism or its functional equivalent in the equipment can be bypassed, or partially or totally removed from the equipment, or omitted from the equipment as built and supplied to the user. Suitable dough mixtures may be based on flour formed from wheat, maize, manioc, or other edible farinaceous substances (or mixtures of these) and may incorporate flavouring and/or colouring. Crisp-like edible products formed from such dough mixtures are industrially manufactured and commercially sold in competition with traditional potato crisps.

References in this specification to "edible materials" include not only materials which are edible when uncooked, but also include materials which may be unpalatable or inedible when uncooked but become edible when prepared and cooked to form crisp-like products. The crisps or crisp-like products formed by the procedures and equipment of the invention may or may not have significant nutritional value, being generally in the form of a savoury confectionery.

SUMMARY OF THE INVENTION

According to first aspect of the invention, there is provided a procedure for the preparation and cooking of edible material, comprising the steps of forming unwashed and undried slices of the edible material, individually feeding said slices without washing and drying in batches of a limited number of slices into a bath of hot cooking oil, said cooking oil being maintained at temperature not less than a minimum temperature at which the edible material can be cooked but not greater than a maximum temperature above which the edible material will be burned or otherwise spoiled or degraded if cooking continues beyond a minimum period necessary to cook the slices to the required extent, whereby to cauterise the surfaces of said slices such that in subsequent stages of the cooking procedure said slices do not adhere to each other or to cooking equipment, then when said slices subsequently float to the surface of the oil due to the formation of steam bubbles on said slices, or tend so to float, forcibly submerging the slices in said hot cooking oil for a further period in which cooking of the slices is substantially completed to give the slices a crisp consistency, and finally removing the cooked slices from the cooking oil and dispensing the cooked slices.

Whether or not the edible material is sliced as part of the preparation and cooking procedure, the preliminary immersion of the uncooked slices in the hot cooking oil may be regarded as a form of preparation for the main stage of the cooking procedure insofar as the initially raw slices are prepared or pre-treated to cauterise the surfaces of the slice to obviate subsequent adherence of the slices to each other and/or to cooking equipment during the main stage of cooking and any related handling procedures. In cases where the edible material is initially unsliced, the preparation and cooking procedure further comprises the steps of individually slicing said limited number of slices from a bulk piece of edible material and substantially immediately individually transferring said slices into said bath of hot cooking oil, preferably by allowing each newly formed slice to drop under gravity into a selected portion of the oil bath. The upper limit on the number of slices in each batch may be determined empirically or by calculation, as a function of the material being cooked, the dimensions (and possibly also the temperature) of the oil bath, and an acceptable probability of non-adherence, with possible inclusion of a cooking time difference factor dependent on the time between the first and last slices of the batch entering the oil bath such that resultant variations in cooking time are acceptable, for example in terms of variations (if any) in the perceived quality of the fully cooked product as dispensed. In a preferred embodiment of the invention (detailed below), it has been found that an optimum batch size is in the range six to nine but in other embodiments a larger batch size may be used. It would be possible to cook and handle batches containing a number of slices fewer than the upper numerical limit, with a corresponding reduction in the production rate (average number of cooked slices per unit of time).

The thickness of each slice is preferably substantially constant across the slice to enhance the uniformity of the fully cooked product, but variations in thickness across the slice may intentionally be introduced, for example to produce a distinctive characteristic in the fully cooked product. While the slices may be substantially flat as cut (i.e. when cut by a planar blade or its functional equivalent), non-flat slices may be formed (for example, the corrugated or so-called "crinkle cut" slice). In any event, the slicing is preferably such that the thickness characteristics of the slices are substantially invariant from slice to slice, to enhance the uniformity of product quality. (The outline of slices may vary substantially in size and/or shape, as for example when slicing a potato, but since the thickness of a slice is the factor which dominates its cooking characteristics, transverse dimensions of a slice may vary widely without significantly affecting the cooking process). In the particular instance where the process is applied to the production of potato crisps, a preferred thickness for the slice of raw potato is about 1 millimeter, as an optimum value between excessive thickness tending to result in ballooning and splitting, and an excessive thinness resulting in the formation of brittle crisps of awkward shape.

The actual values of the previously mentioned minimum and maximum temperatures of the cooking oil will depend largely or wholly on the particular edible material being cooked. In the particular case of production of potato crisps, sliced potatoes with a higher content of free sugar will discolour when deep-fried at a temperature above 175 degrees Centigrade (347 degrees Fahrenheit). It has been discovered that by maintaining the bath of cooking oil at a temperature not exceeding 175 degrees Centigrade, and preferably at a temperature which is not more than about 5 Centigrade degrees (9 Fahrenheit degrees) above or below 165 degrees Centigrade (329 degrees Fahrenheit), thin slices of potato (with a thickness of about 1 millimeter) will cook satisfactorily, with adequate dehydration and good crispness and colour; oil fumes are reduced by cooking at about 165 degrees Centigrade instead of at the relatively high temperatures employed for industrial production of potato crisps. It has also been discovered that although only about 75-120 seconds are required to cook a potato crisp, cooking can continue without burning for up to 15 minutes at 175 degrees Centigrade, and for an indefinitely prolonged period at 165 degrees Centigrade. This is in marked contrast to the propensity for overcooking and burning at the substantially higher temperatures of industrial cooking of potato crisps.

Still in the context of cooking of potato crisps and with particular reference to the stages of cooking, it has been found that by maintaining the bath of cooking oil at 165 degrees Centigrade, 1 millimeter-thick slices of raw potato dropped into the oil bath will sink to the bottom and remain there for about 5-10 seconds. Then bubbles of steam form on the surfaces of the slices (facilitated by the absence of any preliminary drying operation) and they rise to the surface of the oil bath, where they are allowed to remain for about a further 30-45 seconds. This results in cauterisation of the slices, by which is meant that the surface starch on each slice is cooked such that the slices are no longer liable to stick to each other or to the cooking equipment. Cauterisation prepares the slices for the main stage of cooking, which includes a minimum of about 30 seconds of total immersion, and preferably about 35-55 seconds of total immersion. As mentioned above, the total cooking cycle for potato crisps lasts for about 75-120 seconds but may be considerably extended without detriment to the quality of the resultant potato crisps.

According to a second aspect of the invention, there is provided equipment for the preparation and cooking of edible materials, comprising a bath for containing hot cooking oil, heating means for maintaining cooking oil in said bath at a temperature not less than a minimum temperature at which the edible material can be cooked but not greater than a maximum temperature above which the edible material will be burned or otherwise spoiled or degraded if cooking continues beyond a minimum period necessary to cook the slices to the required extent, slice feeding means for individually feeding unwashed and undried slices in batches of a limited number into said bath, slice handling means for forcibly submerging slices which float on hot oil in said bath during normal use of the equipment, for maintaining submersion of said slices for not less than a predetermined period, and for finally removing cooked slices from the cooking oil and dispensing the cooked slices.

In cases where the edible material is initially unsliced, the equipment preferably further includes slicing means or the functional equivalent thereof for individually cutting successive slices of edible material of substantially invariant thickness characteristics, and for individually feeding said slices without washing and drying into said bath. The equipment preferably includes control means to control said slicing means to produce batches of slices containing numbers of slices not exceeding a predetermined number of slices. Where said slicing means is a rotary slicer incorporating one or a plurality of blades, said control means preferably operates to cause said rotary slicer to rotate through a predetermined angle (which may be a plurality of revolutions) which causes the blade or blades to be applied to the unsliced edible material a number of times which is equal to said predetermined number of slices. Where the rotary slicer is a cutting disc incorporating three blades, two complete revolutions of the cutting disc will produce a batch of six slices, while three complete revolutions of the cutting disc will produce a batch of nine slices.

Where the equipment includes slicing means as aforesaid, the equipment preferably incorporates feeding means for feeding the unsliced edible material towards said slicing means at a substantially constant rate during operation of said slicing means. In the particular case where said slicing means is a rotary slicer, the feeding means preferably includes a lead screw geared to rotate synchronously with the rotary slicer, the lead screw being coupled to positive forcing means for positively forcing the unsliced edible material into the rotary slicer such that in use, unsliced edible material is positively forced into the rotary slicer at a linear rate which is proportionate to number of passages per unit time of the or each blade of the rotary slicer across the unsliced edible material, at any speed of operation of the rotary slicer (including standstill), whereby to form successive slices of edible material which have mutually uniform thickness characteristics substantially independently of the rate of slice production. The positive forcing means preferably takes the form of a plunger coupled in use to the lead screw through a lead nut forming part of the plunger, the plunger travelling along a guide channel which laterally constrains unsliced edible material into a path towards the rotary slicer, such that unsliced edible material placed in said guide channel between said plunger and said rotary slicer will, in operation of the equipment, be positively forced into the rotary slicer at the proportionate linear rate. The lead nut preferably automatically disengages from the lead screw when the plunger has moved fully along the guide channel, for example by the lead nut reaching a portion of the lead screw where the lead screw thread is discontinued. Said lead nut is preferably a split nut resiliently biassed to a position in which it will clamp around and operatively engage the lead screw, said plunger preferably including counterbias means by which the split nut may be selectively counterbiassed by manual manipulation of the counterbias means to disengage the split nut from the lead screw at any selected time such that the plunger may be withdrawn from the guide channel at the end of plunger movement towards the rotary slicer or at any other selected time, thereby to enable withdrawal or replenishment of the unsliced edible material in said guide channel.

In the equipment of the second aspect of the invention, the slice handling means may comprise a scoop or paddle, preferably incorporating a plurality of perforations substantially smaller in transverse dimensions than the minimum transverse dimension of a typical slice of edible material to permit relatively free passage of cooking oil through said perforations while preventing the passage of slices therethrough; and scoop or paddle driving means operable to drive the scoop or paddle to gather the batch of newly cauterised slices and forcibly submerge the batch of gathered slices in the hot cooking oil for a period of time not less than the minimum time required to cook the slices to a crisp-like consistency, and finally to remove cooked slices from the cooking oil and dispense said cooked slices, preferably by ejecting said cooked slices from the equipment onto or into a separate receptacle such as a plate, dish, or bowl. The scoop or paddle driving means is preferably such as to cause forced submersion of the slices in a portion of the bath of hot cooking oil which is displaced from a portion of the oil bath into which the slice feeding means feeds the uncooked slices of edible material whereby to leave the latter portion of the oil bath free to receive a subsequent batch of slices.

The scoop or paddle driving means may be operable to cause the scoop or paddle to move in a combination of horizontal and vertical reciprocating movements which together result in the batch of newly cauterised and floating slices being gathered from the portion of the oil bath to which they have been fed by the slice feeding means and translated by a combination of horizontal and vertical movements to the relatively displaced portion of the oil bath where the slices are forcibly submerged, from whence they are subsequently moved by a combination of continued horizontal and upward movements to a position in which the cooked slices are dispensed, the driving means then further operating to drive the scoop or paddle to a position which completes the cycle of movement and positions the scoop or paddle to repeat the cycle of movements to handle a subsequent batch of slices. The scoop or paddle is preferably caused to move in said combination of horizontal and vertical reciprocating movements by forming an upper edge of the oil bath or a surface adjacent thereto on at least one side of the direction of horizontal movement of the scoop or paddle with a pair of substantially horizontal guide surfaces at two different heights with transitions therebetween at either end of horizontal movement, and coupling the scoop or paddle to said guide surfaces by a guide runner at the respective side of the scoop or paddle, said driving means being powered to reciprocate the scoop or paddle horizontally, the interaction of the guide runner with the guide surfaces and the transitions therebetween causing requisite vertical movements of the scoop or paddle and causing the guide runners to travel along respective guide surfaces at different heights according to the horizontal direction of motion, said driving means being intermittently powered during cooking procedures to hold the scoop or paddle in requisite positions for requisite intervals and to move between said requisite positions at requisite times whereby said slices of edible material are restrained or translated in conformity with the cooking procedure. Said pair of substantially horizontal guide surfaces with transitions therebetween may be constituted by functionally equivalent surfaces on a cam, said cam being located intermediate said oil bath and said driving means, and said guide runner being a cam follower. Alternatively, the scoop or paddle may be caused to maintain a relatively higher position during horizontal movement in one direction by interaction between the cam follower (or a mechanical equivalent) and an upper horizontal guide surface formed by an upper surface of the cam (or a mechanical equivalent), and the scoop or paddle may be caused to maintain a relatively lower position during horizontal movement in the other direction by the scoop or paddle resting on and moving along the bottom of the oil bath (as a functional substitute for the aforementioned lower horizontal guide surface).

The oil bath may be generally rectangular in plan, in which case the driving means may be coupled to the scoop or paddle to provide horizontal reciprocation thereof by two strips which are substantially inextensible but are laterally flexible, each of said strips being coupled at one end to a respective side of the scoop or paddle, both of said strips being connected at their respective other ends to a drum or pulley onto which the strips are conjointly wound or from which the strips are conjointly played out by rotation of the drum or pulley in one angular direction or the other angular direction to cause requisite horizontal movement of the scoop or paddle.

Said oil bath is preferably generally arcuate in plan, with the horizontal components of movement of the scoop or paddle being substantially circular at a substantially constant radius from an axis which is substantially vertical in use. The driving means may comprise a shaft driven to undergo angular reciprocation about a substantially vertical axis, with such driving means being coupled to the scoop or paddle to provide the arcuate horizontal reciprocation thereof by means of an arm pivotally linked to said shaft about an axis which allows said arm to rise and fall, said guide runner or cam follower being mounted on the arm to cause the arm to rise or fall in accordance with the angular position of the arm and the direction of angular movement of the arm and consequently to cause the requisite vertical reciprocation of the scoop or paddle.

The slice feeding means and the scoop or paddle driving means (or other slice handling means) are preferably both controlled by the control means for conjoint operation to synchronise the respective stages of preparation and of cooking. The equipment may have a single reversible electric rotary motor under the control of said control means, the motor being coupled through a gear box and one or more unidirectional clutches to power the slice feeding means (including the lead screw and the rotary slicer when provided) and the scoop or paddle driving means (or other slice handling means), the gear box providing mechanical linkage between functionally different sections of the equipment to achieve synchronised operation of these different sections. Alternatively, the equipment may have two electric motors under the control of said control means, one of said electric motors being operatively coupled through respective reduction gearing to said slice feeding means, and the other of said electric motors being operatively coupled through respective reduction gearing and a crank mechanism to said slice handling means. Since the slice feeding means is normally driven unidirectionally, and since the crank mechanism can be arranged to achieve the requisite cyclic reversal of the slice handling means without concomitant reversal of the respective electric motor, both of said electric motors may be unidirectionally rotatable motors that are non-reversing in normal operation.

The equipment is preferably arranged automatically to repeat the cycle of operations involved in forming, cooking and handling one batch of slices, such that while short term operation produces small batches longer term operation is effectively continuous.

In the equipment of the second aspect of the invention, the slice handling means may alternatively work in a generally rotary fashion as distinct from the generally (reciprocating) linear or arcuate versions described above. In preparation and cooking equipment incorporating rotary slice handling means, the oil bath is preferably formed as at least the lower part of a cylindrical or frusto-conical housing having a horizontal or near horizontal axis, the oil is contained in use in an annulus between the housing and a coaxially central cylindrical or frusto-conical hub, a paddle assembly consisting of a plurality of substantially equi-angularly spaced paddles is mounted upon the hub for rotation around said hub, the paddles dividing the annulus into a plurality of compartments which move around the annulus concomitantly with rotation of the paddle assembly, and the slicing and feeding means is arranged to feed the slices into a compartment which, in use, is in a position in which said compartment is incompletely filled with cooking oil when the equipment contains a normal amount of cooking oil such that a partial stepwise rotation of said paddle assembly by the angular extent of one compartment performs gathering and submersion steps of the above-described linear and arcuate versions of the equipment, and one or more subsequent partial stepwise rotations of the paddle assembly brings said compartment above the oil level to drain and dispense the cooked slices. The stepwise partial rotations of the paddle assembly preferably synchronously alternate with successive operations of the slicing and feeding means such that each compartment around the annulus will in turn perform the cooking operations on successive batches of slices. Thus at any time in sustained operation, each compartment around the annulus will be performing a succeeding one of the preparation and cooking steps. As with the linear and arcuate versions of the equipment, the rotary version of the equipment preferably has a common control means and a single electric drive motor (or two electric drive motors) with suitable gearing to couple the various functional sections of the equipment and ensure the correct relative timings of their respective operations. In the rotary version of the equipment, the slicing and feeding means may be the same as for the linear version, or it may differ to a greater or lesser extent provided that its general function is not significantly altered. In the rotary version of the preparation and cooking equipment, the preparation and cooking procedures are substantially the same as for the linear versions of the preparation and cooking equipment.

BRIEF DESCRIPTION OF THE DRAWINGS

Embodiments of the invention will now be described by way of example, with reference to the accompanying drawings wherein:

FIG. 8 is a fragmentary section, to a slightly enlarged scale, taken on the line VIII—VIII in FIG. 3;

FIG. 9 is a plan view of the deck moulding of the crisp maker of FIG. 1, shown as a separate, individual component for clarity;

FIG. 10 is a fragmentary vertical section taken on the line X—X in FIG. 9;

FIG. 11 is a vertical section taken on the line XI—XI in FIG. 9;

FIG. 12 is a sectional elevation of the crisp maker lid with integral potato guide used in the crisp maker of FIG. 1, and shown as a separate, individual component for clarity;

FIG. 13 is a plan view from above of the crisp maker lid of FIG. 12;

FIG. 14 is a sectional elevation of a piston forming part of a force-feeding mechanism incorporated in the crisp maker of FIG. 1;

FIG. 15 is an external elevation of the piston of FIG. 14 viewed in the same direction as in FIG. 14;

FIG. 18 is a plan view (from above) of a slicing disc employed in the crisp maker of FIG. 1;

FIG. 19 is a diametral sectional elevation of the slicing disc of FIG. 18, taken on the line XIX—XIX in FIG. 18;

FIG. 20 is a part-circular sectional elevation of the slicing disc of FIG. 18, taken on the line XX—XX in FIG. 18 and shown to an enlarged scale;

FIG. 21 is a curved edge-to-center sectional elevation of the slicing disc of FIG. 18, taken on the line XXI—XXI in FIG. 18 and shown to an enlarged scale;

DESCRIPTION OF THE PREFERRED EMBODIMENTS

Figure 1:
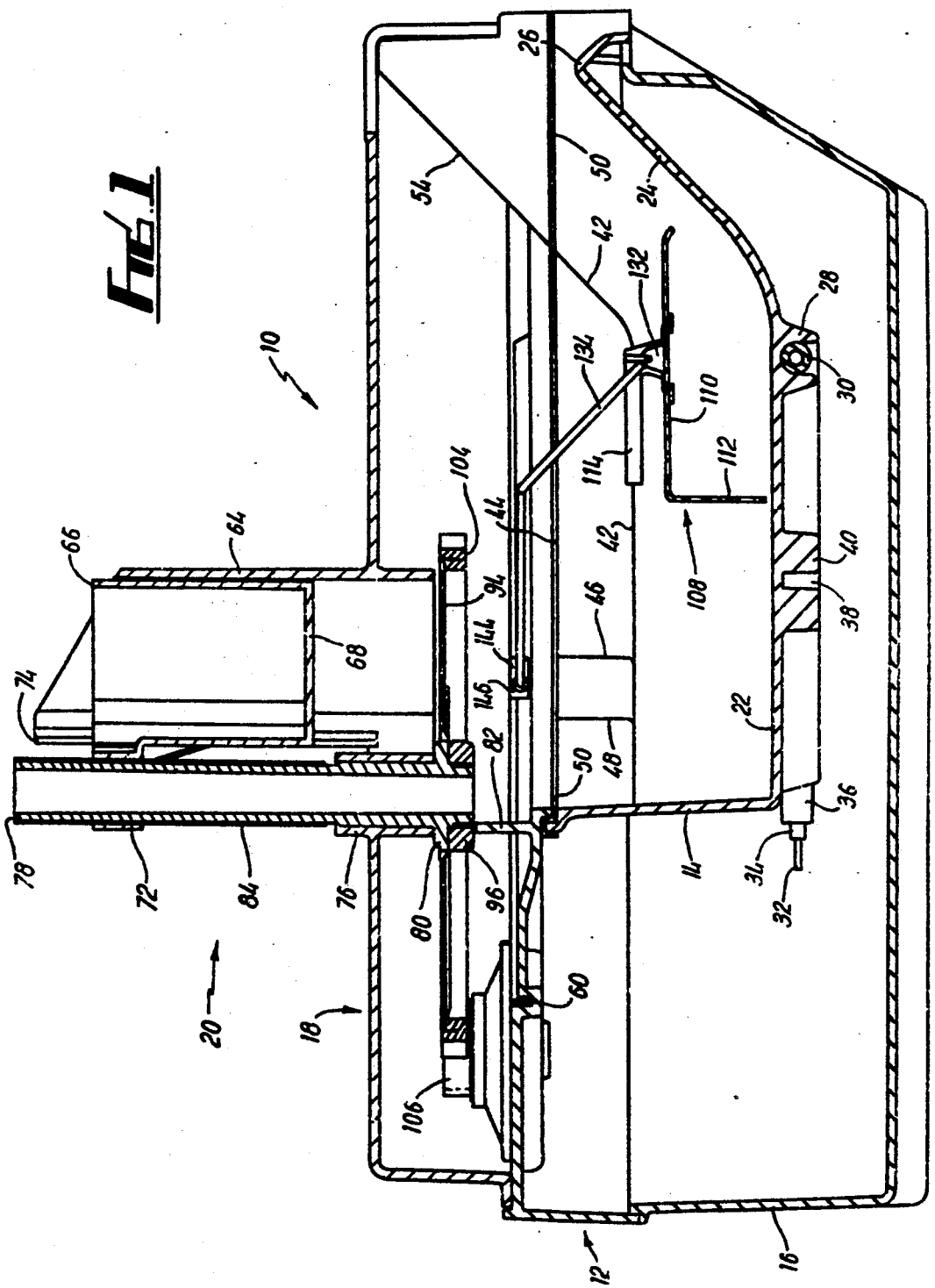
FIG. 1 is a sectional elevation of a first embodiment to crisp maker for converting raw whole potatoes to fully cooked potato crisps.
Figure 2:
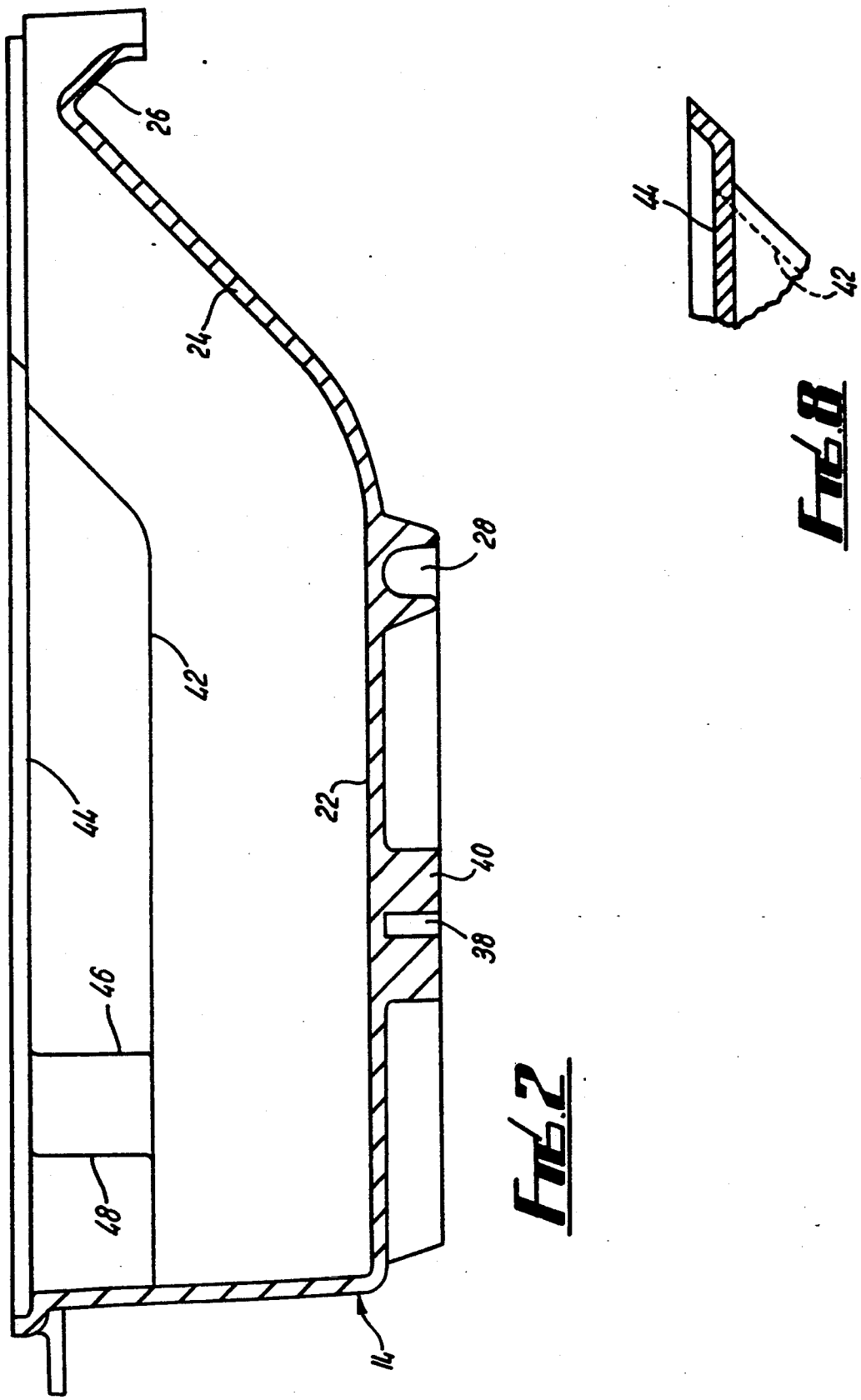
FIG. 2 is a sectional elevation of an oil bath used in the crisp maker of FIG. 1 and shown as a separate, individual component for clarity.

Referring first to FIG. 1, this shows a sectional elevation of the principal components of a first embodiment of crisp maker 10, with these components assembled in their operative configuration. The principal components of the crisp maker 10 are readily divided into three components or groups of components, as follows:

(A): a deck 12 which mounts various mechanisms (detailed below) and suspends a heated oil bath 14;

(B): a lower casing 16 which encloses the underside of the deck 12, and also supports the deck 12 above the work surface or table top (not shown) upon which the crisp maker 10 rests in use; and (C): a detachable lid 18 mounted on top of the deck 12, and which also integrally incorporates a potato feeding and slicing mechanism 20 (of which details will be given subsequently).

The lower casing 16 is a relatively simple one-piece moulding of a heat-resistant and impact-resistant polymer, such as that sold under either of the Trade Marks "Pocan" or "Procom". Besides supporting the deck 12, the casing 16 serves to prevent accidental contact with the hot exterior of the oil bath 14, and also serves as an essential safety barrier around electrical and mechanical components (not detailed in FIG. 1).

The oil bath 14 is the principal item in the cooking function of the crisp maker 10, and accordingly is detailed in isolation in FIGS. 2-8 inclusive. The oil bath 14 is a unitary pressure die-casting of aluminium alloy "LM6", or may be formed as a metal pressing. The bath 14 is shaped to have a flat floor 22 (see FIG. 2), and near-vertical walls other than the front wall 24 which is a ramp leading up and out from the floor 22 to an overcurling front lip 26. The underside of the bath floor 22 is formed with an integral channel 28 which is U-shaped in plan (see FIG. 4). The channel 28 holds an electric heating element 30 (FIG. 1) consisting of a resistance wire 32 surrounded by heat-resistant electrical insulation 34 and enclosed in an outer protective sheath 36. During operation of the crisp maker 10, the electric heating element 30 is powered so as to maintain cooking oil in the bath 14 within a desired range of temperatures. Temperature measurement can readily be carried out by a thermistor or other temperature sensor (not shown) mounted within a hollow 38 in a boss 40 moulded into the underside of the bath floor 22.

Both sidewalls of the oil bath 14 have a pair of horizontal ledges 42 and 44, at different heights along the sidewalls. (The purpose and function of these ledges 42 and 44 will be detailed at a later stage of the description.) The lower ledges 42 (FIGS. 2 and 3) run at the same height on each sidewall from the back of the bath 14 horizontally towards the front of the bath 14, where the ledges 42 curve upwards parallel to the upsloping front wall 24. The ledges 42 eventually reach the level of the upper ledges 44, immediately below the rim of the oil bath 14; this is shown generally in FIG. 2 and in enlarged fragmentary section in FIG. 8.

Returning from the front to the rear of the oil bath 14, the upper ledges 44 (both at the same height in the respective sidewalls) taper between points 46 and 48 to zero width. (The remaining width of the rim of the oil bath 14 at the same height of the upper ledges 44 is a seating for a gasket 50 which seals the oil bath 14 to the underside of the deck 12, as shown in FIG. 1).

Figure 3:
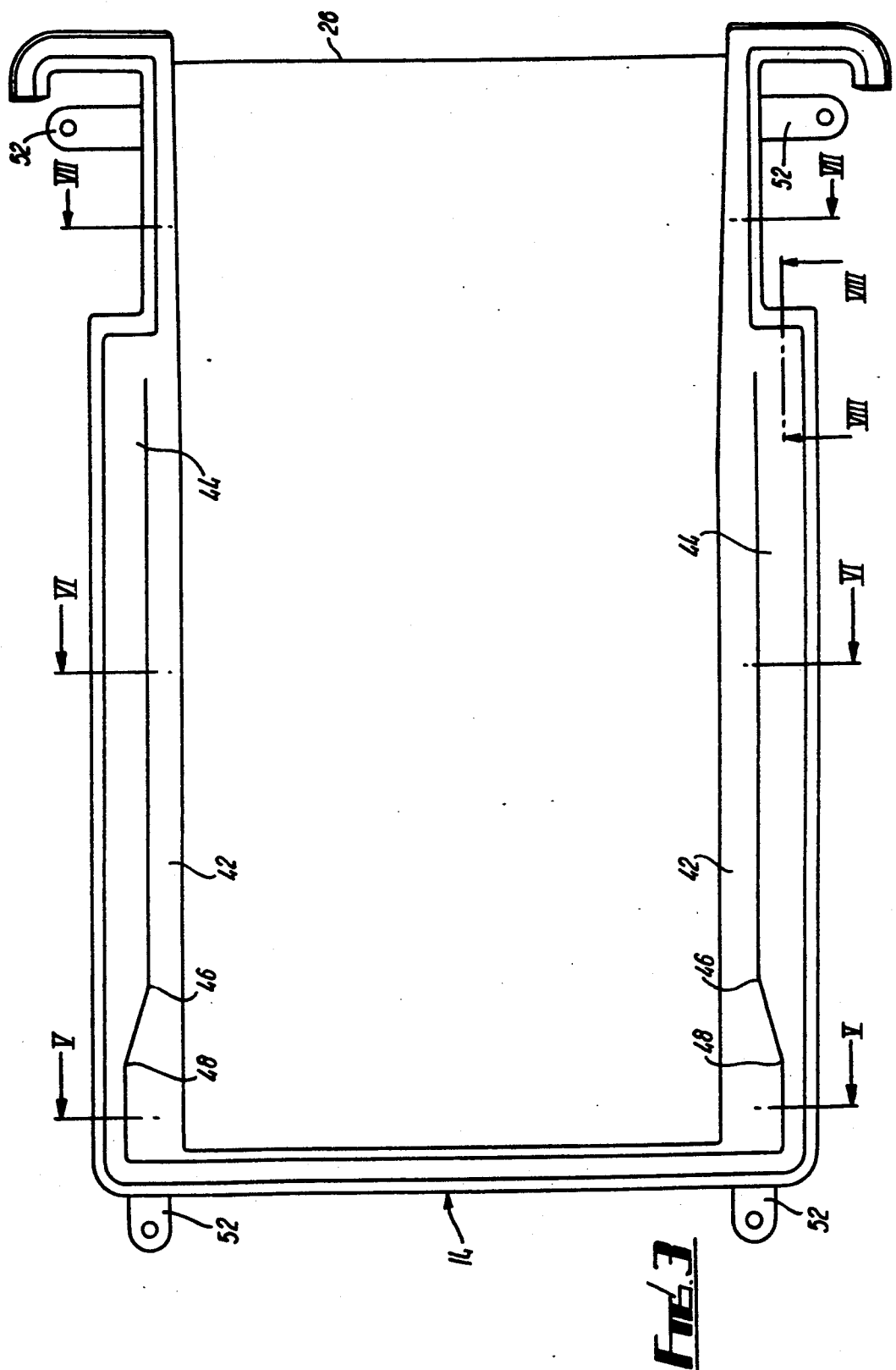
FIG. 3 is a plan view from above of the oil bath of FIG. 2.
Figure 5:
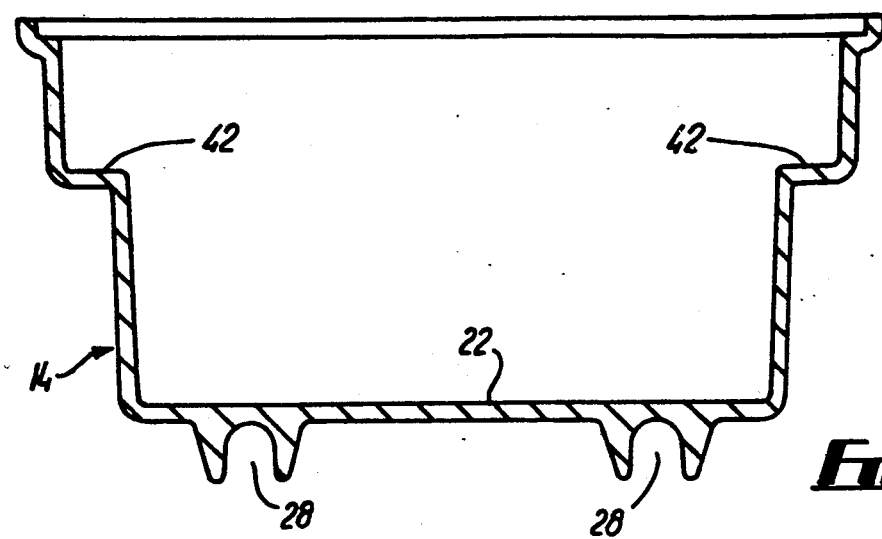
FIGS. 5, 6 and 7 are transverse sections respectively taken on the lines V—V, VI—VI and VII—VII in FIG. 3.

The rearward portion of the oil bath 14 where the upper ledges 44 have narrowed to zero width is shown in the sectional view in FIG. 5 (taken on the line V—V in FIG. 3).

Figure 6:
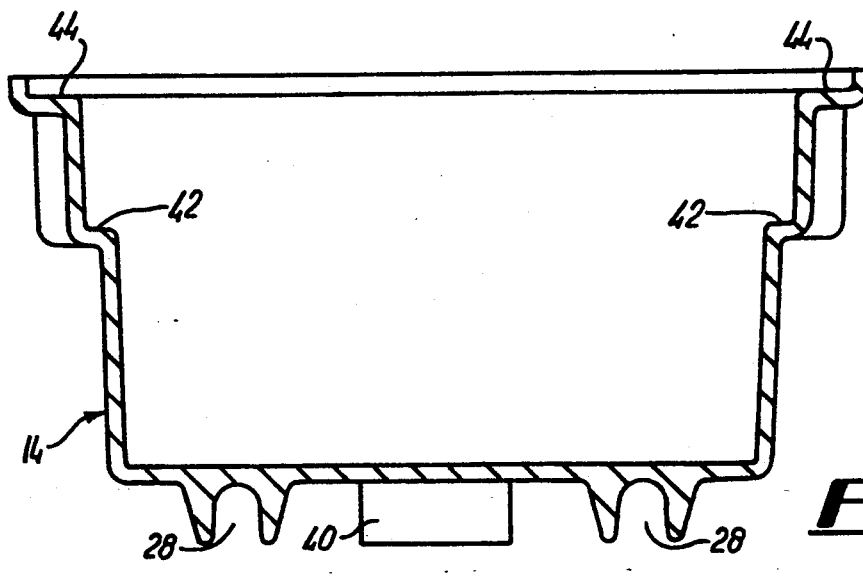
Figure 7:
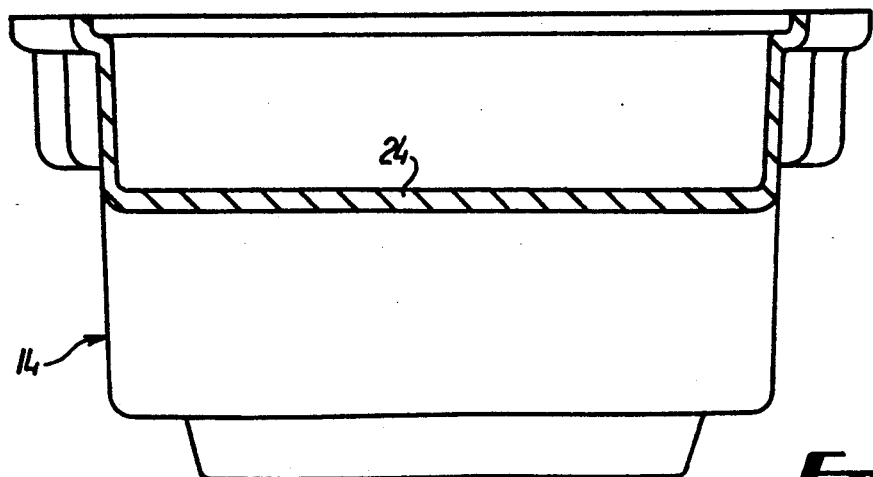
Figure 16:
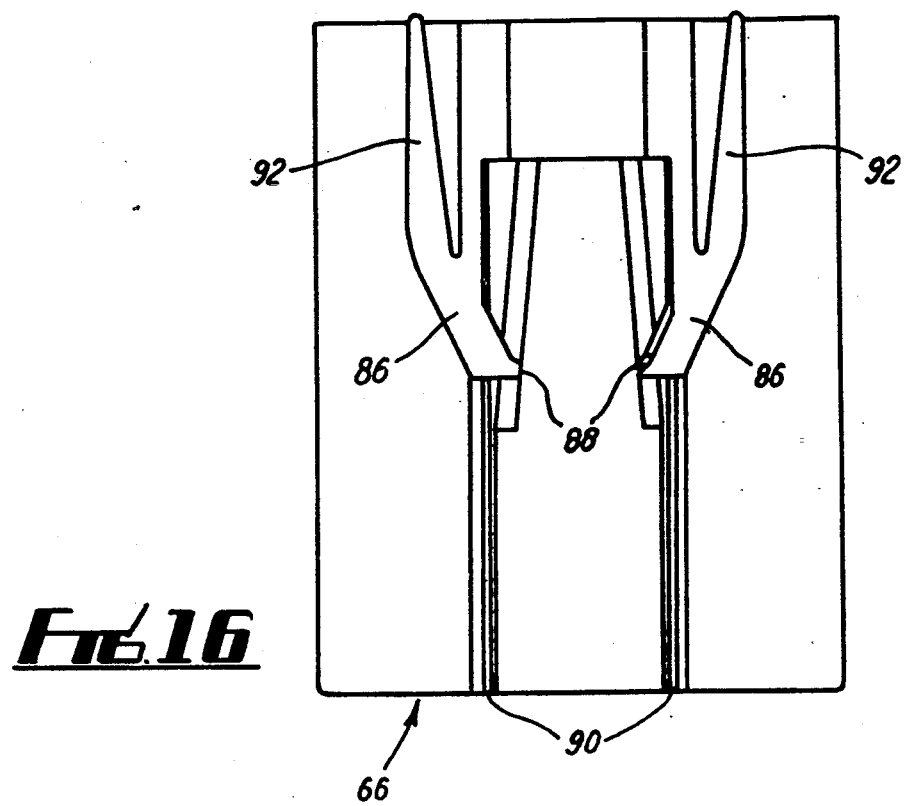
FIG. 16 is a side elevation of the piston of FIG. 15 as viewed from the left.

The mid-length portion of the oil bath 14 where the two pairs of ledges 42 and 44 coexist and run horizontally at their respective different heights is shown in the sectional view in FIG. 6 (taken on the line VI—VI in FIG. 3).

Forward of the point where the ledges 42 and 44 merge to a common level (see FIGS. 2, 3 and 8), the ledges 42 and 44 are discontinued over the major portion of the upsloping front wall 24. This is shown in the sectional view in FIG. 7 (taken on the line VII—VII in FIG. 3). The upsloping merged ledges 42 and 44 are continued as a ramp portion of the deck component 12; see FIG. 9 and especially FIG. 10, plus related description below.

Figure 4:
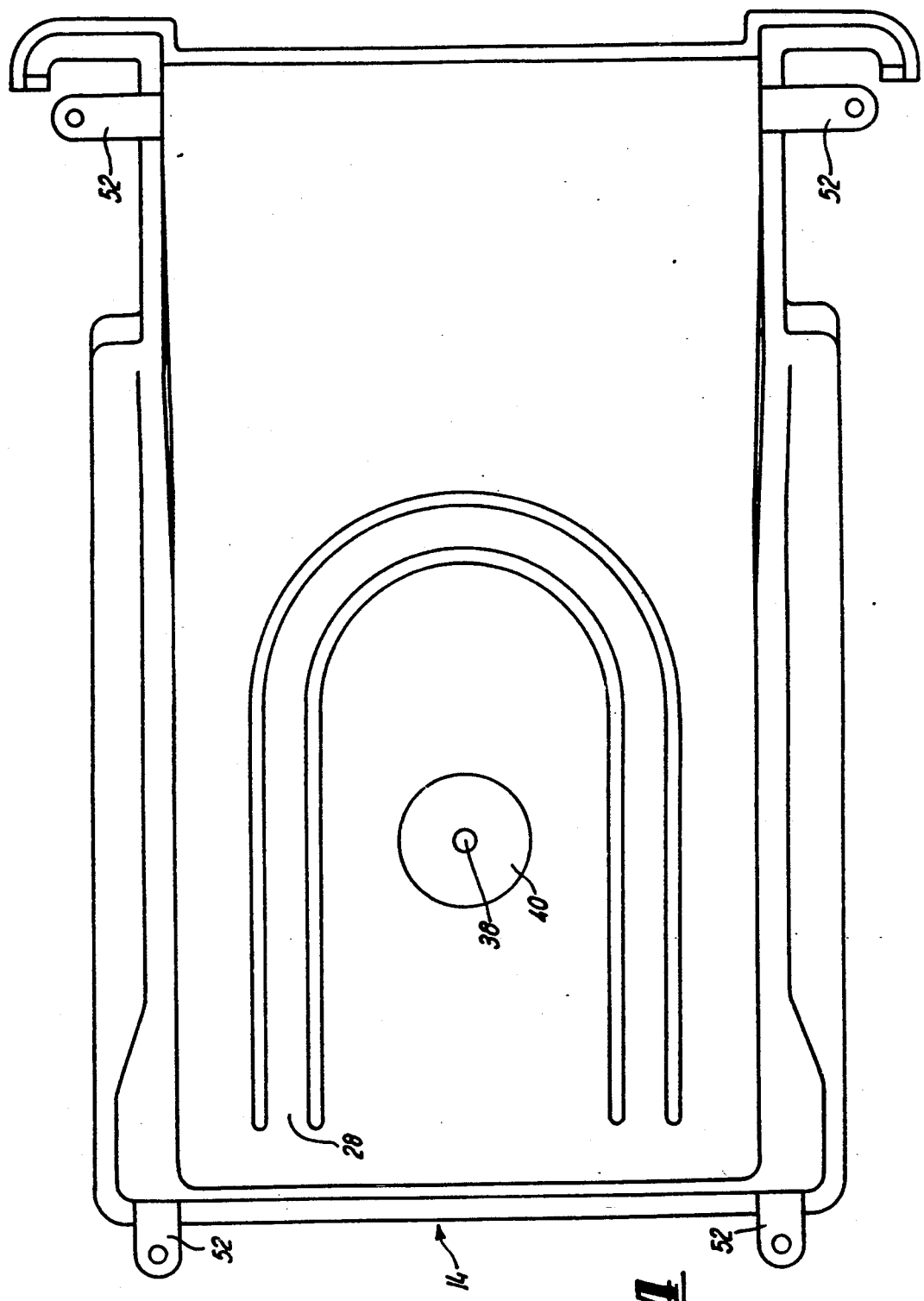
FIG. 4 is a plan view from beneath of the oil bath of FIG. 2.

The oil bath 14 is secured to the underside of the deck 12 by screws (not shown) passing through four perforated brackets 52 (FIGS. 3 and 4).

FIG. 9 shows a plan view of the deck moulding 12 in isolation from the other components of the crisp maker 10. In general outline, the deck moulding 12 is a rectiform "U", the oil bath 14 being mounted under the opening of the "U" (see FIG. 1) with the overcurling lip 26 lying across the top of the "U".

Towards the free ends of the legs of the "U" of deck moulding 12, the inner edges of these legs are formed as ramps 54 which are smooth continuations of the upwardly sloping portions of the lower ledges 42 on the sidewalls of the oil bath 14 (see FIG. 1). These ramps are shown in plan in FIG. 9 and in fragmentary vertical section in FIG. 10 (taken on the line X—X in FIG. 9).

In the relatively deep base of the "U" of the deck moulding 12 (see FIG. 9) is a circular well or recess 56 which is offset from the median line of the deck 12. Narrow channels 58 and 60 lead tangentially off the recess 56, and then curve smoothly round to follow respective paths alongside and parallel to the mutually parallel sidewalls of the oil bath 14 (when operatively assembled as in FIG. 1). The channel 58 is specifically illustrated in vertical crosssection in FIG. 11 (taken on the line XI—XI in FIG. 9). As will subsequently be detailed, the channels 58 and 60 are intended to hold and guide laterally flexible but longitudinally inelastic strips (not shown in FIGS. 9 or 11) to move a scoop or paddle to and fro through the oil bath 14. These strips are coupled (in use) to a drum (not shown in FIG. 9) which angularly reciprocates in the recess 56, and is reversibly driven by a shaft extending vertically up through an integral hollow bush 62 in the center of the recess 56. (Details of the drum and its driving mechanism will also be given below).

Referring now to FIGS. 12 and 13, these show the lid moulding 18 of the crisp maker 10 as a separate and individual component, isolated from the other components of the crisp maker 10. FIG. 12 is a vertical section of the lid 18 on its longitudinal median (corresponding to FIG. 1), while FIG. 13 is a plan view of the lid 18 (analogous to the FIG. 9 plan view of the deck moulding 12).

In general outline (see FIG. 13), the lid 18 matches the deck 12, except that rather than the "U" shape of the deck 12 (see FIG. 9), the lid 18 (FIG. 13) extends so as completely to cover the oil bath 14 (when assembled as in FIG. 1), other than for a laterally recessed portion above the bath lip 26. The lid 18 is operatively assembled on top of the deck 12 by being lowered onto the deck 12, where it is located by mating protuberances, and is preferably retained by quick-release latches.

The center of the lid moulding 18 integrally incorporates a vertical hollow chute 64 which opens into the space beneath the lid 18 at a point above the rear of the oil bath 14 (ie the end of the bath opposite the lip 26; see FIG. 1). The chute 64 has an approximately oval internal cross-section (see FIG. 13) with dimensions which are suitable for accommodating a typically-sized whole peeled potato. Singe the chute 64 acts (in use) as a guide for a force-feeding mechanism (detailed below as part of the feeding and slicing mechanism 20), its internal sides are substantially parallel and its internal cross-section is correspondingly uniform throughout.

Figure 17:
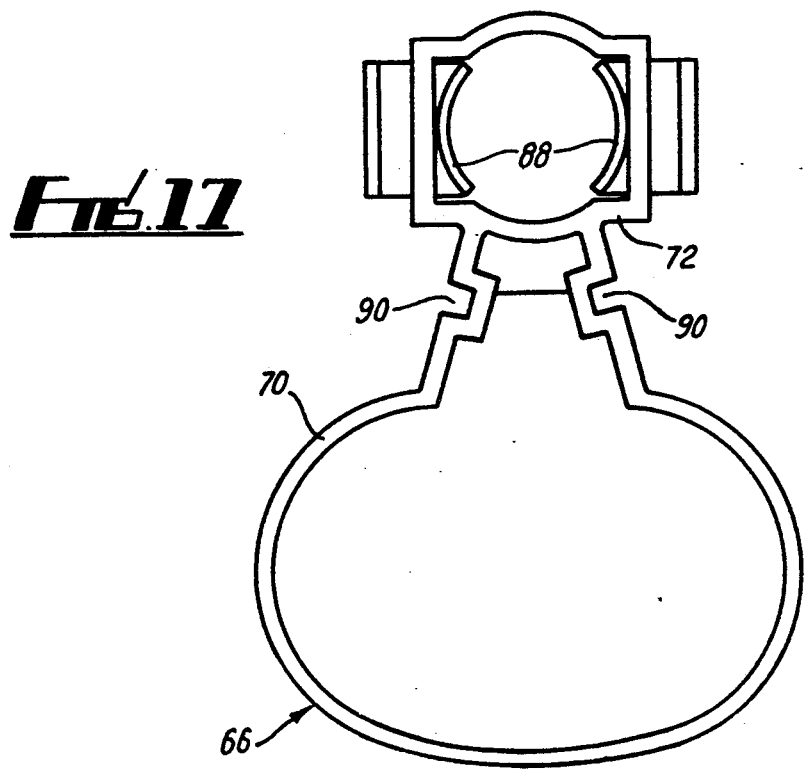
FIG. 17 is a plan view (from above) of the piston of FIGS. 14–16.
Figure 22:
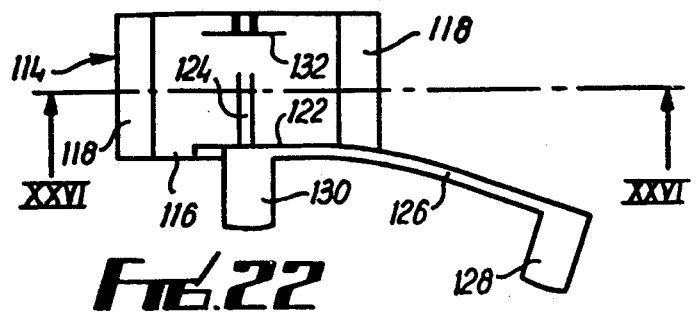
FIG. 22 is a plan view from above of a paddle runner employed in the crisp maker of FIG. 1.
Figure 23:
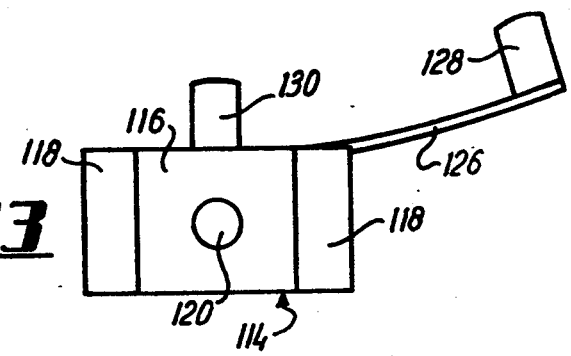
FIG. 23 is a plan view from beneath of the paddle runner of FIG. 22.
Figure 24:
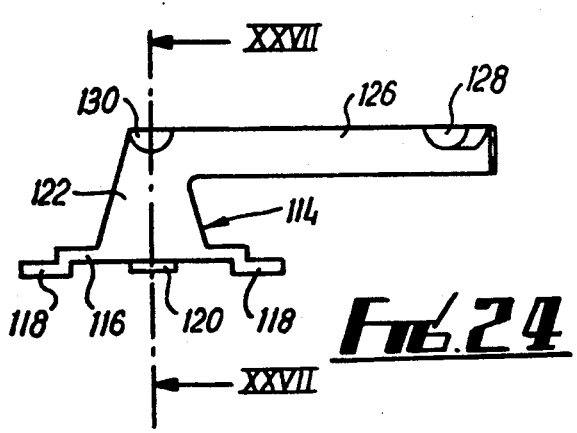
FIG. 24 is a side elevation of the paddle runner of FIG. 22.
Figure 25:
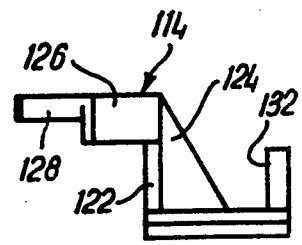
FIG. 25 is an end elevation of the paddle runner of FIG. 22.
Figure 26:
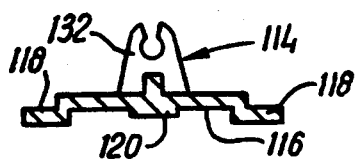
FIG. 26 is sectional elevation of the paddle runner of FIG. 22, taken on the line XXVI—XXVI in FIG. 22.
Figure 27:
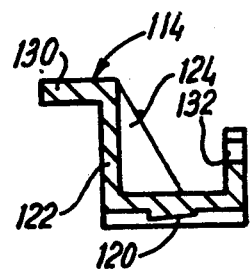
FIG. 27 is a sectional elevation of the paddle runner of FIG. 22, taken on the line XXVI—XXVII in FIG. 24.

The force-feeding mechanism includes a cup-like hollow piston 66 (FIGS. 1 and 14-17) which slides vertically within the chute 64 (see FIG. 1). The piston 66 has a lower face 68 (FIG. 14) and integral skirts 70 which are shaped in external cross-section to match the internal cross-section of the chute 64 (compare FIG. 17 with FIG. 13). The piston 66 is driven vertically within the chute 64 by downward force applied to a lateral extension 72 integral with the upper end of the piston 66.

The piston extension 72 projects out of the chute 64 through a full-height slot 74 in the rear wall of the chute 64. (The slot 74 is most clearly seen in FIG. 13, and the projection of the piston extension 72 through the slot 74 is most clearly seen in FIG. 1).

Immediately to the rear of the slot 74 in the chute 64 is a vertical spindle bearing 76 moulded integrally with the lid 18 (see FIGS. 1, 12, and 13). The bearing 76 rotatably carries a vertical spindle 78. The lower end of the spindle 78 is externally smooth so as to rotate freely within the bearing 76, while a shoulder 80 integral with the bottom of the spindle 78 limits upward displacement of the spindle 78, as shown in FIG. 1. With the crisp maker 10 assembled in its operative configuration (FIG. 1), downward movement of the spindle 78 is prevented by an upward projection 82 integral with the deck moulding 12 (see FIGS. 1 and 9).

The upper part of the spindle 78, ie the part which normally projects above the bearing 76, is formed with a thread 84 to act as a lead screw. A pair of pinger-like downward projections 86 (FIGS. 14-17) on the piston extension 72 each terminate in a respective female thread quadrant 88 which matches the right-hand thread form of the lead screw thread 84. When the spindle 78 is rotated anti-clockwise as viewed from above, engagement of the lead screw thread 84 with the part-thread terminations 88 on the projections 86 will drive the piston 66 vertically down the chute 64. Guidance of the piston 66 is assisted by in-turned projections at the edges of the slot 74 (see FIG. 13) which engage matching slots 90 (see FIGS. 15 and 17) formed in the junction of the piston extension 72 with the piston skirt 70.

Rotation of the spindle 78 (whether continuous or intermittent) will drive the piston 66 down the chute 64 until the part threads 88 drop below the bottom end of the lead screw thread 84, which is discontinued a short distance above the point at which the spindle 78 enters the bearing 76 (see FIG. 1). At this termination point (or at any other chosen moment in the descent of the piston 66), the piston 66 can be disengaged from the lead screw thread 84 by applying inwardly directed manual pressure simultaneously against both upper ends of upward extensions 92 of the projections 86 (see FIG. 16) to lever the part-threads 88 radially out of engagement with the lead screw thread 84. This allows the piston 66 to be lifted up and out of the chute 64, leaving the chute 64 free to be reloaded with another potato.

Referring again to FIG. 1, a circular slicing disc 94 is secured to the bottom of the spindle 78 by a nut 96 which clamps the disc 94 against the spindle shoulder 80. The slicing disc 94 has a central aperture 98 (FIG. 18) which is shaped to key it to the spindle 78 so that both rotate together. The slicing disc 94 is press-formed from stainless steel sheet, and as may be seen from its plan view in FIG. 18, has three equiangularly spaced curved slicing blades 100. Intermediate these blades 100, the disc 94 has a three-armed depression 102 to increase the rigidity of the disc 94 against unwanted deflection when pressure is applied to its face in operation (as will be detailed below). The three arms of the depression 102 act as pseudo-spokes, as may be seen in the diametral section shown in FIG. 19 (taken on the line XIX—XIX in FIG. 18), and in the semi-circular section shown to an enlarged scale in FIG. 20 (taken on the curved line XX—XX in FIG. 18).

FIG. 20 also includes the transverse sections of two of the slicing blades 100, and clearly shows their upstanding profiles relative to the main plane of the disc 94. The blades 100 are each formed by a combination of stamping out a curved slot, and bending up the leading (anti-clockwise) edge of the slot. The bent-up edges (shown in dashed outline in FIG. 20) are then ground down parallel to the main plane of the disc 94 to form the sharp cutting edges shown in full outline in FIG. 20. FIG. 21 is a curved edge-to-center section of the disc 94 to an enlarged scale and taken on the line XXI—XXI in FIG. 18 to show the leading edge of one of the slicing blades 100, and particularly how the blade 100 stands up from the main face of the disc 94.

Reverting to FIG. 1, it will be seen that the flanged periphery of the slicing disc 94 is embedded in a ring 104 of moulded-on polymer. The ring 104 is externally toothed, and meshes with a drive pinion 106 mounted on the deck 12 (when in the operatively assembled position shown in FIG. 1). Rotation of the drive pinion 106 turns the ring 104 and with it, the slicing disc 94. Singe the disc 94 is keyed to the spindle 78, the lead screw thread 84 rotates synchronously with the slicing disc 94.

Assuming the force feeding piston 68 to be detached to clear the chute 64, and the drive pinion 106 kept stationary, a peeled but otherwise whole raw potato is dropped into the chute 64 so as to rest on the slicing disc 94. Then the piston 66 is picked up and the extensions 92 are manually squeezed together to spread the part-threaded portions 88 of the projections 86. In this condition, the piston 66 is lowered into the chute 64 until the piston face 68 touches the potato, the lateral extension 72 simultaneously being fitted over the spindle 78, and then the extensions 92 are released to allow the projections 86 to move together again such that the part-threads 88 engage the lead screw thread 84. Next, the drive pinion 106 is energised to rotate the ring 104, and with it both the slicing disc 94 and the spindle 78, by a predetermined amount in an anti-clockwise direction as viewed from above. For example, upon causing the disc 94 to rotate anti-clockwise by exactly two complete revolutions, its three slicing blades 100 will (in normal conditions) produce six slices each of substantially uniform thickness as determined by the pitch of the lead screw thread 84 which drives the potato down onto the slicing disc 94. Similarly, by causing the disc 94 to rotate anti-clockwise by exactly three complete revolutions, its three slicing blades 100 will (in normal conditions) produce nine slices each of substantially uniform thickness. (Six or nine slices has been found by experiment to be a suitable batch size for the cooking process to be described below). The batch of raw potato slices drop individually and directly into the rear end of the oil bath 14 without undergoing any washing or drying operations. (In normal operation, the bath 14 will contain a suitable cooking oil to a depth of approximately the horizontal portion of the lower ledge 42, and this cooking oil will be pre-heated by the heating element 30 to a temperature within a predetermined narrow range as detailed below). The following description concerns the mechanism and its manner of operation to ensure proper cooking and crisping of the raw potato slices prepared by the equipment and procedures described above.

Reverting again to FIG. 1, the mechanism which is essential to the correct maneuvering of the potato slices through the oil bath 14 during the cooking process, and for subsequently removing cooked crisps from the oil bath 14, includes a movable scoop or paddle 108. The paddle 108 is formed of perforated stainless steel sheet bent into an "L" shape profile with a relatively larger horizontal upper portion 110 and a relatively smaller vertical rear portion 112. (It should be noted that the terms "horizontal" and "vertical" apply only when the paddle 108 is in the position shown in FIG. 1, singe the paddle 108 undergoes wide variations in its attitude during its complete cycle of movements). The width of the paddle 108 is slightly less than the internal width of the oil bath 14 below the lower ledge 42 (see FIGS. 5 and 6) such that the paddle 108 can move freely along the bath 14 with minimal lateral gaps. The perforations in the paddle 108 are of a size and number that cooking oil can pass relatively freely through the paddle 108 whereas all but the smallest fragments of food will not pass through these perforations.

The paddle 108 is suspended within the bath 14 by means of a pair of paddle runners 114 which are detailed in FIGS. 22-27. Each of the runners 114 is clipped into a respective pair of transverse slots in the edge of the paddle portion 110. Each of the runners 114 is in fact a mirror image of the other, and the runner 114 shown in FIGS. 22-27 is of the same "hand" as the runner 114 shown in FIG. 1. (Of the pair of runners 114, the one not shown in FIG. 1 would be a mirror image of the one shown in FIGS. 22-27).

Each runner 114 is a one-piece moulding of a resilient polymer. The runner 114 has a base consisting of a raised central portion 116 and lower side portions 118 (FIGS. 22, 23, 24 and 26). The pair of slots in the side of the paddle portion 110 forms a tongue which slips under the central base portion 116, while the side base portions 118 rest under the edges of the paddle portion 110 on either side of the tongue formed by the slots. When the gunner 114 is slipped onto the paddle tongue, a central projection 120 on the middle base portion 116 lodges in a matching perforation in the paddle tongue to lock the runner onto the paddle tongue (FIGS. 23, 24, 26, and 27). The side of the runner 114 which will be on the outer edge of the paddle portion 110 when assembled incorporates an upstanding bracket 122 braced by a diagonal buttress 124 (FIGS. 22, 24, 25, and 27). The top of the bracket 122 supports an arm 126 lying generally parallel to the base portions 116 and 118, and hence parallel to the paddle portion 110 when assembled (FIGS. 22, 23, 24, and 25). The arm 126 is formed to have a natural bias in a direction outwards of the paddle portion 110, such that when unconstrained, it assumes the naturally outwardly curved shape illustrated in FIGS. 22 and 23. However, the resilience of the arm 126 allows its free end (the end remote from the bracket 122) to be pushed inwards at least as far as to straighten the arm 126. Both ends of the arm 126 (ie the free end, and the root end at the top of the bracket 122) have respective outward projections 128 and 130 with curved undersurfaces (FIGS. 22, 23, 24, 25 and 27). The projections 128 and 130, and in particular their curved undersurfaces, run variously on the ledges 42 and 44 as detailed below in order to support the paddle 108 at required heights and attitudes appropriate to the various stages of its cycle of movements. (By way of example, FIG. 1 shows the position of the paddle 108 when both projections 128 and 130 are resting on the horizontal portion of the lower ledge 42).

Inboard of the brackets 122, the runners 114 have an upwardly projecting clip 132 (FIGS. 22, 25, 26, and 27). In the assembled crisp maker 10 (FIG. 1), the clip 132 of the runner 114 at each side of the paddle 108 pivotally links to a heavy wire loop 134. The outer ends of the wire loop 134 are pivotally coupled in turn to the previously described flexible but inextensible strips that run in the channels 58 and 60 (FIGS. 9 and 11) and are reciprocated by the drum turning in the recess 56 (FIG. 9). These components will now be detailed with reference to FIG. 28.

Figure 28:
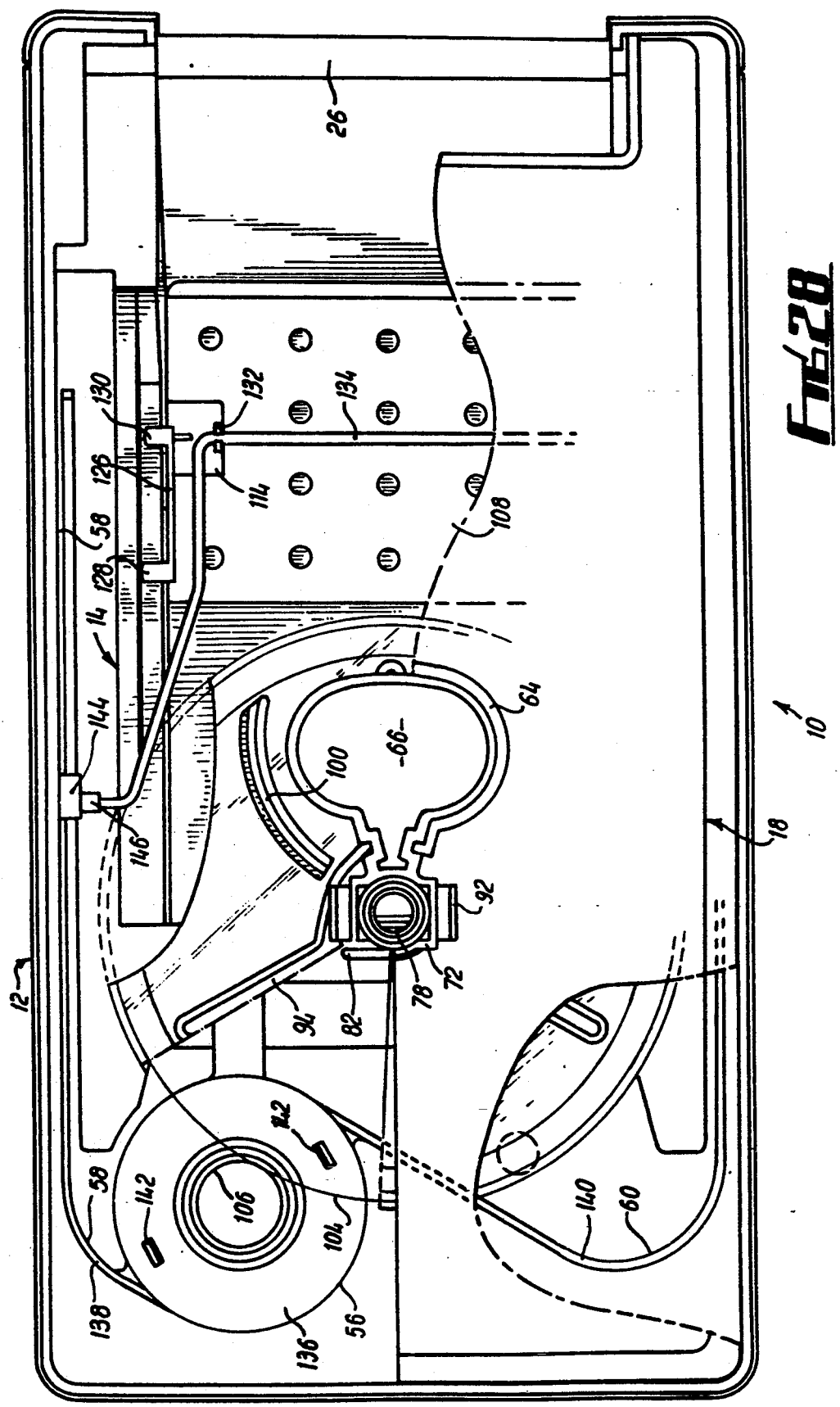
FIG. 28 is a plan view from above of the crisp maker of FIG. 1, with various parts cut away to reveal other underlying components normally hidden from view.

FIG. 28 is a plan view of the assembled crisp maker 10 of FIG. 1, but with various components more or less cut away, or shown in outline only, in order to reveal underlying components that are normally hidden from view, and to clarify the interrelationship of the components.

FIGS. 1 and 28 together show the overall shape of the heavy wire loop 134 which drives the paddle 108, and the manner in which they are pivotally linked via the clips 132 on the runners 114. FIG. 28 also shows the paddle runner arms 126 forced into a straightened out configuration by the outer ends of the projections 128 being forced inwards by contact with the sidewalls of the bath 14 immediately above the lower ledge 42.

In FIG. 28, the recess 56 in the deck 12 (FIG. 9) contains a drum 136 which is coaxial with the drive pinion 106 but rotates independently thereof. The channels 58 and 60 (FIG. 9) hold elongated flexible but inextensible strips 138 and 140 which are each wrapped partially around the drum 136 in a peripheral grove and then anchored in slots 142. The strips 138 and 140 extend from the drum 136 along their respective slots 58 and 60 to terminate at points directly opposite each other alongside the oil bath 14. (Owing to the lateral offset of the axis of the drum 136 from the median of the crisp maker 10, the strips 138 and 140 will necessarily have different lengths so that their ends remote from the drum 136 will be exactly mutually opposite.)

Only the non-drum end termination of the flexible strip 138 is shown in FIGS. 1 and 28, and this termination consists of an integrally moulded projection 144 which extends upwards out of the strip slot 58 (compare with FIG. 11) and then inboard of the slot 58 to finish in a hollow cylindrical socket 146. (The corresponding termination of the flexible strip 140 is a mirror image of the projection 144 and socket 146). The ends of the heavy wire loop 134 plug into the socket 146 and the corresponding socket (not shown) at the end of the strip 140, the wire 134 having a resilience and slight outward bias to retain its ends securely in these sockets. The wire 134 now provides a double-pivoted link between the paddle 108 and the strips 138 and 140. Hence angular reciprocation of the drum 136 will translate to horizontal reciprocation of the paddle 108. However, the interaction of the projections 128 and 130 on the paddle runners 114 with the ledges 42 and 44 (plus the ramp extension 54) will result in the front and rear of the paddle 108 assuming different absolute and relative heights at different horizontal positions, as will now be detailed.

Starting with the paddle 108 in the position shown in FIG. 1 (which is slightly in advance of the position shown in FIG. 28), clockwise rotation of the drum 136 (as viewed from above) causes the strips 138 and 140, the wire loop 134, and ultimately the paddle 108 to move forward (to the right as viewed in FIGS. 1 and 28). Shortly in advance of the FIG. 1 position, first the runner projections 130 and then the runner projections 128 will start up the forward slope of the lower ledge 42 so that the paddle 108 will follow the upsloping forward wall 24 of the oil bath 14. As forward movement of the paddle 108 continues, first the projections 130 and then the projections 128 will leave the forward end of the ledge 42 but continue without interruption up the ramp surfaces 54 formed on the deck 12. This movement continues until the paddle portion 112 has reached the lip 26 at the top of the slope 24; this will result in any crisps or other objects under the paddle 108 being swept out of the oil bath 14 over its forward edge 26, while the cooking oil will drain back into the bath 14 through the perforations in the paddle 108 and around the clearances between the paddle edges and the bath sidewalls. At this point, clockwise rotation of the drum 136 is stopped, preferably for a period of at least five seconds to ensure reasonably complete drainage of surplus cooking oil from the newly cooked crisps.

Next, the drum 136 is reversed to turn anti-clockwise and pull the paddle 108 back down the ramp 54. As the projections 128 reach the foot of the ramp 54 and the commencement of the upper ledge 44 (see FIG. 8), the previously-described outward bias of the resilient arms 126 causes the projections 128 to spring outwardly so that they now rest on the upper ledge 44. As the paddle 108 continues generally backwards (leftwards as viewed in FIGS. 1 and 28), the projections 128 will run at their now wider mutual spacing on the upper ledge 44, while the projections 130 will continue back down the lower ledge 42 singe the projections 130 are rigidly mounted at a constant separation (see FIG. 6). The result is that the paddle portion 112 is considerably lifted above the bath floor 22, and the lower edge of the portion 112 will travel above the peak level of cooking oil in normal circumstances. Simultaneously, the other edge of the paddle portion 110 is lowered owing to the overall inclination of the paddle 108, and will sweep through the cooking oil in normal circumstances. This has the effect of sweeping partly-cooked crisps floating on the surface of the cooking oil in the bath 14 towards the back of the bath 14, as will subsequently be described in greater detail.

Further backward movement of the paddle 108 will bring the projections 128 along the upper ledges 44 past the transition point 46 where the bath 14 effectively widens (compare FIG. 6 to FIG. 5), such that when the projections 128 approach or reach the points 48 of maximum bath width, the projections 128 will drop back down to the lower ledge 42 under the weight of the paddle 108 and its associated components, the pivotal connections of the wire loop 134 at the clips 132 and the sockets 146 permitting the necessary rotational re-alignment of the components under gravity.

When the paddle 108 has reached the rear of the oil bath 14 and dropped back down to its lower level, anti-clockwise rotation of the drum 136 is terminated. Subsequent clockwise rotation of the drum 136 will return the paddle 08 horizontally towards the position shown in FIG. 1, at a level such that the entire paddle 108 is totally submerged in cooking oil in normal circumstances. In this latter stage of the cycle of movement of the paddle 108, potato slices under the paddle 108 will be held forcibly submerged in hot cooking oil, even if they would otherwise float to the surface.

Movement of the paddle 108 does not take place on a continuous basis, since cooking operations are facilitated by intermittent movement of batches of potato slices from one place to another within the oil bath 14, with pauses for the various stages of the cooking process to be carried out, and ultimate movement of cooked crisps out of the bath 14 to dispense them to the consumer. During or between certain stages of movement of the paddle 108, the potato feeding and slicing mechanism 20 will be operated to produce the requisite batches of potato slices.

A preferred sequence and timing of functions and movements will now be described, it being assumed that the oil bath 14 is filled to approximately the level of the lower ledge 42 with an appropriate cooking oil, and that this oil is being maintained by the heating element 30 at a temperature which is not more than five Centigrade degrees above or below a preferred temperature of 165 degrees Centigrade. The oil-submerged portion of the bath 14 is nominally divided into a rear portion and a front portion ("rear" being to the left as viewed in FIGS. 1 and 28, and "front" being further rightwards towards the forward lip 26), the front portion being approximately that occupied by the paddle 108 when in the position shown in FIGS. 1 and 28.

Stage 1: With the paddle 108 stationary in the position shown in FIGS. 1 and 28, and with a raw whole peeled potato in the chute 64 with the piston 66 clamped on top, the drive pinion 106 is rotated to turn the cutting disc 94 through exactly two complete revolutions to cause six unwashed and undried slices of raw potato to drop directly and immediately into the rear portion of the oil bath 14. Stage 1 lasts for approximately ten seconds. (Alternatively, three complete revolutions of the cutting disc 94 could be employed to form a batch of nine slices in about fifteen seconds).

Stage 2: With the paddle 108 still stationary in the position shown in FIGS. 1 and 28, the six (or nine) slices of raw potato initially drop to the bottom of the hot cooking oil in the rear of the bath 14. There the potato slices commence to cook, with surface starch being the first portions of the slices to become semi-cooked. This causes the potato slices to lose their previous tendency to stick to each other and to components of the crisp maker 10, and can be regarded as a form of cauterisation applied to the potato slices. Stage 2 lasts for approximately thirty to forty-five seconds (depending on when the slices fell into the oil), and towards the latter part of stage 2, the "cauterised" potato slices become coated in tiny steam bubbles as their internal moisture boils, such that the slices rise to the surface of the hot cooking oil.

Stage 3: The paddle 108 is caused to undergo one complete cycle of movement as described above. Since during the return of the paddle 108 from the front of the bath 14, the paddle portion 112 is raised and then drops down as the paddle 108 reaches the rear of the bath 14, and remains lowered as the paddle 108 returns forwardly to its initial position as shown in FIG. 1, this has the result of scooping the floating semi-cooked slices of potato resulting from stage 2 above, forcibly submerging these slices in the hot cooking oil, and forcibly transferring them to the aforesaid front portion of the bath 14. Stage 3 has a duration of approximately ten seconds, and in normal operation will clear the rear portion of the oil bath 4 of pieces of potato. (The preparative cooking phase of stage 2 ensures that during the main cooking phase which includes and follows stage 3, the slices will not adhere to each other).

Stage 4 is a repeat of stage 1, in that a further six (or nine) slices of unwashed and undried raw potatoes are cut and dropped directly into the rear portion of the oil bath 14 (emptied of the previous batch of slices by stage 3). As with stage 1, stage 4 occupies about ten or fifteen seconds.

Stage 5 is a repeat of stage 2 with respect to the last-cut batch of potato slices in the rear portion of the oil bath 14, but stage 5 differs from stage 2 in that the previously-cut batch of potato slices is still being cooked by being held under the surface of the hot cooking oil in the front portion of the oil bath 14, by means of the paddle 108. As with stage 2, stage 5 occupies about thirty to forty-five seconds. However, the combined durations of stages 3 and 5 results in a total submerged cooking time of about 35 to 55 seconds.

Stage 6 is a repeat of stage 3 in that the paddle 108 is caused to undergo one complete cycle of movement. This results in the now-cooked crisps held under the paddle 108 in the front portion of the oil bath 14 being bulldozed out of the bath 14 over the forward lip 26 (preferably onto a suitably located plate or container), with surplus cooking oil draining back into the bath 14. The paddle 108 is preferably held stationary for about five seconds to assist the drainage of surplus cooking oil. The return part of the movement of the paddle 108 scoops up the last-cut batch of crisps from the rear portion of the oil bath 14 and forcibly transfers them to a submerged position in the front portion of the oil bath 14. Stage 6 occupies about ten seconds.

The above cycle of stages 4, 5 and 6 can be repeated indefinitely, with replenishment of the chute 64 with further potatoes at suitable intervals, and, if necessary, occasional topping-up of oil in the bath 14. Thus in normal circumstances (and after start-up), a batch of six or nine fully-cooked potato crisps will be dispensed from the crisp maker 10 every fifty five to eighty seconds or so. The complete cooking time for a given batch of crisps is about ninety five to one hundred and forty seconds, the production of a batch every fifty five to eighty seconds being a consequence of the overlap of cooking cycles due to the simultaneous cooking of two successive batches of potato slices in the rear and front portions of the oil bath 14. This production rate of up to about one hundred and five crisps in a fifteen minute period is equivalent to four standard-sized bags of commercially manufactured crisps.

As an alternative to complete cycles of movement of the paddle 108 being performed without interruption. The paddle 108 may be caused to undergo one or more pauses on the upsloping forward face 24 of the oil bath 14 (to improve the drainage of oil from freshly cooked crisps), and/or to pause briefly with the paddle portion 112 on the forward lip 26 (to ensure that the cooked crisps drop free of the paddle 108). The duration of various stages of the above-described cooking cycle can be selectively varied by the operation of suitable timing controls (not shown) to tailor the quality of the fully cooked crisps to the preference of the users.

Figure 29:
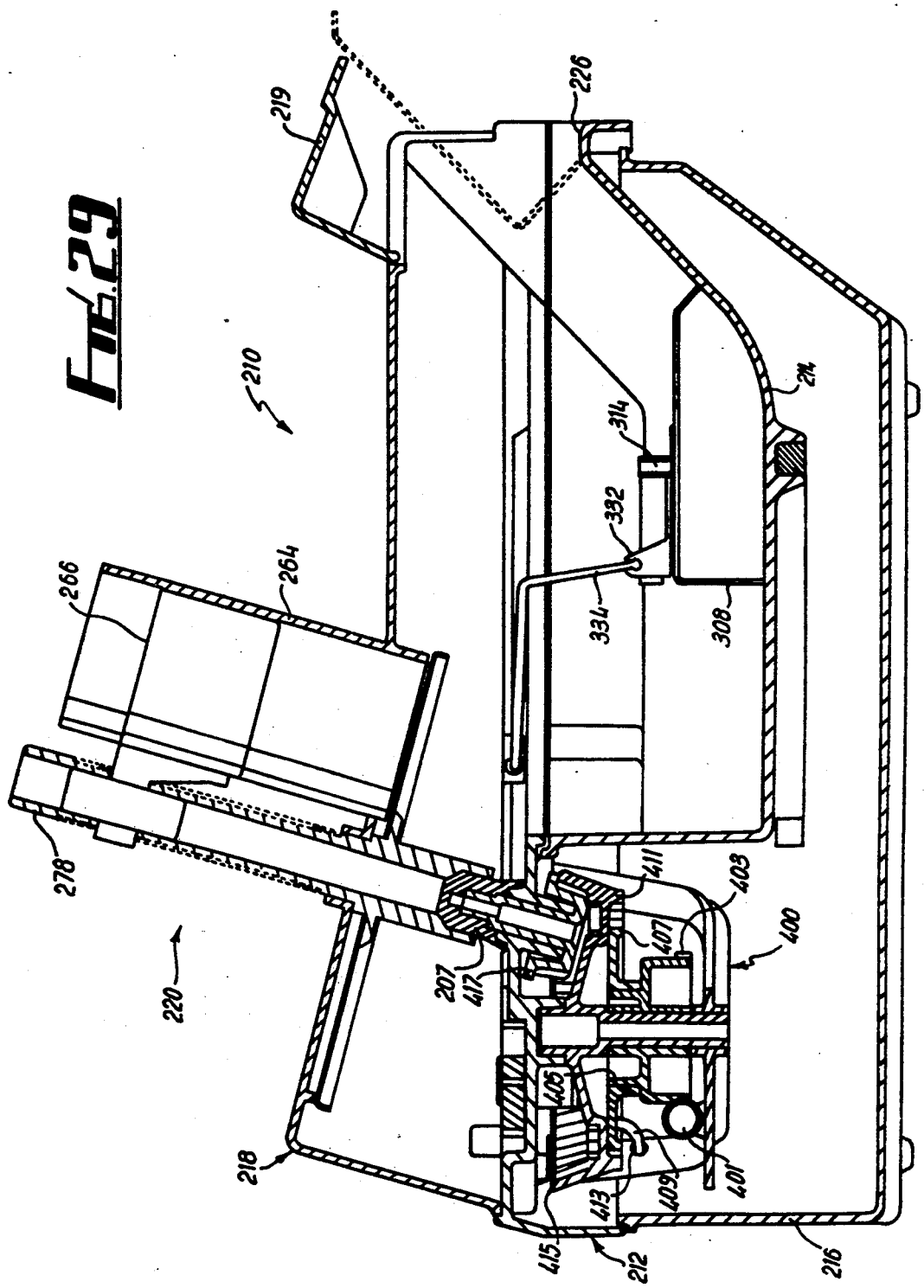
FIG. 29 is a sectional elevation of a second embodiment of crisp maker for converting raw whole potatoes to fully cooked potato crisps.
Figure 30:
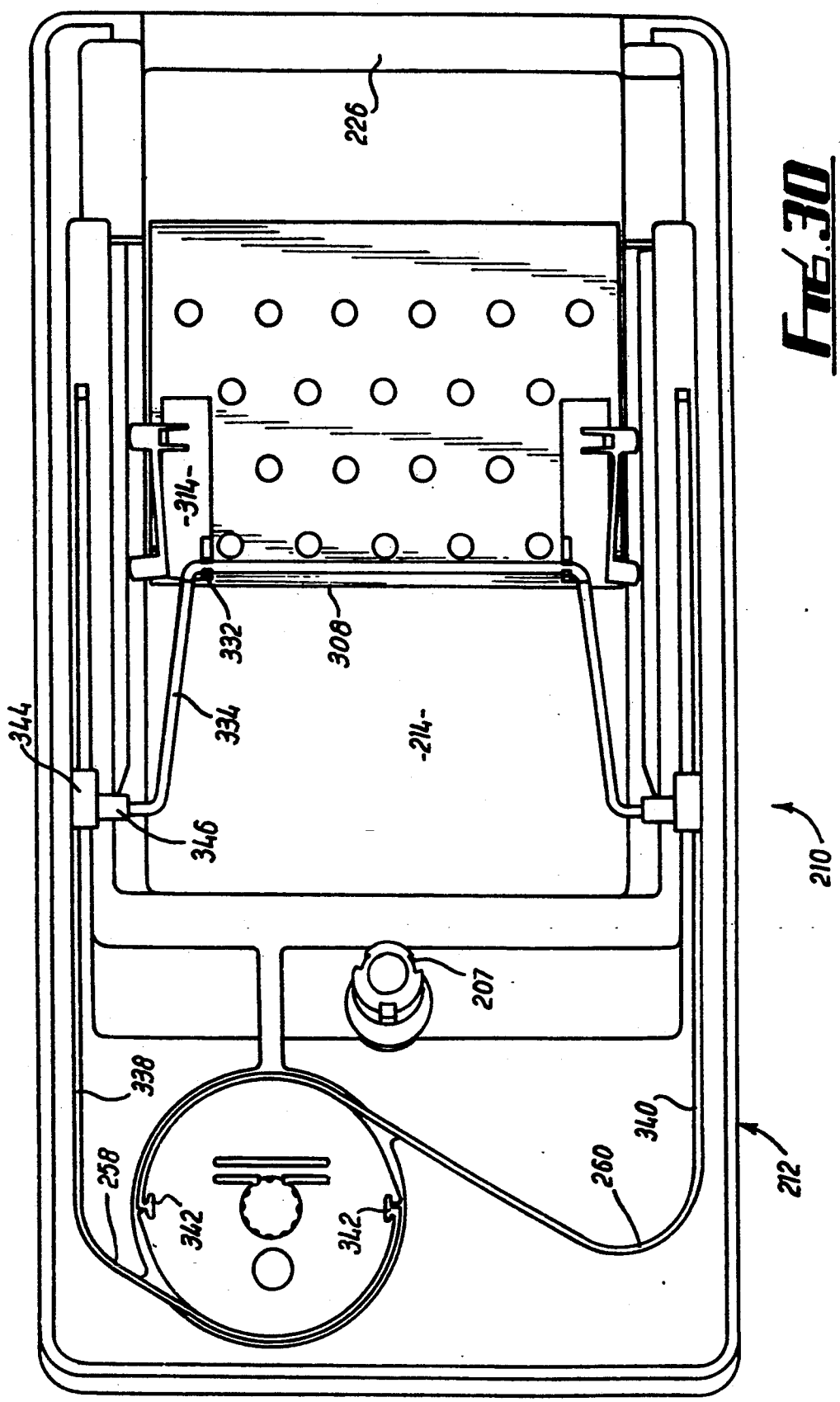
FIG. 30 is a plan view from above of the second embodiment of FIG. 29, with its upper lid and related components removed.

A second embodiment of crisp maker 210 is shown in FIGS. 29 and 30. FIG. 29 is a median sectional elevation corresponding to FIG. 1, while FIG. 30 is a plan view from above of the second embodiment 210 wit its lid removed.

The second embodiment of crisp maker 210 is generally similar to the first embodiment 10 (FIGS. 1-28), and therefore the following description will concentrate upon the principal differences of the second embodiment 10. To facilitate cross-reference between the two embodiments, parts of the second embodiment 210 which are structurally and/or functionally equivalent to corresponding parts of the first embodiment 10 are given the same reference numeral but prefixed by a "2" or a "3" (ie the second embodiment reference numeral is the equivalent first embodiment reference numeral plus 200). In respect of those parts of the second embodiment 210 which are not specifically described below, reference should be made to the equivalent parts of the first embodiment 10 for relevant details.

The second embodiment of crisp maker 210 is in three components or groups of components, as follows:

(A): a desk 212 which mounts various mechanisms (detailed below or in respect of the first embodiment 10) and suspends a heated oil bath 214;

(B): a lower casing 216 which encloses the underside of the deck 212, and also supports the deck 212 above the work surface or table top upon which the crisp maker 210 rests in use; and (C): a detachable lid 218 mounted on top of the deck 212, and which also integrally incorporates a potato feeding and slicing mechanism 220.

A manifest difference in the crisp maker 210 over the first embodiment 10 lies the feeding and slicing mechanism 220 in general, and its spindle 278 in particular, being off-vertical and tilted towards the front of the crisp maker 210 (the right side as viewed in FIGS. 29 and 30). Also, instead of the spindle 278 being driven indirectly through a peripheral drive to the cutting disc (94, FIG. 1), the spindle 278 is driven directly by being fitted onto a trilaterally-keyed drive shaft 207. The drive shaft 207 projects at a matching off-vertical angle from a gearbox 400. The gearbox 400 has a horizontal input shaft 401 driven by an electric motor (not shown) to power a first stage worm reduction gear also providing a horizontal-to-vertical axis transition. The vertical-axis worm wheel 403 which is the output of the first stage reduction gearing carries an integrally-formed eccentric 405 which functions as the input of a second reduction stage of the gearbox 400. Rotation of the eccentric 405 orbits a sun wheel 407 which is anchored by a peg 409 against overall rotation. The sun wheel 407 orbits within an outer ring gear 411 which is the output of the second reduction stage of the gearbox 400. Since the peg 409 is anchored into a slot 413 in the frame of the gearbox 400, the eccentric 405 and the sun wheel 407 hypocycloidally drive the ring gear 411 with a substantial velocity reduction ratio and torque multiplication ratio. Integral with the ring gear 411 is an internally-toothed crown bevel gear 415 which drives a bevelled pinion 417 on the lower end of the drive shaft 207.

Another detail change in the crisp maker 210 with respect to the first embodiment 10 is that the link wire 334 is clipped to the rear end of the paddle runners 314 (rather than at the front end as in FIG. 1).

There are also minor differences in the dimensional details of various components, such as the oil bath 214, and the oil bath 214 is also suspended further forward on the deck 212, such that the lip 226 is at the forward edge of the deck 212 instead of being set back therefrom (as in FIGS. 1 and 28). The forward end of the lid 218 is normally closed by a subsidiary lid 219 which hinges shut under gravity. The subsidiary lid 219 is temporarily pushed open by the paddle 308 at the most forward extremities of cyclic motion of the paddle 308.

In all fundamental respects, operation of the second embodiment of crisp maker 210 is the same as that of the first embodiment 10.

Figure 31:
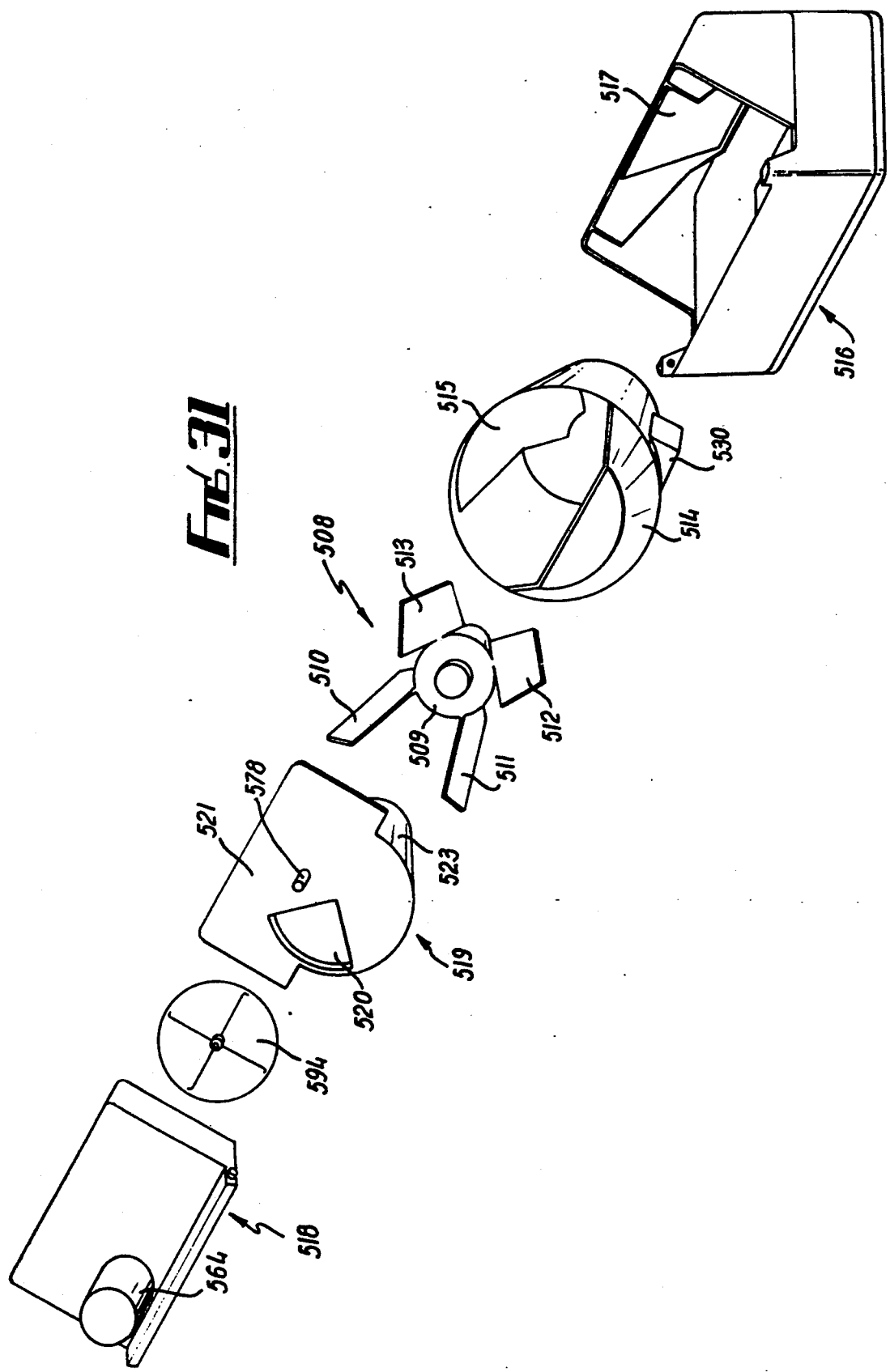
FIG. 31 is an orthogonal exploded view of the principal components of a third embodiment of crisp maker for converting raw whole potatoes to fully cooked potato crisps.

FIG. 31 shows the principal components of a third embodiment of crisp maker in accordance with the invention. The third embodiment is illustrated in FIG. 31 with these components in an exploded isometric configuration, whereas in use, the components would actually be nested and interfitted as a unitary assembly. Unlike the previously described first and second embodiments in which motion of the crisp paddle was linear and reciprocating, the third embodiment employs a multi-bladed paddle which rotates unidirectionally in discrete steps.

Referring to FIG. 31 in detail, the third embodiment of crisp maker has a main housing 516 which holds a metal oil tank 514 of generally frusto-conical shape. The tank 514 has an integral electric heater 530. The upper face of the tank 514 is cut away to form an opening 515 which lines up with a corresponding opening 517 in the main housing 516. The upper half of the front face of the tank 514 is also cut away to form an opening into which a motor housing 519 is fitted in the operative assembly. The motor housing 519 includes a planar front plate 521 by which the motor housing 519 is mounted against the upper front face of the main housing 516. The motor housing 519 also includes a cylindrical motor compartment 523 fitted behind the planar front plate 521. The cylindrical motor compartment 523 lies coaxially within the tank 514 when the components are operatively assembled.

Mounted on the rear end of the motor housing 523 is a paddle assembly 508 consisting of a hub 509 symmetrically carrying four paddle blades 510, 511, 512, and 513. Each of the paddle blades 510-513 extends radially outwards from the hub 509 and then axially along from the hub 509. The paddle assembly 508 is concentrically fitted on the end of the cylindrical motor housing 523, such that the hub 509 and the housing 523 are coaxial. When the paddle assembly 508 is rotated, the paddle blades 510-513 sweep through the annular space between the oil tank 514 and the motor housing 523 plus paddle hub 509.

There is access to this annular space through the aligned openings 515 and 517, and also through a sector-shaped hole 520 in the front plate 521.

The top front of the main housing is closed in normal operation by a hinged lid 518 which incorporates a doubly open-ended chute 564 whose lower end is aligned with the hole 520 into the annular space.

The outer face of the front plate 521 carries a slicing disc 594 on a motor-driven spindle 578. The disc 594 sweeps across the hole 520 and under the lower end of the chute 564.

In use of the third embodiment shown in FIG. 31, the components are operatively assembled and the oil tank 514 is filled to a suitable depth (about mid-height) with an appropriate cooking oil, which is heated to a regulated temperature of approximately 165 degrees Centigrade. A cleaned and peeled raw whole potato is dropped into the chute 564, such that gravity holds the potato against the slicing disc 594. The disc 594 is rotated by an amount which slices the requisite number of slices off the potato to form the batch. (The batch size in this third embodiment is preferably four slices.) This batch of raw potato slices drops through the hole 520 into the space between the paddle blades 510 and 511 where they drop into the hot cooking oil that partly fills this space. This results in the cauterisation of the potato slices as described in detail with respect to the first embodiment such that they lose their tendency to mutual adherence.

At the conclusion of this initial period, the paddle assembly 50 is rotated by one quarter of a revolution to bring the space between the paddles 510 and 511 to the bottom of the annular space within the oil tank 514. This results in the forced submersion of the cauterised potato slices to undergo full cooking. Simultaneously, the space between the succeeding paddle blades 510 and 513 is turned into alignment with the hole 520 to receive the next batch of slices off the potato in the chute 564.

At the conclusion of the cooking period, the paddle assembly 508 is rotated by a further quarter revolution in the same direction as previously, to bring the space between the paddle blades 510 and 511 back to mid-height within the oil tank 514, but on the opposite side to the hole 520. Cooking and crisping is concluded in this position. Simultaneously, the second batch of slices is fully submerged at the bottom of the tank 514, and the succeeding space between the paddle blades 512 and 513 becomes aligned with the hole 520 to receive the next batch of raw potato slices.

To complete the cycle, the paddle assembly 508 is turned a further quarter revolution in the same direction as previously to bring the space between the paddles 510 and 511 to the top, in line with the openings 515 and 517. The fully cooked and crisped potato slices drain and slide off the sloping upper surfaces of the housing 523 and the hub 509, through the tank opening 515 and out the main housing opening 517 to be dispensed thereby.

Assuming the paddle assembly 50 indexes at equal intervals of about thirty seconds, with about three seconds per indexing movement of one quarter revolution, and further assuming that the slicing operation takes place in ten seconds immediately after indexing, this gives a minimum of twenty seconds for preparatory cauterisation, followed by about sixty seconds of cooking of which the first thirty seconds is under conditions of forced full submersion of the slices in the hot cooking oil.

Just as the intervals between cycles of paddle movement could be varied in the first and second embodiments to vary the total length of cooking time, the intervals between rotational indexing of the paddle assembly in the third embodiment can similarly be varied to alter the overall length of cooking time, to suit the tastes of the user and/or the cooking and crisping requirements of the potato or other edible material being cooked. The number of blades on the paddle assembly could be other than four, for example five (at equal spacings).

Figure 32:
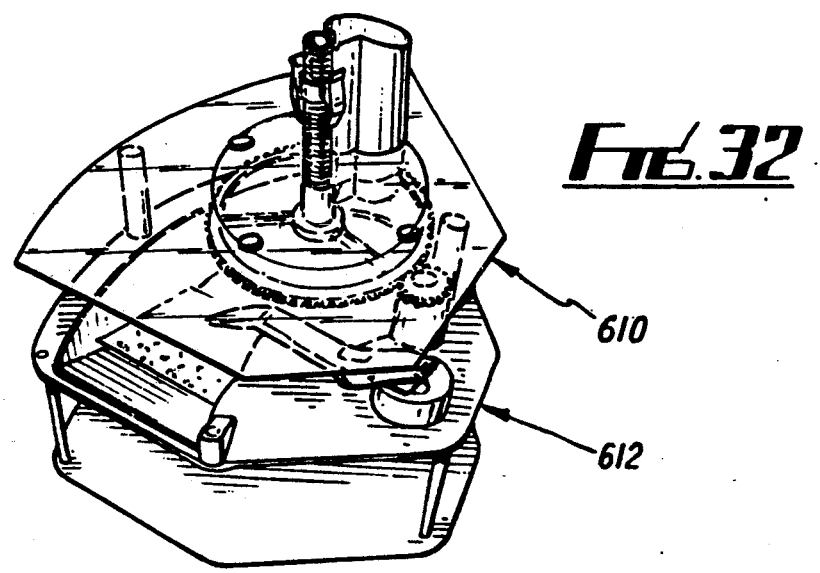
FIG. 32 is a perspective view of a fourth embodiment of crisp maker for converting raw whole potatoes to fully cooked potato crisps.

Referring next to FIG. 32, this is a perspective view of a fourth embodiment of crisp maker for converting raw whole potatoes to fully cooked potato crisps. As shown in FIG. 32, an upper potato feeding and slicing mechanism 610 is mounted in its operational location over a lower oil bath and paddle mechanism 612, with casing sides removed. Full details of the potato feeding and slicing mechanism 610 are given in FIGS. 1, 12-21, and 28 of this specification (wherein the feeding and slicing mechanism is mounted on a rectiform cover to suit a rectangular oil bath, whereas in the fourth embodiment of the present FIG. 32, the corresponding cover is approximately sector-shaped to suit the arcuate oil bath of this fourth embodiment).

Figure 33:
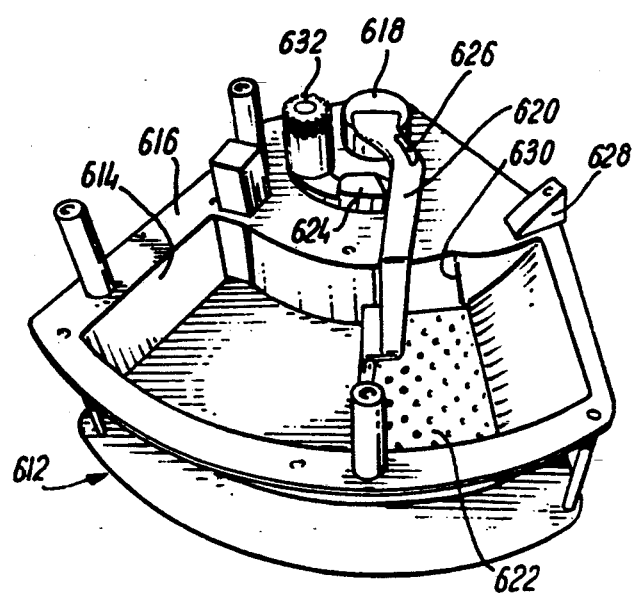
FIGS. 33-39 are perspective views of the lower part of the crisp maker of FIG. 32, at various stages in its sequence of operations.

FIG. 33 shows the lower oil bath and paddle mechanism 612, with the upper mechanism 610 removed. (In FIG. 32, the view was directed on to the exit end of the crisp maker, whereas in FIG. 33, the view is directed on to the left side of the crisp maker as it was viewed in FIG. 32). As shown in FIG. 33, a metal oil bath 614 is suspended from a plastic deck 616. The oil bath 614 and its deck 616 are generally the same as the corresponding oil bath and mounting deck in FIGS. 1-28 above, save that the longitudinal axis of the oil bath 14 is curved into an arc of a circle to suit the paddle driving mechanism (detailed below). The deck 616 is reshaped in plan to suit the now arcuate shape of the oil bath 614. The oil bath 614 is electrically heated by an underfloor resistance element (not visible) in the same manner as described in FIGS. 1-28 above. The oil bath 614 may be fabricated of sheet aluminium or stainless steel, or of any suitable metal which is coated with P.T.F.E.

Protruding through the deck 616 is a vertical drive shaft 618 which is angularly reciprocated in a series of steps analogous to the series of steps of the paddle drive mechanisms described in FIGS. 1-28 above. Rotation of the shaft 618 swings an arm 620 which is pivotally coupled to the shaft 618 about an approximately horizontal axis at about right angles to the length of the arm 620. (This pivot axis may be somewhat non-horizontal to alter the geometry of movement of the paddle 622). The pivotal coupling of the arm 620 to the drive shaft 618 is by means of a polarised clip-on type of connection which allows the arm 620 to be detached for cleaning, and prevents reattachment of the arm 620 to the shaft 618 at 180 degrees to the correct alignment.

The outboard end of the arm 620 carries a perforated paddle 622 on a pivot whose axis is approximately aligned with the pivotal connection of the arm 620 to the drive shaft 618, to allow the paddle 622 to tip in its direction of motion (analogously to the tipping of the paddle as described in FIGS. 1-28 above).

The angular position of the drive shaft 618 controls the horizontal position of the paddle 622 in the oil bath 614. The vertical position of the paddle 622 at its point of attachment to the arm 620 is controlled by a cam surface 624 mounted on or integral with the deck 616 between the shaft 618 and the near edge of the oil bath 614. The arm 620 is linked to the cam surface 624 by a pivoted cam follower 626 mounted in the arm 620 so that the sole and toe of the cam follower 626 alternately contact respectively the top and far side of the cam surface 624, according to whether the arm 620 is swinging rightward or leftwards (as viewed in FIG. 33). The cam follower 626 is pivoted about a horizontal axis at right angles to the length of the arm 620, and is shaped so that its range of pivotal movement is restricted.

In FIG. 33, the paddle 622 of this fourth embodiment is shown in its "rest" or "submerged cooking" position corresponding to the position of the paddle in FIG. 1 above.

Figure 34:
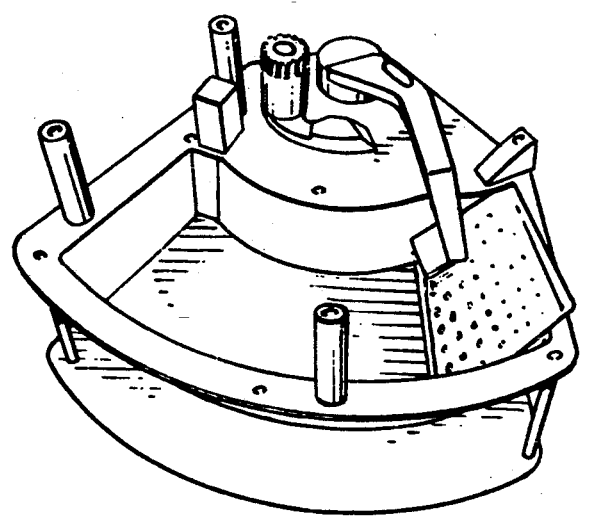

Following the conclusion of the "submerged cooking" phase (in which the paddle 622 dwells in the FIG. 33 position), the drive shaft 618 is rotated anti-clockwise as viewed from above. This rotation of the shaft 618 correspondingly swings the arm 620, and with it, the paddle 622. In the initial stage of paddle movement forward from the "submerged cooking" position of FIG. 33, the paddle 622 moves up the ramp-like sloping forward face of the oil bath 614, as shown in FIG. 34. Cooked and crisped potato slices trapped beneath the paddle 622 are swept along by a vertical trailing edge of the paddle 622, and up the forward face of the oil bath 614 where surplus unabsorbed oil drains back into the bath 614. The sequence of movements of the paddle 622 preferably includes a pause at this point to enhance the drainage of surplus cooking oil from the cooked crisps.

Figure 35:
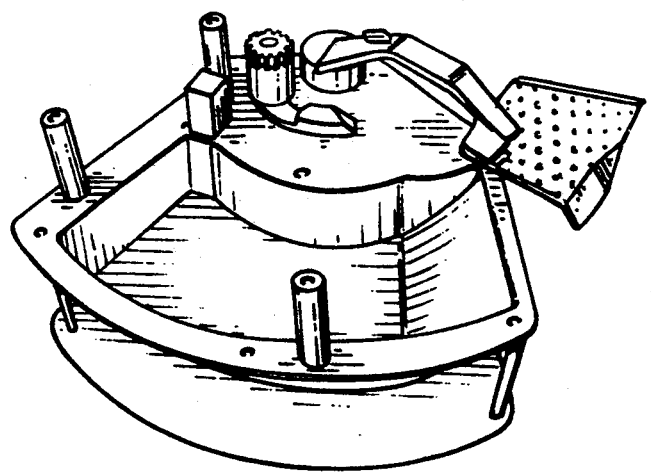

Anti-clockwise movement of the drive shaft 618 terminates in the position shown in FIG. 35, at which the paddle 622 has swept the crisps fully over the forward edge of the oil bath 614, to fall into a tray or other receptacle (not shown). In the FIG. 35 position the paddle 622 is held up by a ramp 628 formed on the deck 616 at the inboard side of the front edge of the oil bath 614. To accommodate the inboard trailing edge of the paddle 622, and its pivotal connection to the arm 620, in the transition from the FIG. 34 position to the FIG. 35 position, the inner curved edge of the oil bath 614 is relieved from its pure circular shape by a wide vertical notch 630.

Figure 36:
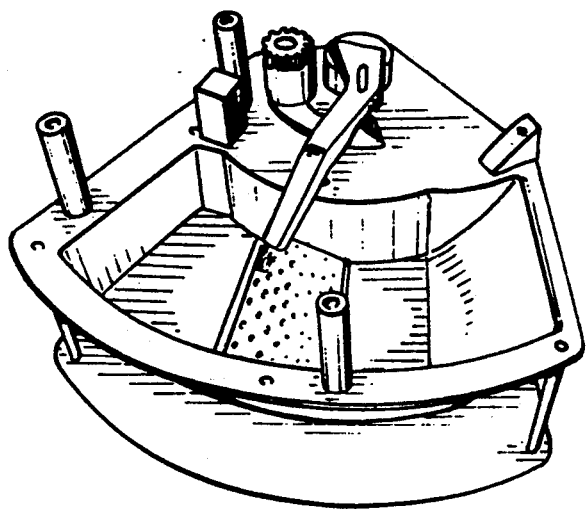
Figure 37:
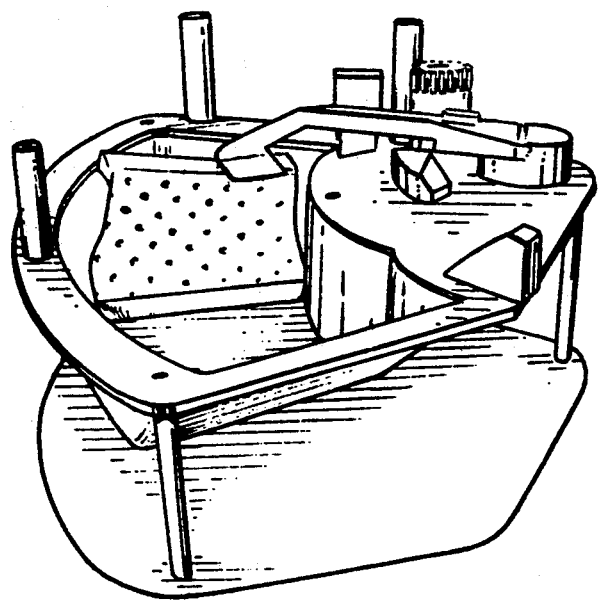

From the extreme anti-clockwise position of FIG. 35, the drive shaft 618 is reversed to bring the paddle 622 back across the top of the oil bath 614, as shown in FIGS. 36 and 37. The arm 620 is held upwards during this return from the front end to the rear end of the oil bath 614 by the sole of the cam follower 626 running up a ramp-like surface on the anti-clockwise edge of the cam 624, as is most clearly seen in FIG. 37. This causes the follower 626 to pivot to the limit of its upward movement (clockwise as viewed in FIG. 37). During this return movement of the paddle 622, while the rear edge of the paddle 622 is held upwards as just described, the front edge of the paddle 622 is allowed (by its pivotal connection to the arm 620) to drop and drag across the floor of the oil bath 614. Thereby the next batch of raw slices of potato which have been cut by the slicing mechanism 610 to drop into the hot oil in the bath 614 to be partially cooked, are swept by the paddle 622 to the back of the oil bath 614 whether or not they have meanwhile floated to the surface of the oil and may thereby be distributed throughout the oil bath 614.

Figure 38:
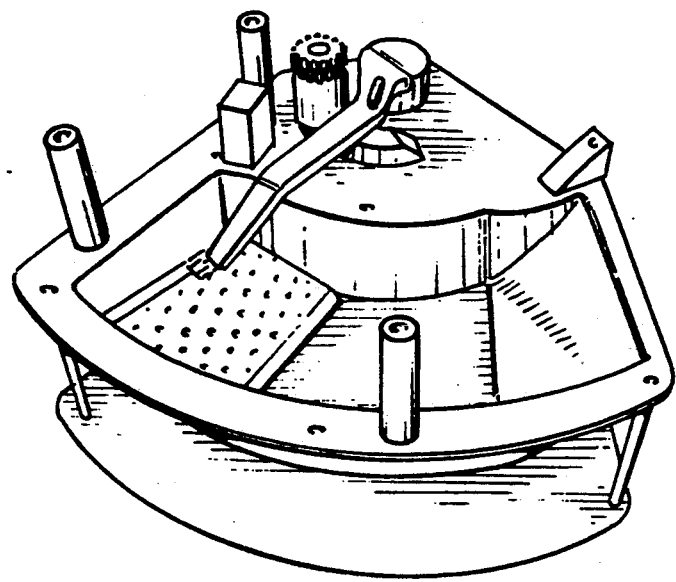
Figure 39:
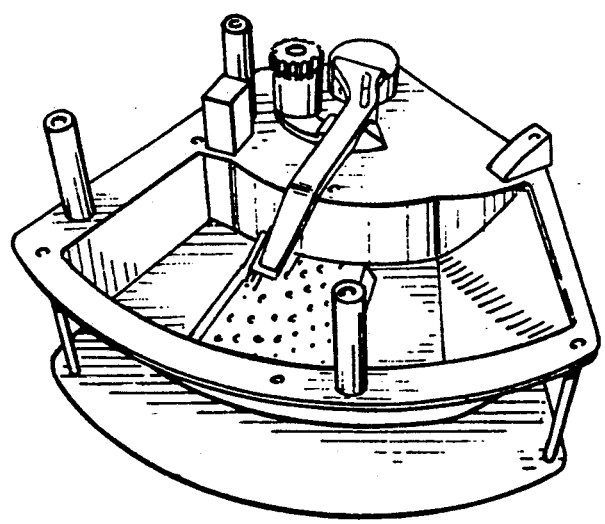

As the rear edge of the paddle 622 reaches the rear edge of the oil bath 614, the cam follower 626 runs off the upper surface of the cam 624 and allows the arm 620 to drop. This results in the lowering of the paddle 622 to rest on the floor of the oil bath 614 as shown in FIG. 38, which traps and forcibly submerges the partially-cooked subsequent batch of potato slices. At the FIG. 38 position, clockwise rotation of the drive shaft 618 is terminated, and anti-clockwise rotation commences, continuing as shown in FIG. 39 until the paddle 622 returns to the "submerged cooking" position shown in FIG. 33 to complete the cycle of movements.

At the commencement of anti-clockwise movement of the drive shaft 618, the toe of the cam follower 626 runs inboard of a vertical wedge surface forming the clockwise edge of the cam 624. This tips the cam follower 626 to the other limit of its pivotal movement (in contrast to FIG. 37), such that instead of running over the top of the cam 624 during clockwise movement of the cam 620, the cam follower runs inboard of the cam 624 during anti-clockwise movement of the arm 620 to avoid the arm 620 being lifted. Non-lifting of the arm 620 ensures that the paddle 622 runs along the floor of the oil bath 614, keeping the partially-cooked potato slices submerged.

The drive shaft 618 may be angularly reciprocated as described above by means of an electric drive motor (not shown) mounted beneath the deck 616, and running unidirectionally through a reduction gear(s), with a final crank mechanism (not shown) linked to the shaft 618 to cause the shaft 618 to undergo reversing movement even though the drive from the motor is non-reversing. If this drive motor is linked to the input of the crank mechanism through a unidirectional clutch (such as a rotary pawl and ratchet freewheel), rotation of the motor in one given direction only will result in the requisite angular reciprocation of the paddle drive shaft 618. If the same drive motor is linked through another and oppositely-handed uni-directional clutch (and reduction gearing) to the slicer drive pinion 632, reverse rotation (ie opposite to the above-mentioned given direction) of the drive motor will drive the feeding and slicing mechanism 610 without simultaneously moving the paddle 622, and vice-versa. Such alternative operation of the paddle and of the slicer is feasible, since as described above in respect of the first and second embodiments (FIGS. 1–30), such alternate operation is perfectly suited to the preparation and cooking procedure of the present invention. Alternatively, the paddle drive shaft 618 and the slicer drive shaft pinion 632 could be independently driven by respective separate and dedicated electric drive motors which may each rotate unidirectionally.

Starting of the drive motor(s) can be controlled by a timer circuit, while stopping can be controlled by position sensors, such as limit switches operated by tappets on the paddle drive and the slicer drive, and/or magnet-activated reed switches.

During the "submerged cooking" stage shown in FIG. 33 in which the paddle 622 is held stationary, the slicer drive pinion 632 is rotated by a requisite amount to furnish the next batch of raw potato slices, which will drop straight into the oil bath 614 (as will be apparent from the alignment of the slicing mechanism 610 over the oil bath and paddle mechanism 612 shown in FIG. 32). These slices are prevented from floating from the rear (preliminary cooking) portion of the oil bath 614 to the forward (submerged cooking and crisping) portion of the oil bath 614 by a rear wall on the paddle 622 which projects upwardly of the main (horizontal and perforated) surface of the paddle 622 as an upward continuation of the downwardly projecting rear edge of the paddle 622 which forces crisps out of the oil bath 614 during the dispensing stages illustrated in FIGS. 34 and 35.

While the embodiment shown in and described with reference to the accompanying FIGS. 32–39 is particularly suited to domestic use, the invention is not restricted to domestic use and may be applied commercially. When applied in commercial establishments selling food (and possibly also beverages) for consumption on or off the premises, and at stalls, the invention may be embodied in a machine of the size shown in the accompanying drawings, or scaled-up to whatever larger size is practicable for the demand for potato crisps or other edible crisp-like product(s). In the event that batches of a considerable number of crisps are required at any one time, the potato feeding and slicing mechanism may be replicated so that more than one potato can be sliced simultaneously and thus multiply the short-term rate of slice production without over-speeding any single feeding and slicing mechanism. For example, in a suitably larger version of the crisp maker shown in FIG. 32, the feeding and slicing mechanism 610 could be triplicated such that three potatoes were sliced contemporaneously; this would also allow any single feed chute to be replenished with a further potato without totally interrupting the production of slices.

Although the procedures and equipment of the present invention limit the amount of undesirable oil vapour, use over a longer term and/or on a larger scale than would be typical of domestic use may tend to strain the limit of acceptability of fumes produced by a crisp maker in accordance with the invention. It is therefore feasible in accordance with the invention that fumes from the crisp maker are passed through a filter before being exhausted to the ambient atmosphere around the crisp maker. Such a filter can be formed of activated carbon, and may be incorporated as an integral part of the crisp maker.

Referring now to FIGS. 40-60, these illustrate a fifth embodiment of crisp maker in accordance with the invention. FIGS. 40-46 show the exterior of the complete crisp maker from various directions, and are particularly included because of the markedly asymmetrical configuration of the fifth embodiment.

In general terms, the fifth embodiment is not unlike the fourth embodiment of FIGS. 32-39 in that the fifth embodiment is based on an arcuate or part-circular oil bath (not visible in FIGS. 40-46 because of the top cover and bottom housing). However, although the fifth embodiment has many technical features in common with the fourth embodiment, the fifth embodiment is a mirror image of the fourth embodiment in that clockwise and anticlockwise structure and function of the fifth embodiment are reversed about a hypothetical near-central vertical axis with respect to the fourth embodiment.

Referring now in detail to FIGS. 40-46, the fifth embodiment 710 has principal components which are readily divided into three groups of components, as follows:

(A): a deck 712 which mounts various mechanisms (detailed below), and suspends a heated oil bath (also detailed below);

(B): a lower housing 716 which encloses the underside of the deck 712, and also supports the deck 712 above the kitchen work surface, table top, or other surface (schematically illustrated as a horizontal line at the foot of FIGS. 42-45) upon which the crisp maker 710 rests in use; and (C): a detachable lid 718 mounted on top of the deck 712, and which also integrally incorporates a potato feeding and slicing mechanism (of which more details will be given below).

The lower housing 716 is a relatively simple and essentially unitary moulding of heat-resistant and impact-resistant polymer. Besides supporting the deck 712, the housing 716 serves to prevent accidental contact with the hot exterior of the oil bath, and also serves as an essential safety barrier around electrical and mechanical components (see FIG. 49 for the view from beneath of such components as revealed by the removal of the lower housing 716). The upper edge of the housing 716 has a large number of regularly spaced cut-outs 720 which fit under the overlapping lower edge of the deck 712, to give a crenellated appearance and to function as thermal vents. (Other thermal vents will be described subsequently). The deck 712 and the lower housing 716 are normally permanently secured together.

The lid 718 is a clip-fit on the deck 712 but is otherwise readily detachable without the use of tools. A hollow chute 722 protrudes from the left side of the lid 718, and serves the same function as the chute 64 in FIGS. 1, 12, 13, and 28, ie to admit raw potatoes (or other vegetables or fruits) into the interior of the crisp maker 710. The potatoes (or other edible materials) are forced down the chute 722 at a controlled rate by a piston 724 similar to the piston 66 of FIGS. 1, 14-17, and 28. The piston 724 is driven by a lead-screw 726 which is the same as the lead-screw 78 of FIGS. 1 and 28, except that the lead-screw 726 has a left-hand thread for reasons to be detailed below. The piston 724 is coupled to the lead-screw 726 by a resiliently-detachable clip mechanism 728 which is essentially similar to that detailed in FIGS.. 14-17. Thus apart from minor detail differences of dimension and shape, the potato feeding mechanism 722-728 of the fifth embodiment is not significantly different from that described in the first embodiment of FIGS. 1-28, to which reference should be made for full structural and functional details. Perspective and lateral views of the potato feeding mechanism 722-728 are shown in FIGS. 40-45, while a plan view is shown in FIG. 46, and a vertical section is shown in FIG. 51.

Figure 50:
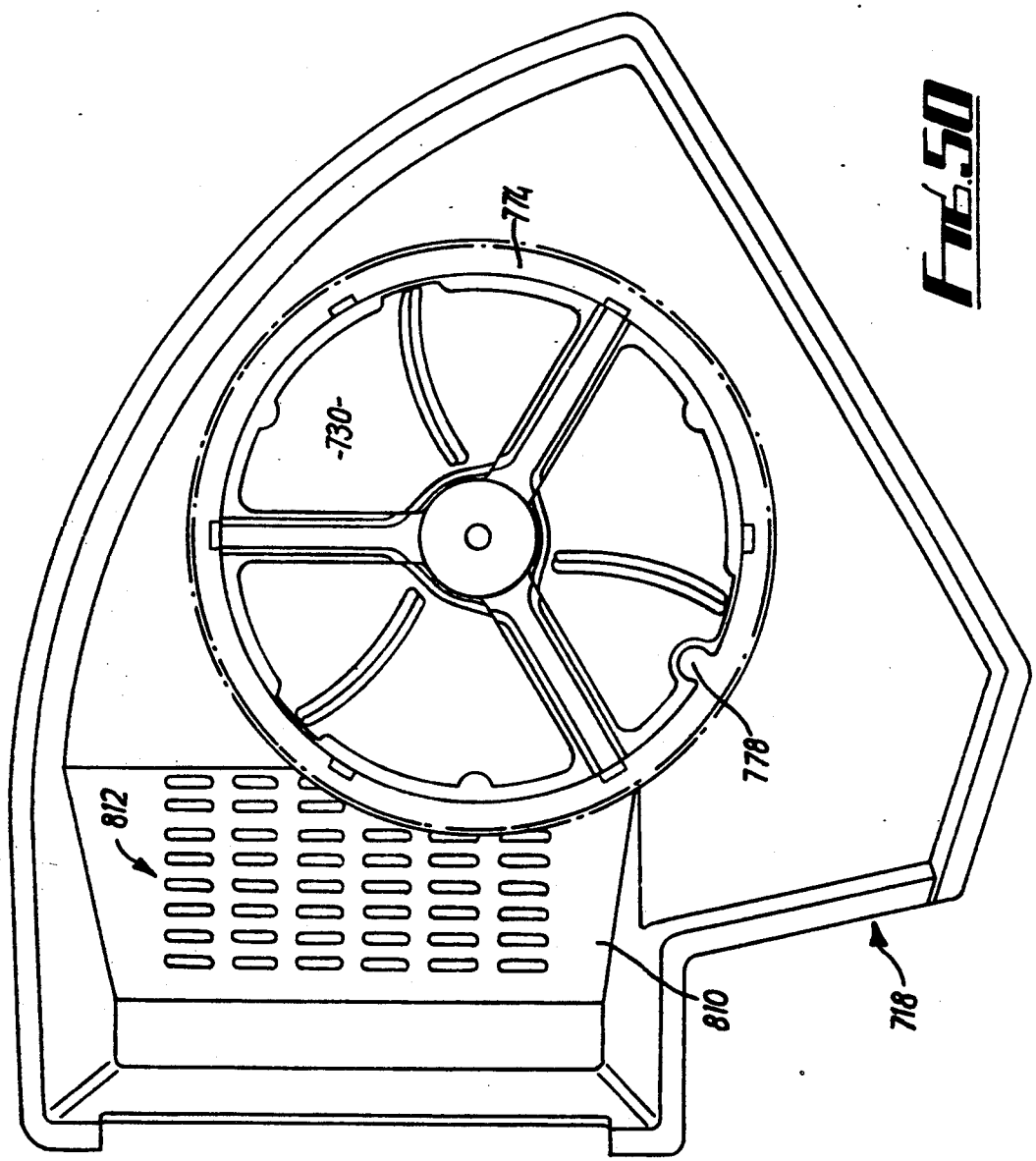
FIG. 50 is a plan view from beneath of the top cover (with integral slicing/feeding mechanism) that was removed from FIG. 46 to produce FIG. 47.
Figure 51:
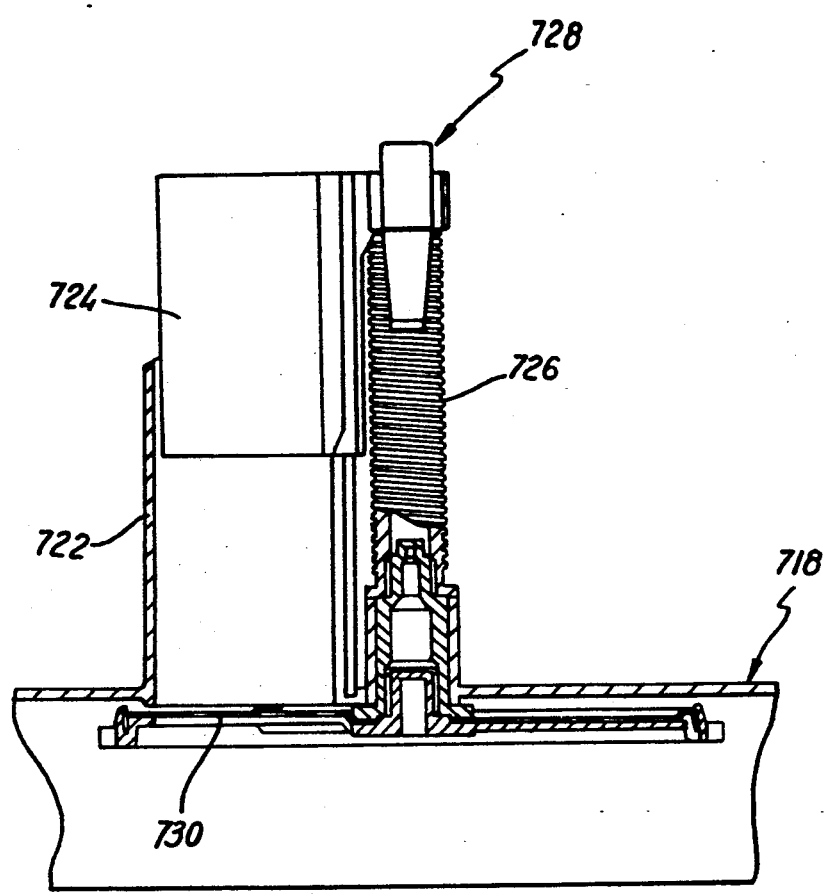
FIG. 51 is a vertical part section of the top cover of FIG. 50 (in particular of the slicing/feeding mechanism) and taken on the line LI—LI in FIG. 46.

The sectional view of FIG. 51 illustrates how a cutting disc 730 is secured to the lower end of the lead screw 726 in the same general manner as the cutting disc 94 is secured to the lead-screw 78 on FIG. 1. FIG. 50 shows the crisp-maker lid 718 from beneath, with the potato feeding and slicing mechanism 722-730 in place, and the extent to which the triple-bladed cutting disc 730 is generally similar to the triple-bladed cutting disc 94 described in detail in FIGS. 18-21. However, bearing in mind that FIG. 18 shows the cutting disc 94 from above, whereas FIG. 50 shows the cutting disc 730 from beneath, it will be appreciated that the disc 730 is oppositely "handed" from the disc 94, ie the disc 730 turns clockwise as viewed from above.

If the cutting disc 730 were modified to have two equispaced cutting blades, but no other changes were made in the crisp maker 710 (in particular, there being no change in the thread pitch of the lead screw 726), slices of 50 per cent greater thickness would be produced.

Figure 46:
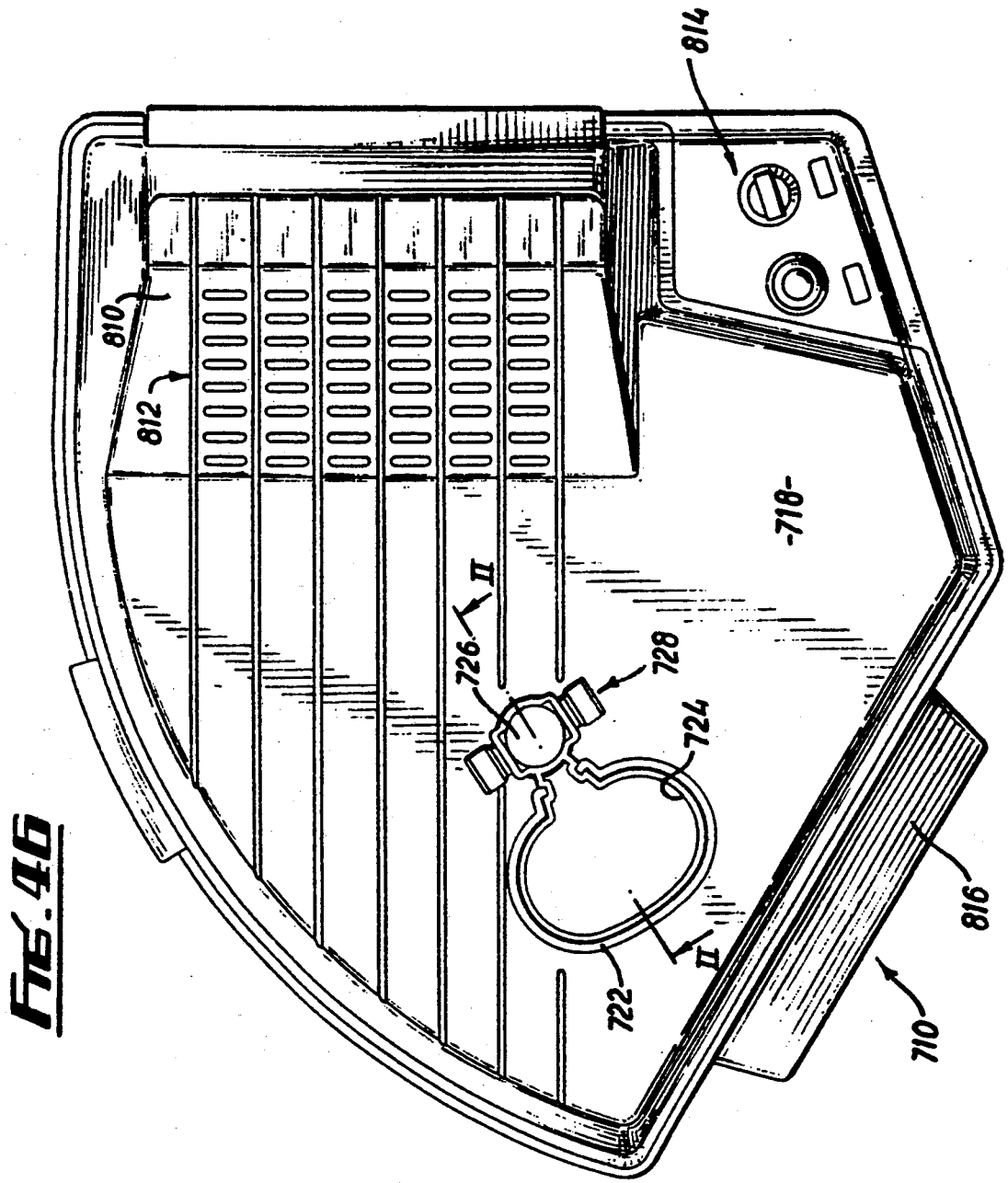
FIG. 46 is a plan view from above of the crisp maker of FIG. 40.
Figure 47:
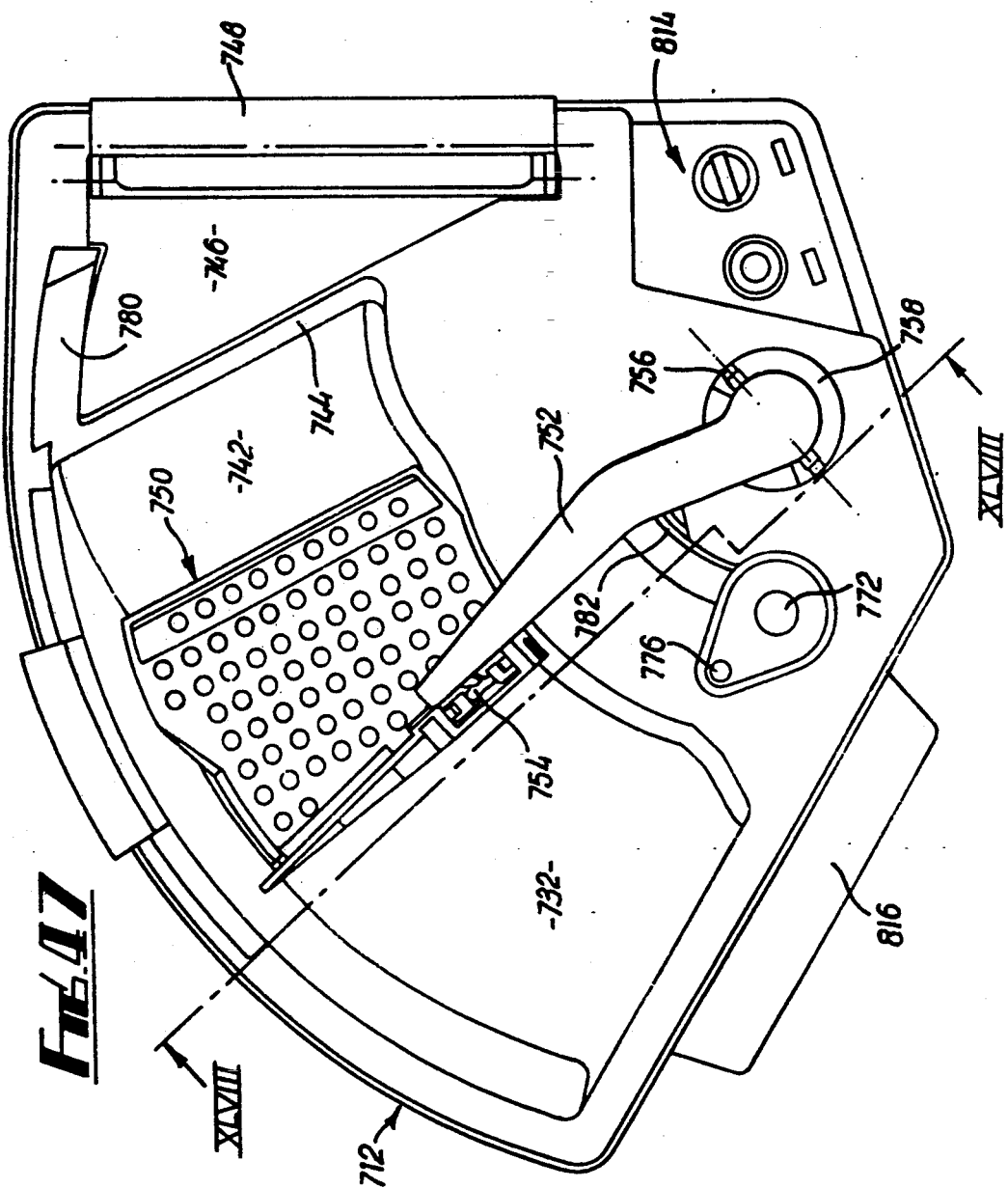
FIG. 47 is a plan view from above of the crisp maker of FIG. 40 with its top cover removed.
Figure 48:
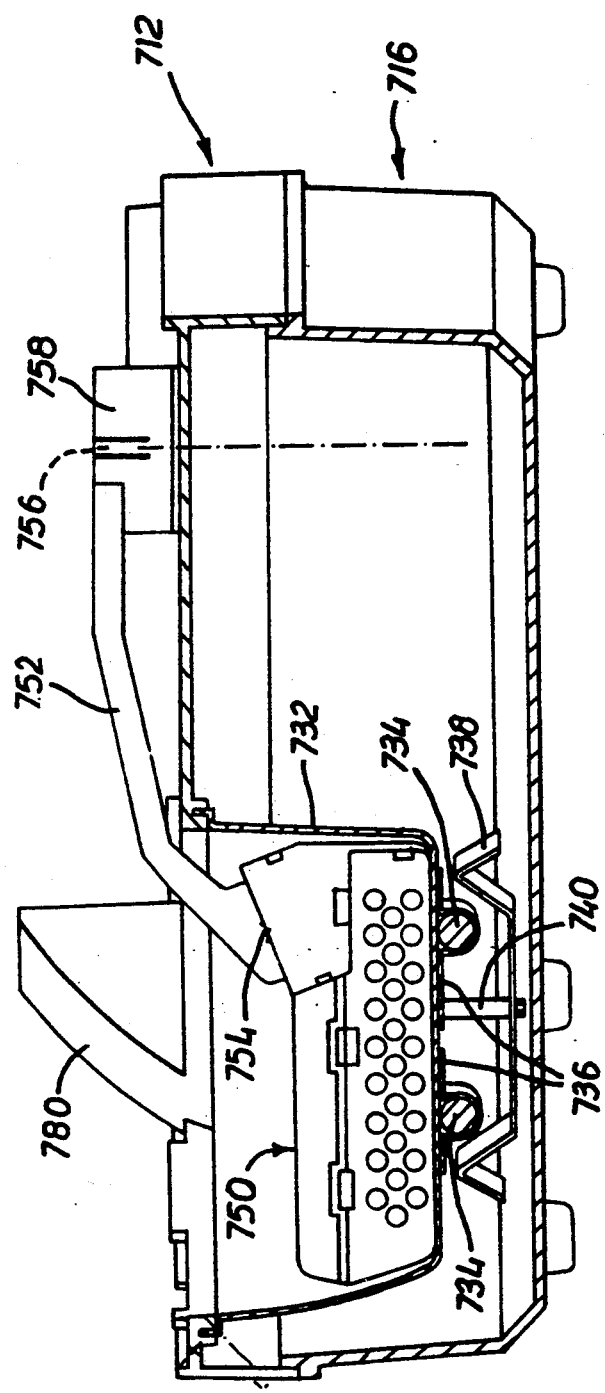
FIG. 48 is a vertical section of the crisp maker of FIG. 40 with its top cover removed and taken on the line XLVIII—XLVIII in FIG. 47.

Thus by considering first the plan view of the complete crisp maker 710 as shown in FIG. 46, and in particular visualising the clockwise (as viewed from above) movement of the cutting disc 730 (not visible in FIG. 46) under the chute 722, it will be readily seen by turning next to FIG. 47 (which is the FIG. 46 crisp maker minus the lid 718) that newly formed slices of raw potato leaving the cutting disc 730 will drop directly into the left end of an oil bath 732 which is mounted on the deck 712. The oil bath 732 is generally arcuate in plan as may be seen from above in FIG. 47 and from beneath in FIG. 49. FIG. 48 shows a transverse section of the oil bath 732 as taken on the line XLVIII—XLVIII in FIG. 47.

Figure 49:
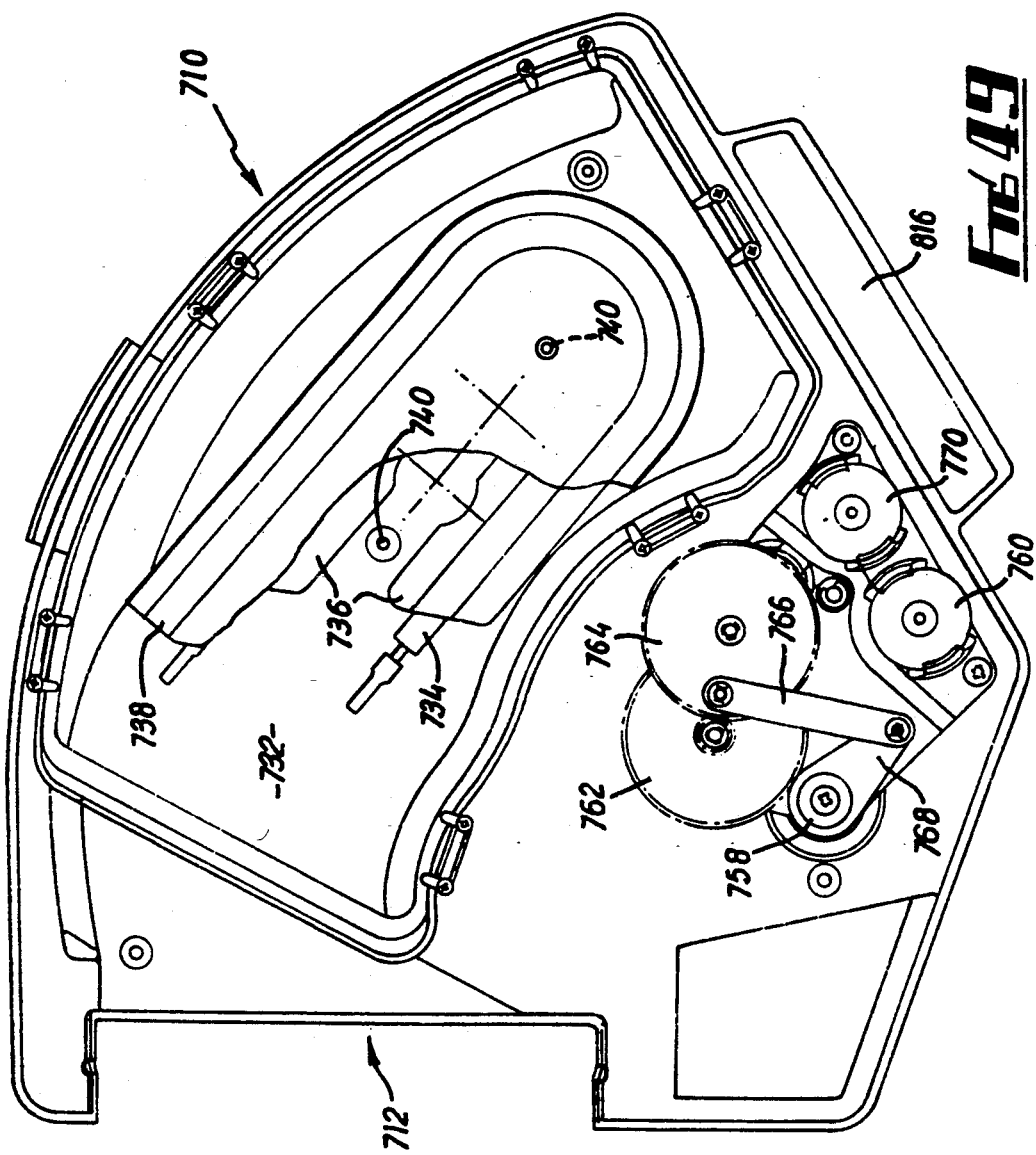
FIG. 49 is a plan view from beneath of the crisp maker of FIG. 40 with its bottom housing removed.

FIGS. 48 and 49 show how the oil bath 732 is heated by a generally U-shaped electric resistance element 734 clamped to the underside of the oil bath 732 by a spot-welded channel strip 736. A thermostat (not shown) is secured in intimate thermal contact with the underside of the oil bath 732 between the legs of the U-shaped heating element 734 to control the temperature of cooking oil in the bath 732 by switch-mode control of electric power to the element 734. A flanged sheet 738 of bright metal (such as sheet aluminium) is mounted on pillars 740 beneath the oil bath 732 but out of contact with the lower housing 716, to act as a heat reflector and thus protect the base of the lower housing 716 from radiant heating by the element 734.

Figure 40:
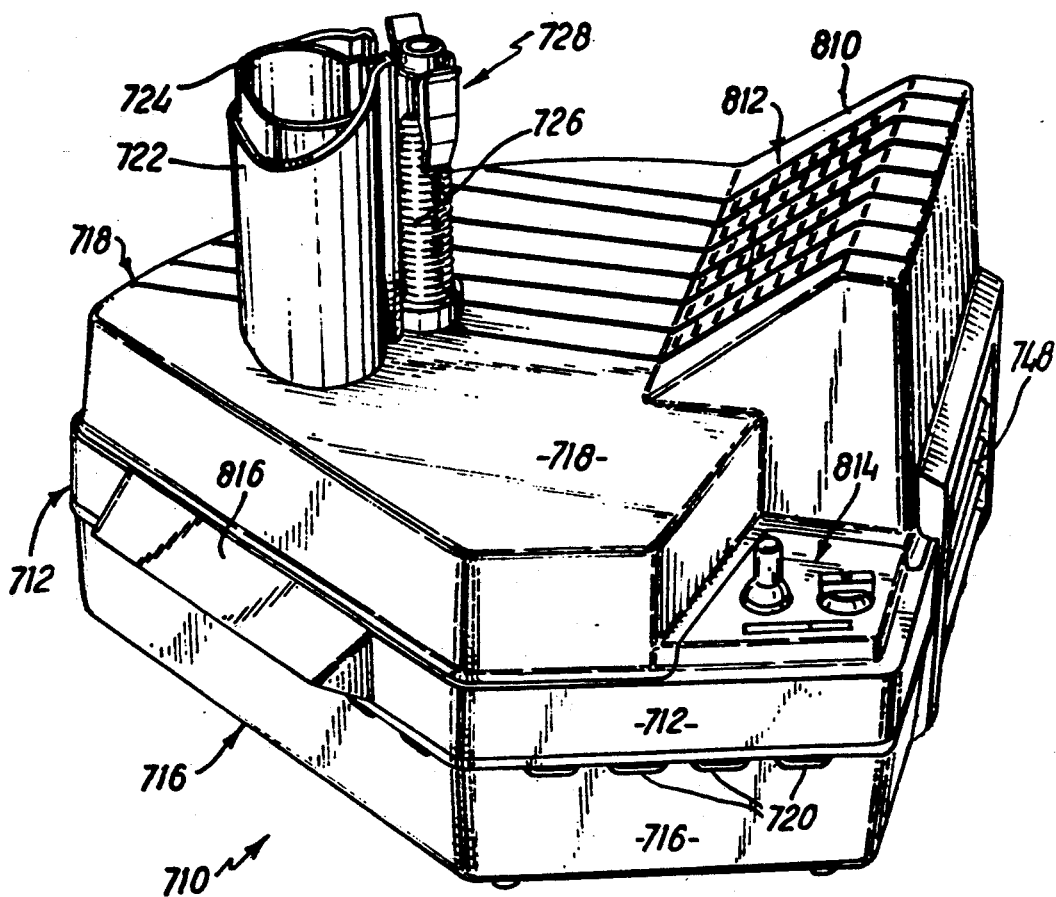
FIG. 40 is a front perspective view of a fifth embodiment of crisp maker for converting raw whole potatoes to fully cooked potato crisps.
Figure 41:
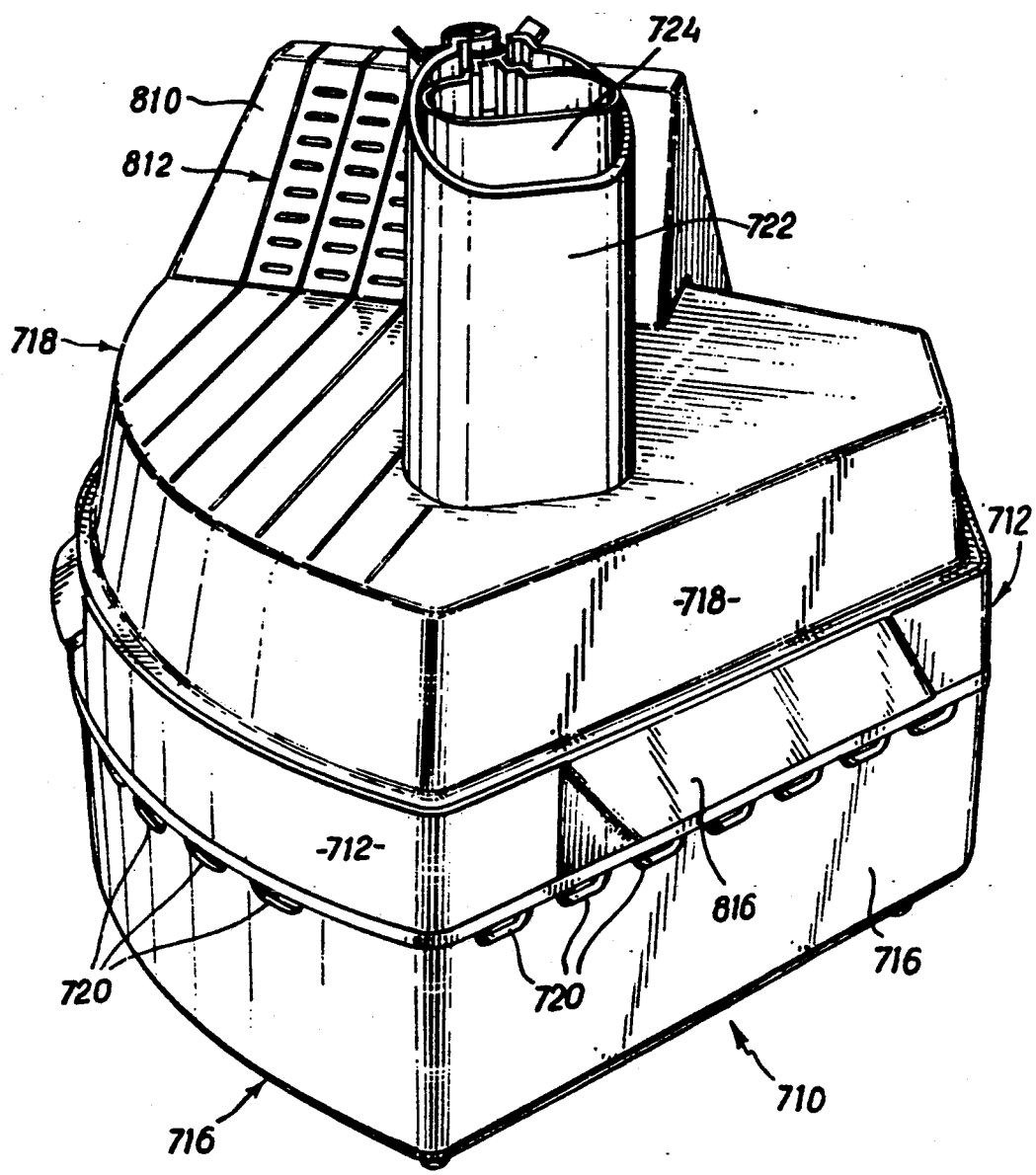
FIG. 41 is a left side perspective view of the crisp maker of FIG. 40.
Figure 42:
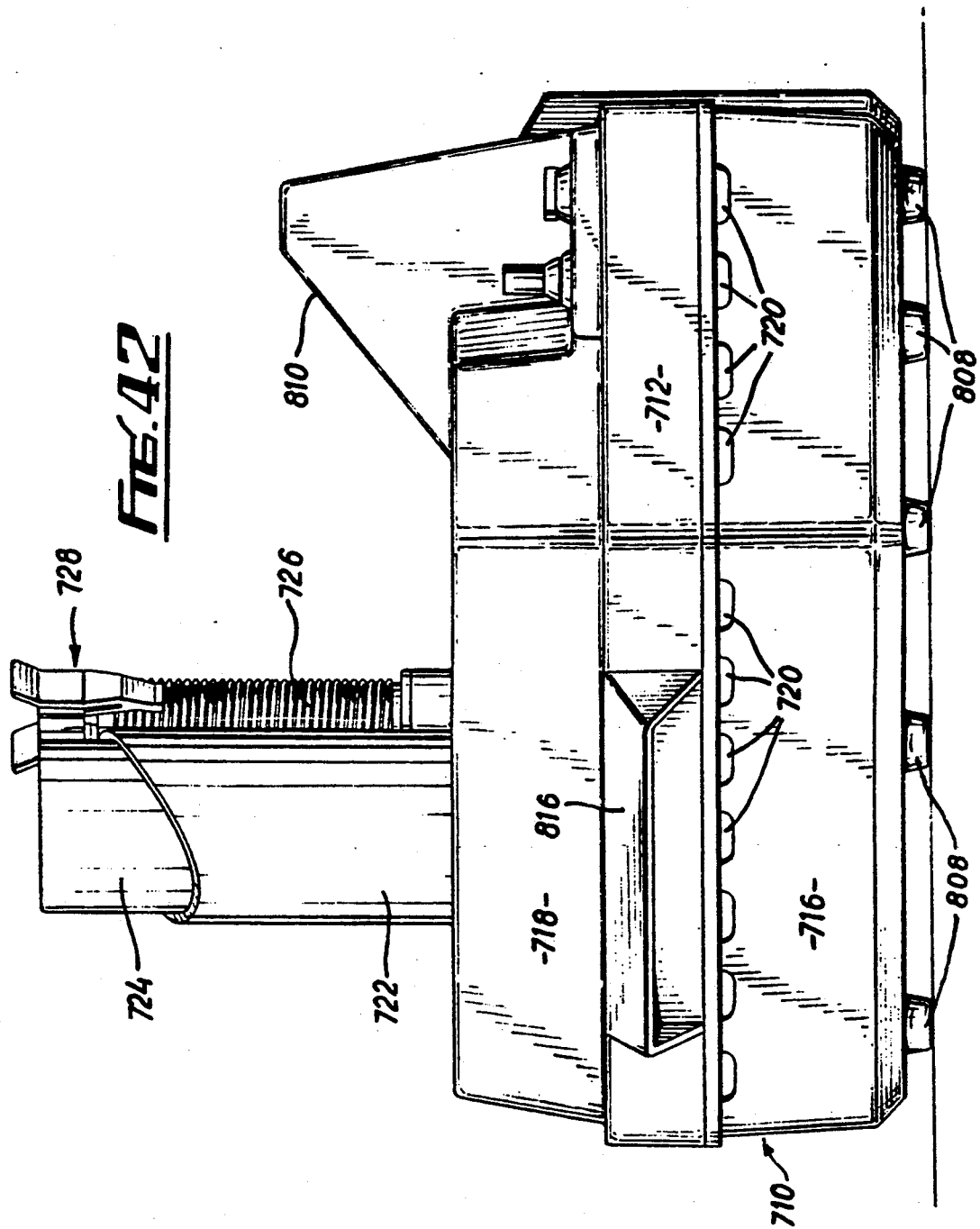
FIG. 42 is a front elevation of the crisp maker of FIG. 40.
Figure 43:
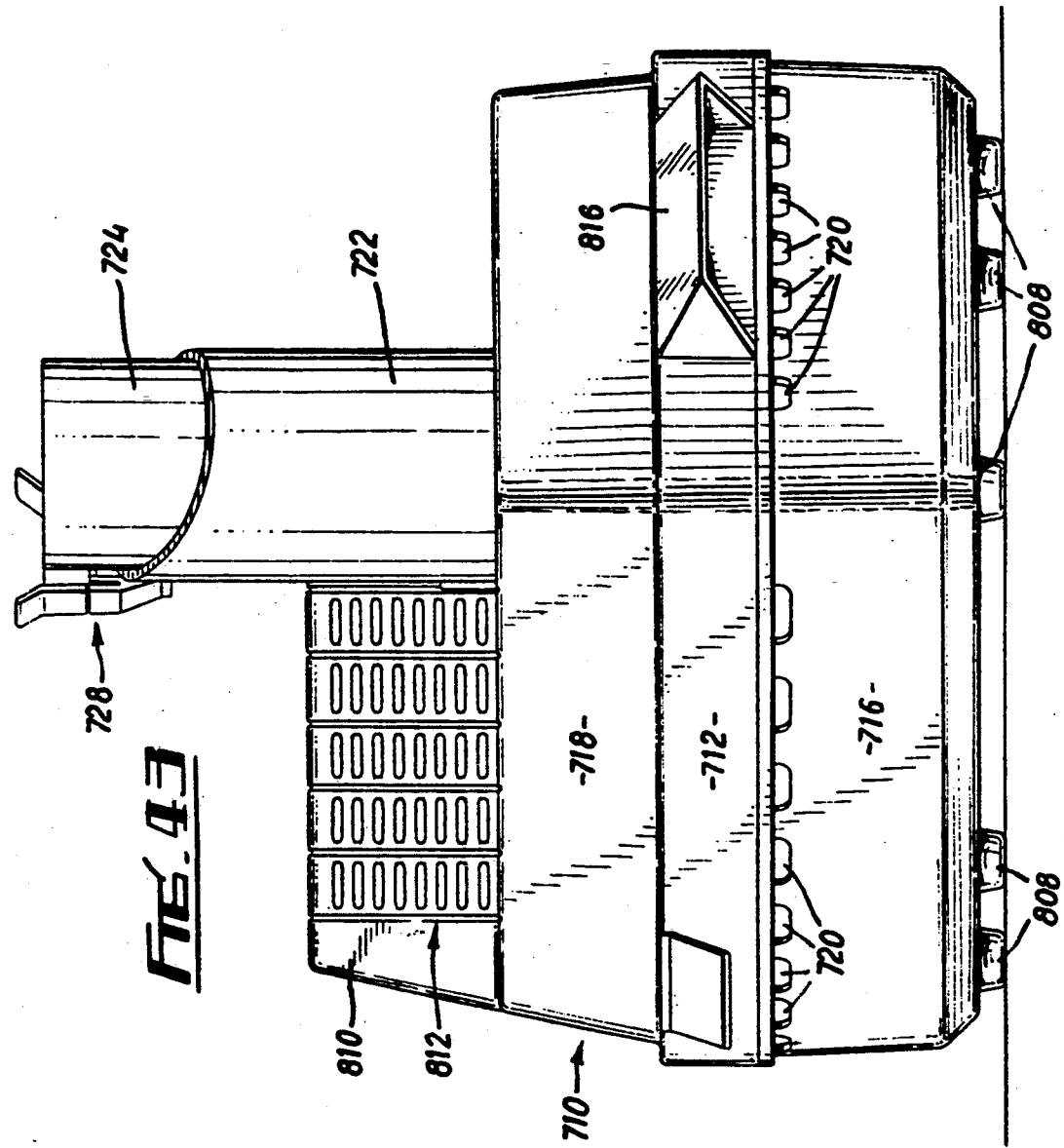
FIG. 43 is a left side elevation of the crisp maker of FIG. 40.
Figure 44:
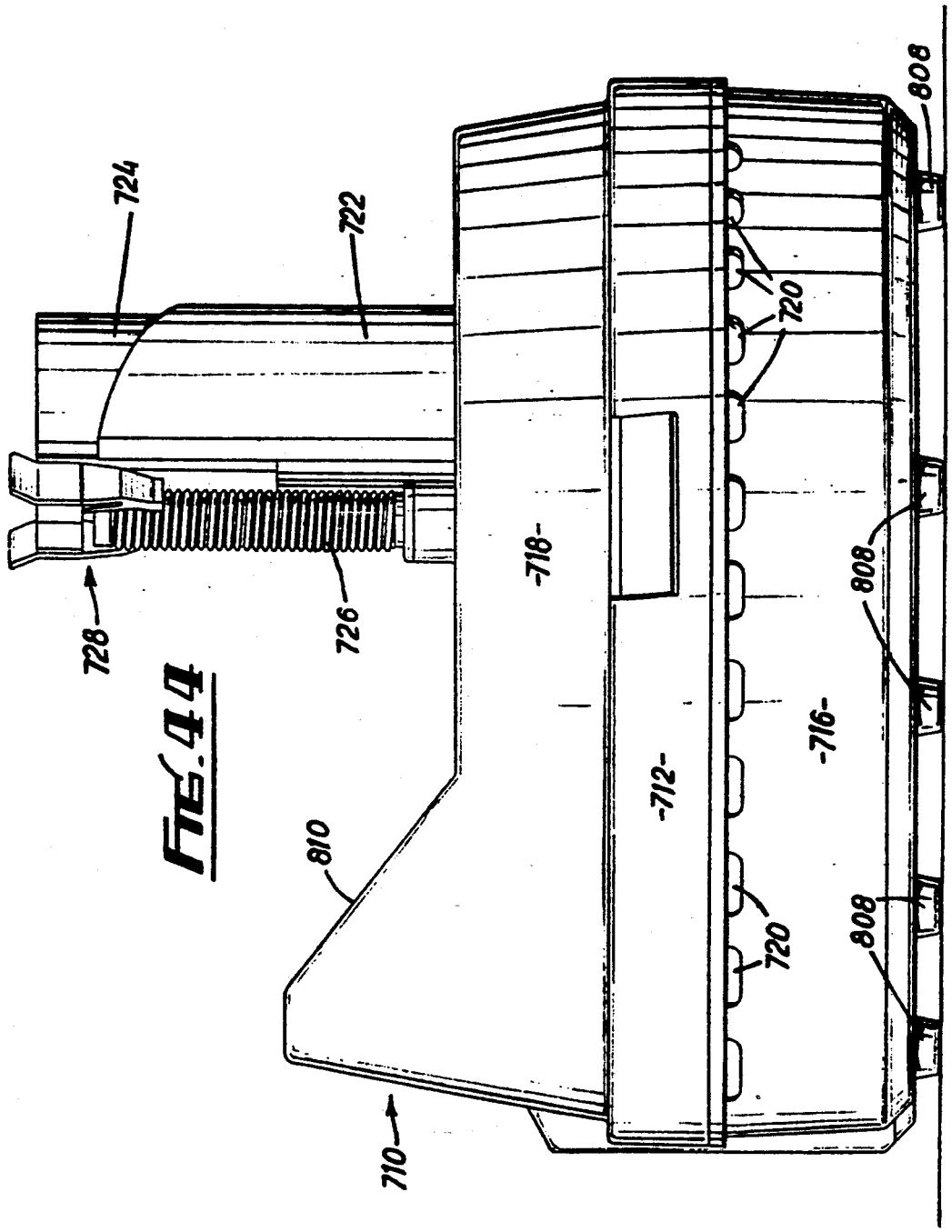
FIG. 44 is a rear elevation of the crisp maker of FIG. 40.
Figure 45:
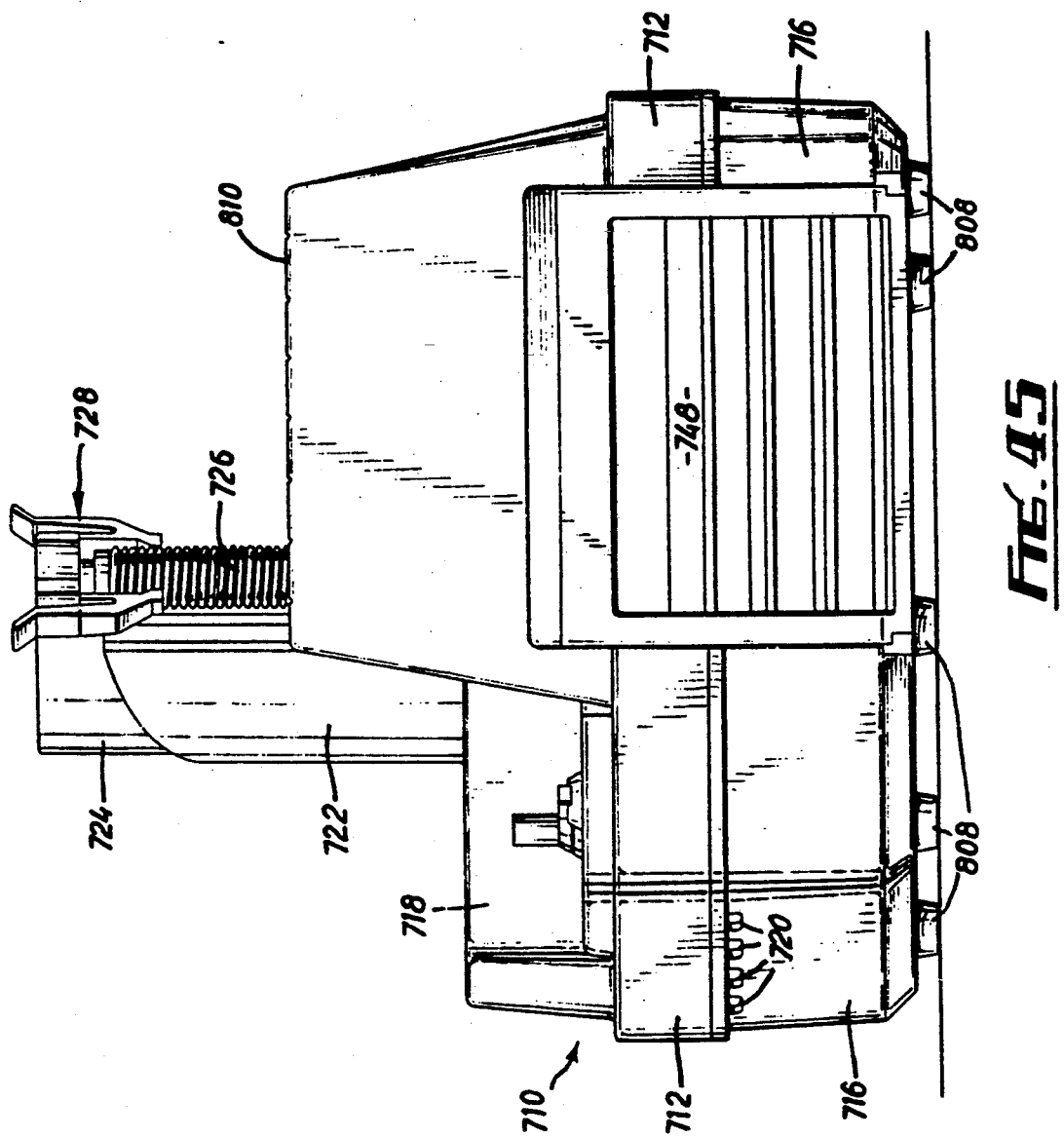
FIG. 45 is a right side elevation of the crisp maker of FIG. 40.

Reverting to FIG. 47, the left or anti-clockwise end of the arcuate oil bath 732 corresponds to the rear portion of the oil bath 14 in FIG. 1 from the consideration of being the bath portion receiving newly cut slices of raw potato. Correspondingly, the right or clockwise end of the oil bath 732 corresponds to the forward or delivery end of the oil bath 14 of FIG. 1. The right end of the oil bath 732 has an upsloping floor forming a ramp 742 leading up to the forward edge 744 of the bath 732. (These correspond to the ramp 24 and the front lip 26 in FIG. 1). Cooked crisps pushed out of the bath 732 and over the forward edge 744 slide or tumble down a sloping surface 746 to be collected in a tray 748. The tray 748 is shown in FIGS. 40, 45, and 47 folded up to its closed position in the right end of the lower housing 716 and the deck 712, but the tray 748 may be hinged downwards about its lower edge to allow cooked crisps to be removed from the crisp maker 710.

Batches of raw potato slices (or other edible material) delivered into the oil bath 732 are subjected to handling and cooking procedures that are substantially the same as detailed with reference to FIGS. 1-28, and more especially with reference to FIGS. 32-39. The batches of potato slices are moved through the bath 732 by a perforated paddle 750 which is a close lateral fit within the width of the oil bath 732, as is most clearly seen in FIG. 48.

As in the fourth embodiment of FIGS. 32-39, the paddle 750 of the fifth embodiment is carried on and controlled by an arm 752 (FIGS. 47 and 48). The outboard end of the arm 752 is pivotally connnected to the paddle 750 by a hinge 754 at an inclined angle in an approximately vertical plane. The inboard end of the arm 752 is connected by a horizontally pivoting hinge 756 to a vertical drive shaft 758. The arm 752 is somewhat cranked to extend from the hinge 756 over the top of the deck 712 and down into the oil bath 732 to reach the outboard hinge 754 and the paddle 750.

The vertical drive shaft 758 is angularly reciprocated by the mechanism shown in the coverless underside view of the crisp maker 710 shown in FIG. 49. A first electric motor 760 (shown in non-driving end view) operates through several stages of reduction gearing (of which the final stages are denoted 762) to turn a crank wheel 764. A connecting rod 766 links the crank wheel 764 to an arm 768 secured to the bottom end of the vertical drive shaft 758. Unidirectional rotation of the motor 760 is converted by the crank mechanism to bidirectional rotation of the vertical drive shaft 758 (in the form of the angular reciprocation requisite for moving the paddle 750 from one end of the oil bath 732 to the other end, and back again). A control mechanism (not shown) controls the timing of the intermittent movement of the shaft 758 and hence of the paddle 750 to meet the requirements of the preferred cooking procedure detailed in connection with the preceding embodiments of the invention. Part of the control mechanism may include an electric switch (not shown) operated by the crank wheel 764 reaching a predetermined angular position.

Still referring to FIG. 49, a second electric motor 770 (shown in non-driving end view) operates through its respective stages of reduction gearing (not visible) under the control of the control mechanism to cause predetermined intermittent rotation of a vertical shaft 772 (FIG. 47) which protrudes through the upper surface of the deck 712. The upper end of the vertical shaft 772 carries a pinion (not illustrated) which meshes with the ring gear 774 (FIG. 50) secured around the cutting disc 730, when the lid 718, with its associated feeding and slicing mechanisms 722-730, is clipped in place on top of the deck 718. The ring gear 774 and the pinion on the upper end of the shaft 772 structurally and functionally correspond to the ring gear 104 and the cutter driving pinion 106 of the first embodiments, as shown in FIG. 1. Intermittent rotation of the cutting disc 730 (FIG. 50) is synchronised with intermittent angular movement of the paddle driving shaft 758 to ensure the correct sequence of potato slicing and slice handling movements as detailed in connection with the previous embodiments.

A magnetically operated reed switch 776 (FIG. 47) is embedded in the deck 712 near the shaft 772, and a small permanent magnet 778 (FIG. 50) is moulded into the cutting disc ring gear 774 in order to allow the control mechanism of the crisp maker 710 to detect when complete rotations of the cutting disc 730 have occurred. (Each time the magnet 778 passes over the reed switch 776, the switch 776 will be magnetically actuated). Thus by counting (for example) either two or three complete revolutions of the cutting disc 730, a batch of six or nine slices (respectively) of raw potato will be delivered into the oil bath 732 from the triple-bladed cutting disc 730, assuming the chute 722 not to have been depleted of potato. Thus numerical control of batch size (number of slices) is relatively easy and precise.

Reverting to FIG. 47, during clockwise or left-to-right movement of the paddle 750 as viewed from above in FIG. 47, the paddle 750 will rest on the base of the oil bath 732 as shown in FIG. 48, after the downward slice-gathering movement of the paddle 750 at the extreme leftward (anti-clockwise) end of the oil bath 732. This determines the requisite lower vertical level of horizontal movement of the paddle 750, as previously described. Following completion of the submerged cooking phase with the paddle 750 in the position particularly shown in FIG. 47, the vertical drive shaft 758 recommences to turn clockwise to bring the paddle 750 rightwards and up the forward end ramp 742. This bulldozes the fully cooked crisps over the forward bath edge 744 (with a preliminary pause to drain excess cooking oil, if desired) and down the sloping surface 746. As the forward (rightward or clockwise) end of the paddle 750 passes over the forward bath edge 744, the paddle 750 continues to be supported in the correct attitude by an upwardly projecting ramp 780 formed integrally with the upper surface of the deck 718, as is most clearly shown in FIGS. 47 and 48. The above-described sequence of operations are directly comparable with those shown in and previously described with respect to FIGS. 34 and 35.

During the return of the paddle 750 from its extreme rightward/clockwise crisp-dispensing position over the edge 744 and the slope 746, it is necessary for the now-leading rearward edge of the paddle 750 (the left edge as viewed in FIG. 47) to travel horizontally at a higher vertical level than during horizontal movement in the opposite direction, such that the raised edge of the paddle 750 sweeps floating partly-cooked slices towards the leftward/anti-clockwise end of the oil bath 732 as previously described in connection with the first embodiment of FIGS. 1-28. This necessary change in the vertical position of the paddle 750 is accomplished by raising the arm 752 about its inboard hinge pivot 756, in turn lifting the outboard end of the arm 752 and thereby also lifting the anti-clockwise end of the paddle 750 through the intermediary of the hinge 754. This lifting of the arm 752 is caused by the arm 752 interacting with a cam 782 which is partly visible in FIG. 47 and is shown fully and separately, to a much enlarged scale, in FIG. 52. The cam 782 is moulded integrally with the upper surface of the deck 712 (though it could be formed as a separate component and secured to the deck surface as shown for the equivalent structure 624 in FIG. 33).

Figure 52:
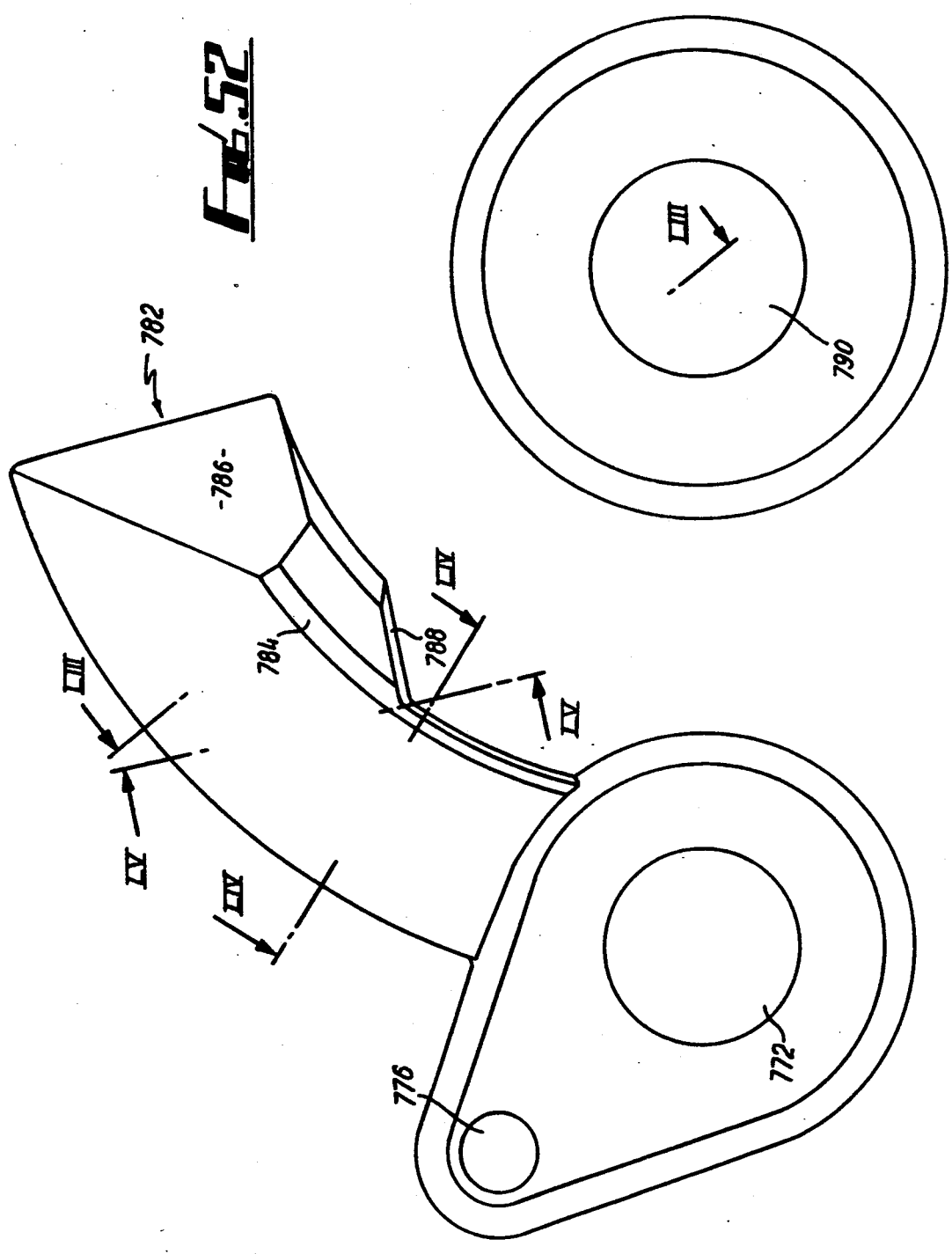
FIG. 52 is a plan view from above and to an enlarged scale of a cam visible in FIG. 47.
Figure 53:
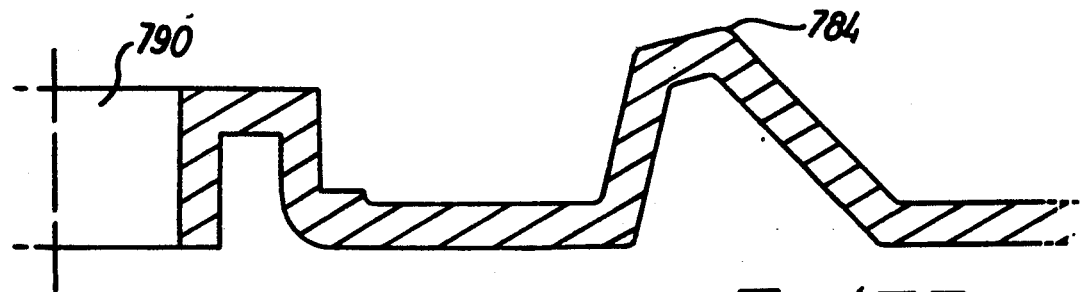
FIG. 53 is a vertical section of the cam of FIG. 52 and taken on the line LIII—LIII in FIG. 52.
Figure 54:
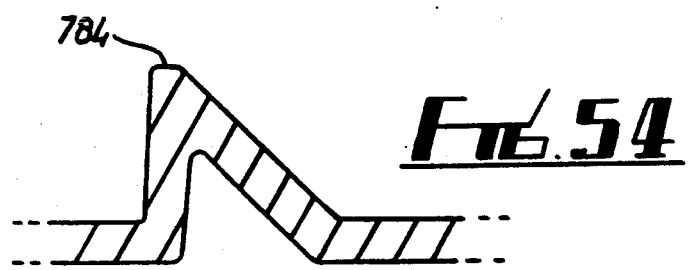
FIG. 54 is a vertical section of the cam of FIG. 52 and taken on the line LIV—LIV in FIG. 52.
Figure 55:
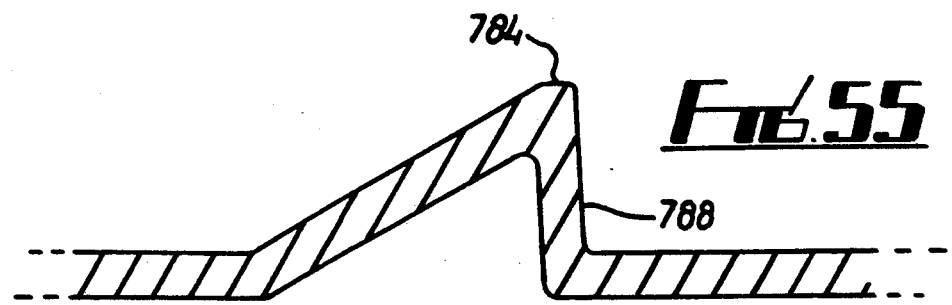
FIG. 55 is a vertical section of the cam of FIG. 52 and taken on the line LV—LV in FIG. 52; in the crisp maker of FIG. 40.
Figure 56:
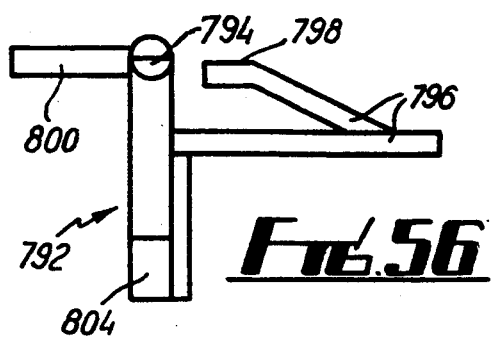
Figure 57:
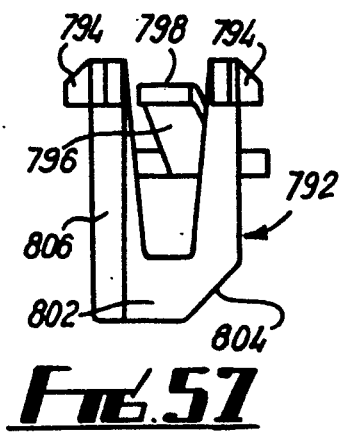
FIGS. 57 and 58 are respectively left and right end elevations of the cam follower of FIG. 56.
Figure 58:
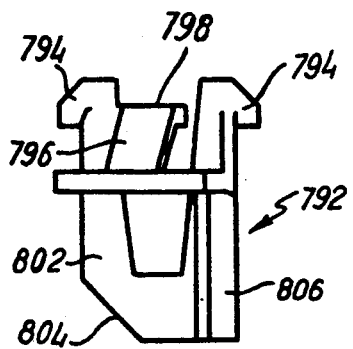
Figure 59:
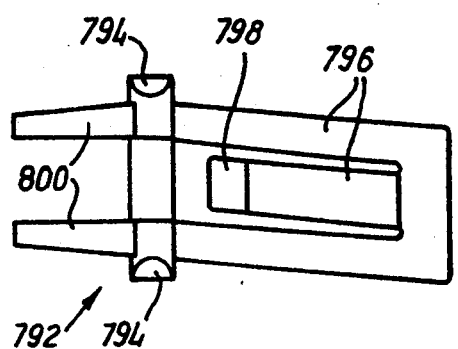
FIGS. 59 and 60 are plan views respectively from above and beneath, the cam follower of FIG. 56.
Figure 60:
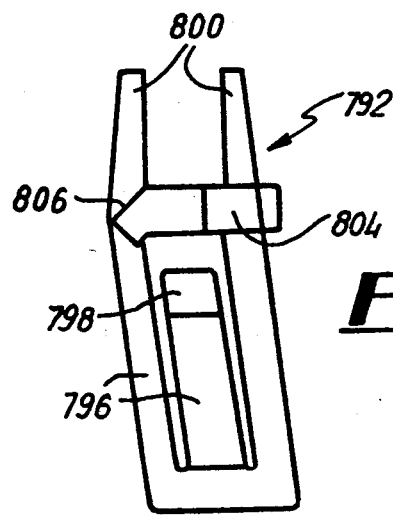

Essential features of the cam 782 comprise a generally horizontal ridge 784 with an up-sloping lead-in ramp 786, and an out-sloping ramp surface 788 (whose function will be explained subsequently). Various vertical sections of the cam 782 detailed in FIG. 52 are shown separately in FIGS. 53, 54, and 55 to clarify the above-mentioned structural details of the cam 782. In particular, the section LIII—LIII shown in FIG. 53 extends to include the aperture 790 in the deck 712 through which the vertical paddle drive shaft 758 extends in the operationally assembled crisp maker 710.

The paddle-carrying arm 752 does not directly bear against the cam 782, but reacts with the cam 782 through the intermediary of a cam follower 792 which is fully detailed in FIGS. 56-60, on an enlarged scale matching that of FIGS. 52. The cam follower 792 is a one-piece moulding of a moderately resilient polymer. Referring particularly to FIGS. 56, 57, 58 and 59, the cam follower 792 has a laterally extending pair of pivots 794 with chamfered upper edges, which clip into a matching pair of pivot holders (not illustrated) formed on the underside of the arm 752 where it overlies the cam 782 (see FIG. 47). Each of FIGS. 56-60 show different aspects of a resilient double cantilever 796 moulded integrally with the body of the cam follower 792. The free end 798 of the cantilever 796 is arranged to bear against the underside of the arm 752 when the pivots 794 are clipped in place, the resilience of the polymer of which the cam follower 792 is formed combined with the doubled-back configuration of the cantilever 796 resulting the cam follower 792 being given a rotational spring bias about the axis of its pivotal attachment to the underside of the arm 752, this rotational bias being clockwise as viewed in FIG. 56. (Such clockwise rotational bias results from the follower 792 being clipped to the underside of the arm 752 such that the cantilever 796 lies inboard of the cam follower pivots 794, ie between the pivots 794 and the inboard hinge pivot 756 where the arm 752 is attached to the paddle drive shaft 758.) On the opposite side of the pivots 794 from the cantilever 796, a pair of relatively rigid projections 800 limit the pivotal movement of the cam follower 792 that can be induced by the cantilever 796, since these projections 800 will eventually bear on the underside of the arm 752 to limit the spring-biased movement of the cam follower 792. These projections 800 are most clearly seen in FIGS. 56, 59, and 60.

The cam follower 792 has a generally U-shaped body 802 which projects downwardly away from the underside of the arm 752 when the cam follower 792 is pivotally clipped into its operational position underneath the arm 752. The anti-clockwise bottom corner of the cam follower body 802 has a 45 degree chamfer 804 which assists the cam follower 792 to ride up the leading face 786 of the cam 782 when the paddle arm 752 is travelling anti-clockwise to move the paddle 750 leftwards as viewed in FIG. 47. The chamfer 804 is most clearly seen in FIGS. 56, 57, 58, and 60.

The clockwise vertical edge 806 of the cam follower body 802 is chamfered backwards inboard of the body 802. This assists the cam follower body 802 to pivot backwards (inboard) when the edge 806 comes into contact with the face 788 of the cam 782 upon rightward (clockwise) movement of the paddle arm 752 from its most leftward position as viewed in FIG. 47. The vertical chamfer 806 is most clearly seen in FIGS. 57, 58, and 60.

Although the general principle of lifting and lowering of the paddle 750 according to its direction of horizontal movement (clockwise or anti-clockwise about the vertical paddle drive shaft 758) is as previously described in detail for the embodiment of FIGS. 1-28 and for the embodiment of FIGS. 32-39 (as well as for the other embodiments of the invention utilising a horizontally and vertically reciprocating paddle), the precise interaction of the cam follower 792 with the cam 782 will now be detailed:

(A) Assuming the paddle arm 752 to be in its furthest clockwise position as viewed from above in FIG. 47, the cam follower body 802 will be free of the cam 782, and the resilient cantilever 796 will spring bias the cam follower 792 outwards relative to the paddle arm axis 758. This radially aligns the cam follower body 802 with the leading ramp 786 of the cam 782.

(B) As the paddle arm 752 commences to move anti-clockwise following discharge of a batch of fully cooked crisps into the tray 748, the cam follower chamfer 804 contacts the cam ramp 786 and rides up the face of the ramp 786 with increasing anti-clockwise movement of the arm 752. This raises the cam follower 792, and consequently pivots the arm 752 upwards about its inboard hinge pivot 756, in turn lifting the outboard hinge 754 and the anti-clockwise edge of the paddle 750.

(C) When the bottom edge of the cam follower body 802 reaches the cam ridge 784, the cam follower 792 rides along the top of the cam 782 at its constant maximum height. The rotationally outward spring bias applied to the cam follower 792 by the cantilever 796, limited by the projections 800, holds the lower edge of the cam follower body 802 aligned with the cam ridge 784.

(D) When the arm 752 has moved sufficiently anti-clockwise for the paddle 750 to have nearly reached the anti-clockwise end of the oil bath 732, the clockwise vertical edge 806 of the cam follower body 802 will have reached a position on the cam ridge 784 approximately in conjunction with the section line LV—LV. The slight further anti-clockwise movement of the paddle arm 752 to bring the paddle 750 to its extreme anti-clockwise position will cause the cam follower body 802 to drop off the cam ridge 784 at about the position indicated by the section line LIV—LIV.

(E) Further movement of the arm 752 is now in the clockwise direction as viewed in FIG. 47, owing to the movement reversal effected by the crank mechanism 764+766+768. The cam follower body 802 is now lying inboard of the cam 782 as sectionally viewed in FIG. 54, and the paddle 750 is supported by the bottom of the oil bath 732 as shown in FIG. 48. Assisted by the vertical chamfer 806, the cam face 788 causes the cam follower 792 to pivot inboard of the cam 782 during continued clockwise movement of the arm 752, overcoming the outward pivotal bias induced by the resilient cantilever 796. Thus the cam follower 792 remains free of any lifting effect during clockwise movement of the paddle arm 752, until the discharge of crisps is complete and the above-described cycle is ready to recommence. (As previously mentioned, motion of the arm 752 and of the paddle 750 is not continuous, and pauses of various durations occur at various points throughout the range of movements, as described in detail with reference to the previous embodiments of the invention. Positions and durations of pauses in movement can be varied in any desired manner).

The ventilation cut-outs 720 in the upper edge of the lower housing 716 have already been mentioned; not shown are numerous small ventilation slots in the bottom surface of the housing 716 which are rendered effective by the bottom surface of the housing 716 being held off the supporting surface (kitchen work-top, etc) by mounting feet 808 attached to the underside of the lower housing 716 (see FIGS. 42–45).

The lid 718 includes a raised pent 810 to accommodate the paddle 750 in its uppermost crisp-discharging position (equivalent to that shown in FIGS. 34 and 35 in respect of the fourth embodiment). The sloping face of the raised pent 810 includes a regular array of numerous small ventilation slots 812 to allow natural convective discharge of steam and oil fumes during operation of the crisp maker 710. The pent 810 is most clearly seen in FIGS. 40–46, while the ventilation slots 812 are most clearly seen in FIGS. 40, 41, 43, 46, and 50 (the latter being a view from beneath). Thus the combination of the vents in the lower housing 716 and the vents 812 in the lid 718 allow passage of fumes and ventilation air through the crisp maker 710. A filter (for example a sheet of activated carbon) may be fitted inside the pent 810 (or any other suitable location) to clean up fumes and vapours discharged through the ventilation slots 812.

The front right corner of the deck 712 is not covered by the lid 718, and is a suitable location for various controls 814 for controlling operation of the crisp maker 710, as particularly shown in FIGS. 40 and 46. The controls 814 may include a main off/on switch, and speed and timing controls for adjusting various aspects of operation of the crisp maker 710.

The deck 712 is provided with a side handle 816 by which the crisp maker 710 may be more easily and safely lifted from place to place; the handle 816 being visible in FIGS. 40, 41, 42, 43, 46, 47, and 49 (the latter being a view from beneath).

The domestic crisp maker 710 as shown in FIGS. 40–60 may be scaled-up to form a commercial crisp maker; such scaling-up could include (for example) a duplication or triplication of the potato feeding and slicing mechanism 722–730 for increased throughput, as well as simple dimensional increases in other parts of the crisp maker.

Other modifications and variations can be made without departing from the scope of the invention as defined in the appended claims.

What is claimed is:

1. Equipment for the preparation and cooking of edible materials, comprising:
   a bath for containing hot cooking oil,
   heating means for maintaining cooking oil in said bath at a temperature not less than a predetermined minimum temperature but not greater than a predetermined maximum temperature,
   slice feeding means,
   control means to control said slice feeding means to drop feed individual unwashed and undried slices in batches of a limited number into said bath for freely floating said slices to the surface of the bath,
   slice handling means for maintaining substantially continuous control of said slices during cooking, said control means controlling said slice handling means forcibly to submerge from the surface the freely floating slices in said bath, to maintain submersion of said slices for not less than a predetermined period, and finally to remove cooked slices from the cooking oil.

2. Equipment as claimed in claim 1, for use in cases where the edible material is initially unsliced, the equipment further including slicing means or the the functional equivalent thereof for individually cutting successive slices of edible material of substantially invariant thickness characteristics.

3. Equipment as claimed in claim 2, wherein said control means controls said slicing means to produce batches of slices containing numbers of slices not exceeding a predetermined number of slices.

4. Equipment as claimed in claim 3, wherein said slicing means is a rotary slicer having at least one blade, and said control means is operable to cause said rotary slicer to rotate through a predetermined angle to cause the blade to be applied to the unsliced edible material a number of times which is equal to said limited number of slices.

5. Equipment as claimed in claim 2 or claim 3 or claim 4, wherein the equipment includes feeding means for feeding the unsliced edible material towards said slicing means at a substantially constant rate.

6. Equipment as claimed in claim 5, wherein said slicing means is a rotary slicer, the feeding means includes a lead screw geared to rotate synchronously with the rotary slicer, and the lead screw is coupled to positive forcing means for positively forcing the unsliced edible material into the rotary slicer such that in use, unsliced edible material is positively forced into the rotary slicer at a linear rate which is proportionate to the number of passages per unit time of the blade of the rotary slicer across the unsliced edible material, at any speed of operation of the rotary slicer in the range from zero speed to maximum speed.

7. Equipment as claimed in claim 6, wherein the positive forcing means takes the form of a plunger coupled in use to the lead screw through a lead nut forming part of the plunger, and the plunger travels in use along a guide channel which laterally constrains unsliced edible material into a path towards the rotary slicer, such that unsliced edible material placed in said guide channel between said plunger and said rotary slicer will, in operation of the equipment, be positively forced into the rotary slicer at the proportionate linear rate.

8. Equipment as claimed in claim 7, wherein the lead nut is such as automatically to disengage from the lead screw when the plunger has moved fully along the guide channel.

9. Equipment as claimed in claim 8, wherein the lead screw includes a portion where the lead screw thread is discontinued such that the lead nut automatically disengages from the lead screw when the lead nut reaches said portion of the lead screw.

10. Equipment as claimed in claim 7 wherein said lead nut is a split nut resiliently biassed to a position in which it will clamp around and operatively engage the lead screw, said plunger including counterbias means by which the split nut may be selectively counterbiassed by manual manipulation of the counterbias means to disengage the split nut from the lead screw at any selected time such that the plunger may be withdrawn from the guide channel at the end of plunger movement towards the rotary slicer or at any other selected time, thereby to enable withdrawal or replenishment of the unsliced edible material in said guide channel.

11. Equipment as claimed in claim 1, wherein the slice handling means comprises a scoop or paddle, and further comprises scoop or paddle driving means operable to drive the scoop or paddle the gather a bath of newly cauterized slices and forcibly submerge the batch of gathered slices in the hot cooking oil for a period of time not less than the predetermined period, and finally to remove cooked slices from the cooking oil and dispense said cooked slices.

12. Equipment as claimed in claim 11, wherein the driving means is such as to dispense said cooked slices by ejecting said cooked slices from the equipment.

13. Equipment as claimed in claim 11 or claim 12 wherein the scoop or paddle driving means is such as to cause forced submersion of the slices in a portion of the bath of hot cooking oil which is displaced from a portion of the oil bath into which the slice feeding means feeds the uncooked slices of edible material whereby to leave the latter portion of the oil bath free to receive a subsequent batch of slices.

14. Equipment as claimed in claim 13, wherein the scoop or paddle driving means is operable to cause the scoop or paddle to move in a combination of horizontal and vertical reciprocating movements which together result in the batch of newly cauterised and floating slices being gathered from the portion of the oil bath to which they have been fed by the slice feeding means and translated by a combination of horizontal and vertical movements to the relatively displaced portion of the oil bath where the slices are forcibly submerged, from whence they are subsequently moved by a combination of continued horizontal and upward movements to a position in which the cooked slices are dispensed, the driving means then further operating to drive the scoop or paddle to a position which completes the cycle of movement and positions the scoop or paddle to repeat the cycle of movements to handle a subsequent batch of slices.

15. Equipment as claimed in claim 14, wherein the scoop or paddle is caused to move in said combination of horizontal and vertical reciprocating movements by forming an upper edge of the oil bath or a surface adjacent thereto on at least one side of the direction of horizontal movement of the scoop or paddle with a pair of substantially horizontal guide surfaces at two different heights with transitions therebetween at either end of horizontal movement, and coupling the scoop or paddle to said guide surfaces by a guide runner at the respective side of the scoop or paddle, said driving means being powered to reciprocate the scoop or paddle horizontally, the interaction of the guide runner with the guide surfaces and the transitions therebetween causing requisite vertical movements of the scoop or paddle and causing the guide runners to travel along respective guide surfaces at different heights according to the horizontal direction of motion, said driving means being intermittently powered during cooking procedures to hold the scoop or paddle in requisite positions for requisite intervals and to move between said requisite positions at requisite times whereby said slices of edible material are restrained or translated substantially in conformity with a predetermined cooking procedure.

16. Equipment as claimed in claim 14, wherein the scoop or paddle is caused to move in said combination of horizontal and vertical reciprocating movements by forming an upper edge of the oil bath or a surface adjacent thereto on at least one side of the direction of horizontal movement of the scoop or paddle with a substantially horizontal guide surface at a height which holds the scoop or paddle at a relatively higher vertical position during horizontal movement in one direction, the scoop or paddle being maintained at a relatively lower vertical position during horizontal movement in the other direction by the scoop or paddle resting on and moving along the floor of the oil bath, with provision for the scoop or paddle to transfer between said relatively higher and said relatively lower vertical positions at or adjacent each extreme of horizontal movement, the scoop or paddle being coupled to said substantially horizontal guide surface by a guide runner at the respective side of the scoop or paddle during horizontal movement in said one direction, the guide runner being uncoupled from said substantially horizontal guide surface during horizontal movement in said other direction to allow the scoop or paddle to descend to the floor of the oil bath, said driving means being powered to reciprocate the scoop or paddle horizontally, said provisions for the scoop or paddle to transfer between said relatively higher and said relatively lower vertical positions at or adjacent each extreme of horizontal movement causing or allowing requisite vertical movements of the scoop or paddle and either causing the guide runner to travel along said substantially horizontal guide surface or causing the scoop or paddle to travel along the floor of the oil bath according to the horizontal direction of motion, said driving means being intermittently powered during cooking procedures to hold the scoop or paddle in requisite positions for requisite intervals and to move between said requisite positions at requisite times whereby said slices of edible material are restrained or translated substantially in conformity with a predetermined cooking procedure.

17. Equipment as claimed in claim 16, wherein said substantially horizontal guide surface is constituted by a functionally equivalent surface on a cam, said cam is located intermediate said oil bath and said driving means, and said guide runner is a cam follower.

18. Equipment as claimed in claim 11, wherein said oil bath is generally arcuate in plan, with the horizontal components of movement of the scoop or paddle being substantially circular at a substantially constant radius from an axis which is substantially vertical in use.

19. Equipment as claimed in claim 18, wherein the driving means comprises a shaft driven to undergo angular reciprocation about a substantially vertical axis, with such driving means being coupled to the scoop or paddle to provide the arcuate horizontal reciprocation thereof by means of an arm pivotally linked to said shaft about an axis which allows said arm to rise and fall, said guide runner or cam follower being mounted on the arm to cause the arm to rise or fall in accordance with the angular position of the arm and the direction of angular movement of the arm and consequently to cause or allow the requisite vertical reciprocation of the scoop or paddle.

20. Equipment as claimed in claim 1, wherein the slice feeding means and the slice handling means are both controlled by said control means to synchronize respective stages of preparation and of cooking.

21. Equipment as claimed in claim 20, wherein the equipment comprises a single reversible electric rotary motor under the control of said control means, the motor being coupled through a gear box and one or more unidirectional clutches to power the slice feeding means and the slice handling means, the gear box providing mechanical linkage between functionally different sections of the equipment to achieve synchronised operation of these different sections.

22. Equipment as claimed in claim 20, wherein the equipment comprises two electric rotary motors under the control of said control means, one of said motors being operatively coupled through respective reduction gearing to said slice feeding means, and the other of said motors being operatively coupled through respective reduction gearing and a crank mechanism to said slice handling means.

23. Equipment as claimed in claim 1, wherein the equipment automatically repeats the cycle of operations involved in forming, cooking and handling one batch of slices.

* * * * *